US006934250B1

(12) United States Patent
Kejriwal et al.

(10) Patent No.: US 6,934,250 B1
(45) Date of Patent: Aug. 23, 2005

(54) METHOD AND APPARATUS FOR AN OUTPUT PACKET ORGANIZER

(75) Inventors: Prabhas Kejriwal, Palo Alto, CA (US); Chi Fai Ho, Sunnyvale, CA (US)

(73) Assignee: Nokia, Inc., Irving, TX (US)

( * ) Notice: Subject to any disclaimer, the term of this patent is extended or adjusted under 35 U.S.C. 154(b) by 0 days.

(21) Appl. No.: 09/418,690

(22) Filed: Oct. 14, 1999

(51) Int. Cl.⁷ .............................................. G01R 31/08
(52) U.S. Cl. ..................... 370/229; 370/235.1; 370/392; 709/236
(58) Field of Search .................. 370/385–398, 370/412–419, 399, 236, 252, 429, 229–235, 258, 249, 235.1; 710/40, 20–28, 39, 317, 10; 709/248, 450, 236; 450/517, 461, 414, 445–449

(56) References Cited

U.S. PATENT DOCUMENTS

| | | | |
|---|---|---|---|
| 5,265,207 A | | 11/1993 | Zak et al. |
| 5,311,509 A | | 5/1994 | Heddes et al. |
| 5,329,623 A | | 7/1994 | Smith et al. |
| 5,537,403 A | | 7/1996 | Cloonan et al. |
| 5,745,488 A | | 4/1998 | Thompson et al. |
| 5,781,549 A | | 7/1998 | Dai |
| 5,794,073 A | * | 8/1998 | Ramakrishnan et al. ...... 710/10 |
| 5,831,980 A | * | 11/1998 | Varma et al. ................ 370/395 |
| 5,841,772 A | * | 11/1998 | Daniel et al. ................ 370/412 |
| 5,841,874 A | | 11/1998 | Kempke et al. |
| 5,892,761 A | | 4/1999 | Stracke, Jr. et al. |
| 5,938,736 A | | 8/1999 | Muller et al. |
| 5,999,518 A | * | 12/1999 | Nattkemper et al. ........ 370/258 |
| 6,064,677 A | | 5/2000 | Kappler et al. |
| 6,088,355 A | | 7/2000 | Mills et al. |
| 6,122,274 A | | 9/2000 | Kumar |
| 6,147,996 A | | 11/2000 | Laor et al. |
| 6,173,386 B1 | | 1/2001 | Key et al. |
| 6,259,699 B1 | | 7/2001 | Opalka et al. |
| 6,310,893 B1 | | 10/2001 | Yuan et al. |
| 6,324,164 B1 | | 11/2001 | Luijten et al. |
| 6,377,574 B1 | | 4/2002 | Endo |
| 6,377,583 B1 | * | 4/2002 | Lyles et al. .................. 370/412 |
| 6,377,998 B2 | | 4/2002 | Noll et al. |
| 6,389,031 B1 | * | 5/2002 | Chao et al. .................. 370/412 |
| 6,421,342 B1 | | 7/2002 | Schwartz et al. |
| 6,426,957 B1 | | 7/2002 | Hauser et al. |
| 6,510,509 B1 | | 1/2003 | Chopra et al. |
| 2002/0010793 A1 | | 1/2002 | Noll et al. |
| 2002/0099855 A1 | | 7/2002 | Bass et al. |

* cited by examiner

*Primary Examiner*—Chi Pham
*Assistant Examiner*—Prenell Jones
(74) *Attorney, Agent, or Firm*—Squire, Sanders & Dempsey L.L.P.

(57) ABSTRACT

An apparatus is described having an output packet organizer that has a first location and a plurality of second locations. The first and second locations correspond to the priority of a packet, where the first location has higher priority than the second locations. The output packet organizer has a third location. The third location has a higher priority than the first location. The first and third locations are coupled to a scheduler that serves the first and third locations. The second locations coupled to the scheduler through a round robin pointer.

43 Claims, 25 Drawing Sheets

| | INPUT FLOW ID STAGE | INPUT POLICING STAGE | NEXT NODE IDENTIFICATION STATE | OUTPUT FLOW ID STATE | PRIORITY MARKING AND SHAPING STAGE | ACCEPT/DISCARD STAGE |
|---|---|---|---|---|---|---|
| Fig. 6A | X | X | X | | X | X |
| Fig. 6B | | | X | X | X | X |
| Fig. 6C | X | X | X | X | X | X |
| Fig. 6D | | | X | | X | X |

METHOD AND APPARATUS FOR AN OUTPUT PACKET ORGANIZER

FIELD OF INVENTION

The field of invention relates to networking generally. More specifically, the field of invention relates to a pipeline for processing networking packets.

BACKGROUND OF THE INVENTION

Packet Networks

Two forms of networking technology, referred to as "circuit" and "packet" are in widespread use. However, the two have generally been applied to different applications. Circuit networks, usually associated with large telecommunications companies, have traditionally supported mostly voice traffic (e.g., a telephone call) while packet networks have traditionally supported computer traffic (commonly referred to as data traffic or the like).

Circuit networks are generally characterized as having minimal latency, meaning: traffic emanating from a source appears almost instantaneously at its destination. Low latency is deemed a requirement for networks carrying voice traffic since two people engaged in conversation begin have difficulty communicating effectively if there is more than 10–100 milliseconds of delay in the transport of their correspondence. Traffic requiring low latency, such as voice or video conferencing, is referred to as real time traffic. A problem with circuit networks, however, is their relatively inefficient consumption of network resources (in the form of wasted bandwidth).

Packet networks have been generally characterized as having poor latency but good efficiency. Traditionally, the transportation of traffic over a packet network resulted in noticeable delay (i.e., high latency). However, with a packet network, bandwidth tends to be conserved rather than wasted. Packet networks have been traditionally implemented in computer networks since communications between computers usually involve some form of data transfer (e.g., an e-mail) or other type of non real time traffic.

Non real time traffic is usually tolerant of latencies of a few seconds or higher. Non real time traffic includes (among others): e-mail, communications between a web server and a PC, and the sending of files such as a word processing document. Wide Area Network (WAN) traffic and Regional Network (RN) traffic have been traditionally designed to carry voice traffic (since the majority of longer distance communications have been voice communications) resulting in wide scale deployment of circuit networks in the WAN/RN areas. Regional networks typically serve a region (such as the Northeast or Mid Atlantic states). WANs typically serve longer distance communications such as transoceanic or transcontinental connections.

With the growing popularity of the Internet non-real time traffic has approached voice and other real time traffic in the WAN and RN. Furthermore, advances in silicon technology have resulted in much faster and affordable networking equipment such that the latency problem traditionally associated with packet networks is not the barrier for real time traffic that it once was.

With the poorer efficiency of circuit switched networks, the surge in non real time traffic and the potential of packet networks to carry real time traffic, WAN/RN network managers have begun to think about a packet based approach in the WAN and RN. Furthermore, although packet technology has always been associated with local area networks (LANs) used for computers and other data devices connected over small areas such as an office building or campus; packet approaches are also expected to be used for traditional circuit equipment (such as the telephone or facsimile machine) that are located proximate to a LAN.

Service Level Agreements, Quality of Service and Traffic Rates

Networks carry various forms of data (e.g., voice traffic, data files such as documents, facsimile transmissions, etc.) from a source to a destination. One of the relationships surrounding the commercialized use of a network is the contractual relationship between the user of a network and the provider of a network. The provider of a network (also referred to as a provider, service provider or network service provider) typically owns and manages networking equipment that transport a user's data. In other cases, however, a service provider may lease or otherwise obtain access to the networking equipment of others in order to implement his (i.e., the service provider's) network.

The user of the network (also referred to as a user, network user) is any individual, entity, organization, etc. that seeks the network of another individual, entity or organization to transport the user's traffic. In many cases, the network user and service provider usually form an agreement, referred to as a Service Level Agreement (SLA) based on the user's prediction of his usage of the network and the service provider's prediction of the performance of his network. Note that a network user is not necessarily a party engaged in a commercial contract. For example, a user may be a department in a corporation whose networking needs are handled by a another department (who acts as the service provider) within the corporation.

When a service provider offers a user the use of a network, the agreement (or other description) that characteristics the relationship between the user and service provider typically follows a framework roughly outlined by a queue: an input rate, output rate and an amount of delay. Typically, the service provider and user agree what the user's input rate to the network will be. The user's input rate is usually defined in terms of bits per second and measures how much data the user may send to a network in a given period of time (e.g., 622 Mb/s). If the user exceeds his input rate the service provider is generally not obligated to accept any excess traffic, although terms may vary from contract to contract.

Output rate is analogous to input rate in the sense that it is measured in terms of bits per second. Output rate, however, deals with the rate at which the user may receive traffic from the network. Again, if the user receives traffic at too high a rate, the service provider is not necessarily obligated to deliver it; or at least deliver all of it.

Assuming the user offers and receives traffic to/from the provider's network within his allowable in put/output rates, the next quest ion is the amount of delay, also referred to as network latency, that the user can expect to observe for his traffic.

Network latency delay concerns (although is not solely determined by) the priority of the packet within the service provider's network. F or example, for high Quality of Service (QoS) levels the user's traffic is typically given a high priority. This means it is placed ahead of other traffic within the network or given a route having fewer nodal hops so it may be processed and delivered in a shorter amount of time. For low priority levels, the user's traffic is given low priority. This typically means it tends to "sit" in the provider's network for periods of time before being processed (since higher priority traffic is continually placed ahead of it); or, the traffic is routed on a path having more nodal hops.

Priority has also been affiliated with the notion that different types or classes of traffic require different types of service. For example, voice traffic typically requires small delay through the network while data traffic may tolerate higher delays. Such characteristics generally force the service provider to treat the different traffic types differently. For example, voice traffic should be given higher priority over data traffic in order to reduce the delay of voice traffic. Such an environment is usually referred to as "differentiated services".

Note that a single user may have both types of traffic. As an example, in such a case, the service provider and user agree could agree to separate, unique rate and priority terms for the voice traffic and the data traffic. The priority terms for the user's voice traffic would reflect low latency while the priority terms for the user's data traffic would reflect higher latency.

In order for the user/service provider contract to be performed according to: 1) the agreed upon input rate; 2) the agreed upon output rate and 3) the agreed upon prioritization scheme (for one or more traffic types), the service provider's networking equipment should contain appropriate functionality. This means the service provider's equipment has both an understanding of the contract and the ability to execute, monitor and enforce the contract's terms for each user who has contracted with the service provider.

As packet switch ed networks have begun to be planned for in the wide area network (WAN) and regional network (RN), many commercial network service providers are seeking to rebuild their networks with packet switched based equipment. These service providers therefore place value upon networking equipment having high bandwidth and versatile SLA support for packet switched based networks. SLA support may also be referred to as contract functionality, contract related functionality or the like.

Networking equipment with high bandwidth can meet the growing demand for packet switched networks in general. Versatile SLA support allows for many different permutations of rate regulation and priority implementation techniques which are helpful when attempting to form differentiated service agreements with various user types such as home users, small businesses and large corporations.

Network Models

Various approaches may be used to model the functional layers that exist within a system that implements a node within a network. FIG. 1 shows one such model for a networking system 100. Packets are sent over network lines 101a–x. Network lines 101a–x correspond to the physical wiring (such as copper cables or fiber optic cables) that emanate from the system 100. Network lines 101a–x are used to physically carry input traffic (i.e., traffic entering system 100) and output traffic (i.e., traffic leaving system 100) from/to other networking systems.

Line aggregation layer 102 is used to aggregate the input traffic from network lines 101a–x and segregate the output traffic to network lines 101a–x. An input port (e.g., input port 103a) is used to carry aggregated input traffic from one or more network lines. For example, input port 103a may be used to carry the input traffic only from network lines 101a, b. Thus each input port 103a,b,c is a logical structure that carries the traffic arriving to system 100 from the port's corresponding network lines.

The number of network lines that correspond to a particular input port may vary depending upon the design and/or configuration of a particular system 100. Also, one or more input ports (e.g., input ports 103a,b,c) may exist depending on the design point of a particular system. In an analogous fashion, line aggregation layer 102 is also used to segregate all the output traffic to network lines 101a–x. As such each output port 104a,b,c is a logical structure that carries the traffic leaving system 100 from the logical port's corresponding network lines.

Packet aggregation layer 105 is used to form input packets from the input traffic on input ports 103a,b,c and effectively send output packets over the output traffic existing on output ports 104a,b,c. Various packet forms may be implemented at packet aggregation layer 105. For example, for ATM related network lines 101a–x, AAL0 and AAL5 packet types may be recognized at packet aggregation layer 105. Similarly, packets associated with the Point to Point Protocol, HDLC, Frame Relay and Ethernet may be used, as is known in the art, among others not listed above as well.

As an example of the operation of the packet aggregation layer 105, assume that network lines 101a–x are ATM network lines carrying AAL5 packets with ATM cells. ATM cells correspond to the traffic on network lines 101a–x and input/output ports 103a–c, 104a–c. Packet aggregation layer 105 forms AAL5 input packets in the input direction (i.e., cell reassembly) and breaks down AAL5 output packets in the output direction (i.e., cell segmentation).

Within networking/transport Layer 106, as shown in FIG. 1, an input packet is converted into an output packet. Input packets are processed to the networking/transport layer 106 by the packet aggregation layer 105 and output packets are presented to the packet aggregation layer 105 by networking/transport Layer 106. Networking/transport layer 106 is responsible for: 1) effectively identifying the networking node that an input packet should be transmitted over when it leaves the system 100 as an output packet; and 2) treating the input packet consistently with the SLA (or other service outline) applicable to that packet. For example, if a particular user agrees to a particular rate and priority for his packets, Networking/transport layer 106 checks to see if the user's packet is within the user's allotted rate and, if so, also prioritizes the packet within system 100 consistent with the user agreement.

SUMMARY OF THE INVENTION

An apparatus, comprising an output packet organizer having a first location and a plurality of second locations. The first and second locations correspond to the priority of a packet where the first location has a higher priority than the second location. The first location is coupled to a scheduler that serves the first location and the second location is coupled to the scheduler through a round robin pointer.

A method, comprising serving packet identifiers from a first location where the first location has a first priority; and, serving packet identifiers from a first second location indicated by a round robin pointer where the second location has a second priority and the first priority is higher than said second priority. The round robin pointer is incremented and packet identifiers are served from the first location. Packet identifiers are also served from a second second location indicated by the round robin pointer.

BRIEF DESCRIPTION OF THE DRAWINGS

The present invention is illustrated by way of example and not limitation in the figures of the accompanying drawings, in which like references indicate similar elements, and in which:

FIGS. 6a through 6d show examples of the utilization of the packet processor pipeline embodiment of FIG. 5d.

FIG. 7b shows a method that corresponds to the packet processor pipeline embodiment of FIG. 7a.

FIG. 9 shows an embodiment of the input policing stage of FIG. 7a.

FIG. 17a shows a method utilized by the Input Flow ID and Marking/Shaping stages of FIG. 16a.

FIG. 17b sows a method utilized by the Marking/Shaping stage embodiment of Fig. 16a.

FIG. 17c shows another method utilized by the Marking/Shaping stage embodiment of FIG. 16a.

DETAILED DESCRIPTION

An apparatus, comprising an output packet organizer having a first location and a plurality of second locations. The first and second locations correspond to the priority of a packet where the first location has a higher priority than the second location. The first location is coupled to a scheduler that serves the first location and the second location is coupled to the scheduler through a round robin pointer.

A method, comprising serving packet identifiers from a first location where the first location has a first priority; and, serving packet identifiers from a first second location indicated by a round robin pointer where the second location has a second priority and the first priority is higher than said second priority. The round robin pointer is incremented and packet identifiers are served from the first location. Packet identifiers are also served from a second second location indicated by the round robin pointer.

Networking Systems having Rate and Priority Functionality

Figure 1:
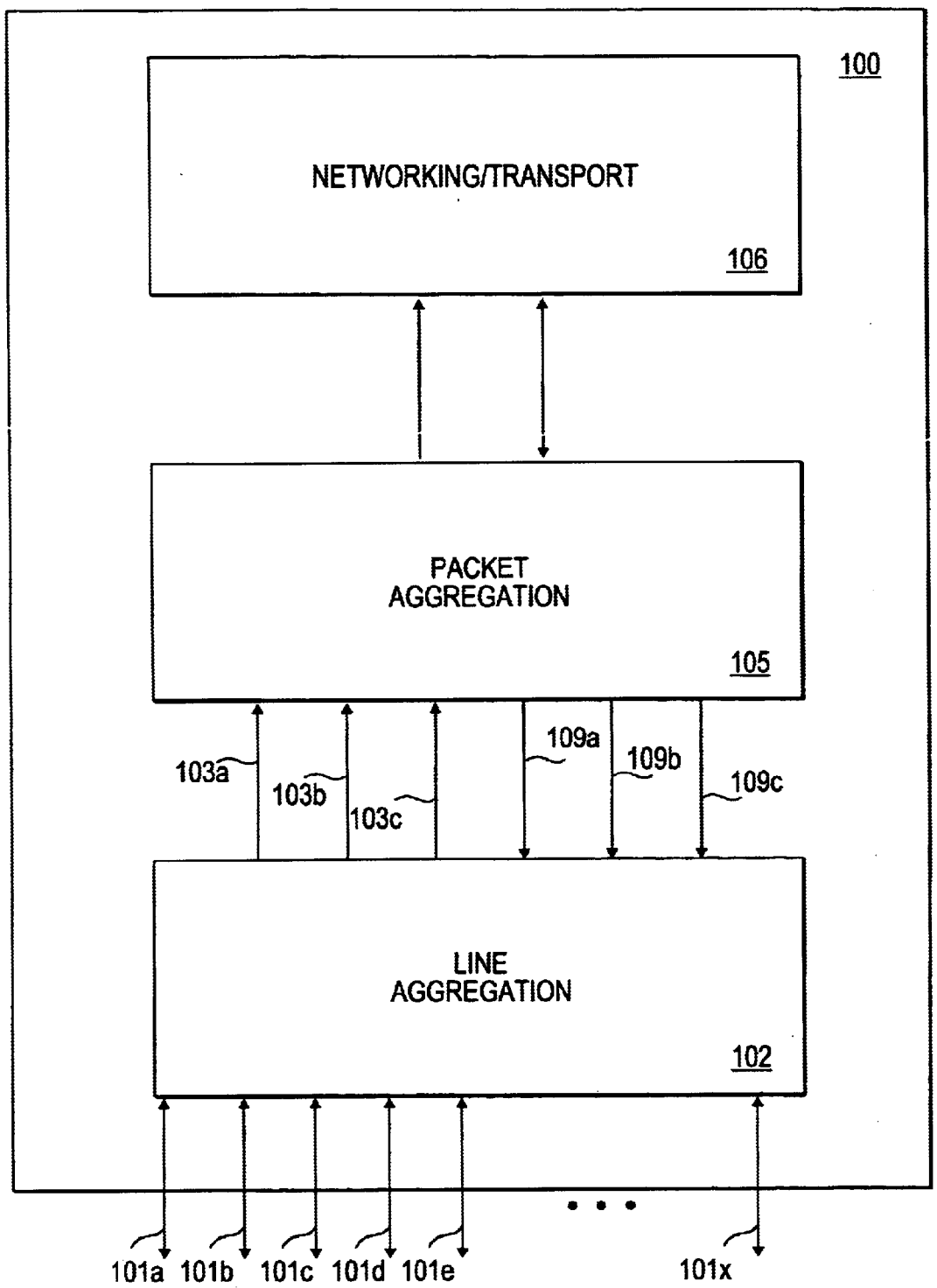
FIG. 1 shows a model for a networking system.
Figure 2A:
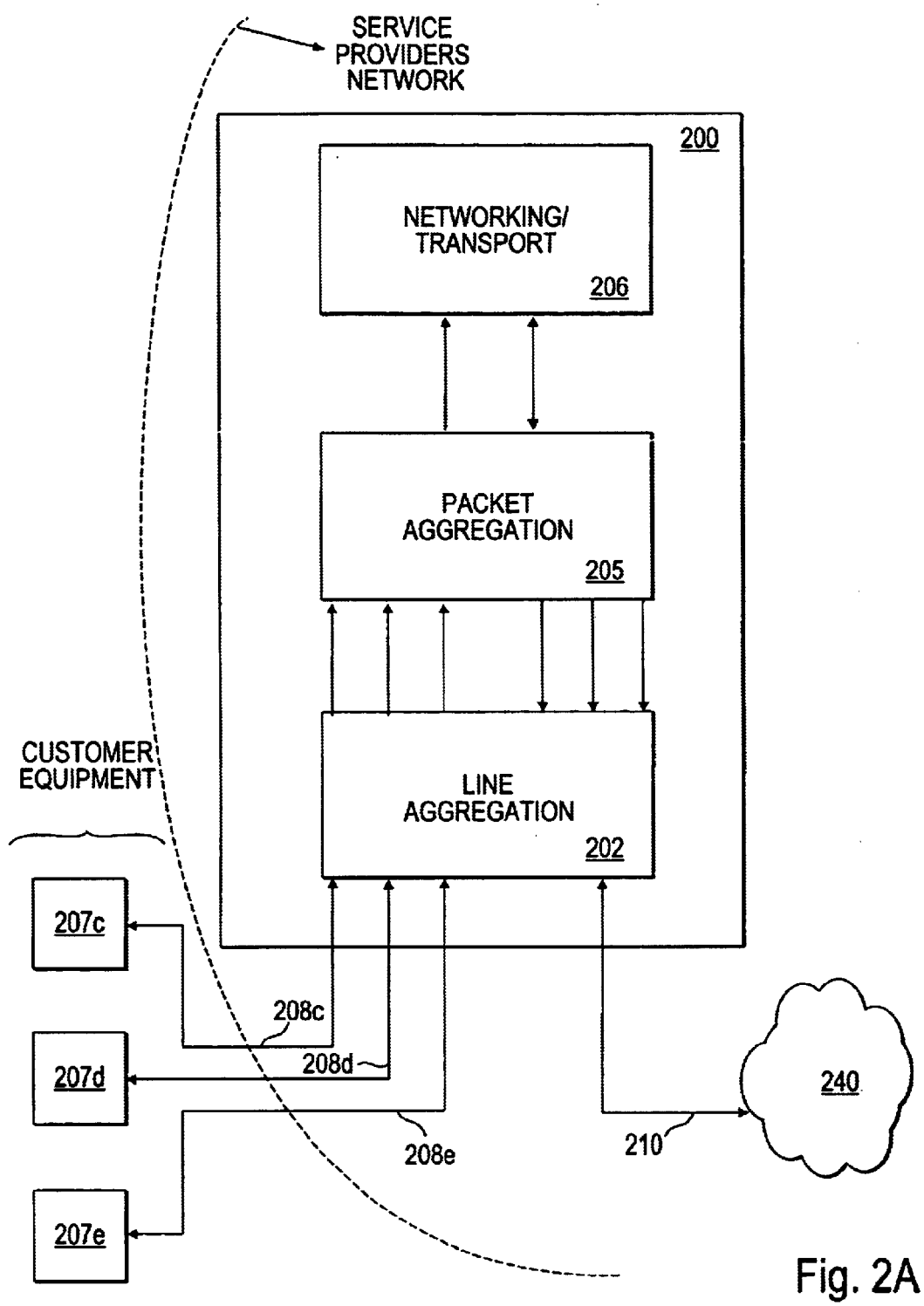
FIG. 2a shows a networking system implemented as an access node.

FIG. 2a shows a system 200 within a network that employs contract related functionality. In the example of FIG. 2a, system 200 corresponds to an access node for a service provider's network. Customer equipment 207c,d,e correspond to customer equipment, and lines 208c,d,e and 210 correspond to network lines (such as the network lines 101a–x of FIG. 1). Lines 208c,d,e are commonly referred to as access lines. Line 210 is commonly referred to as a trunk line or up link line. Up link 210 is coupled to the service provider's network 240.

Figure 2B:
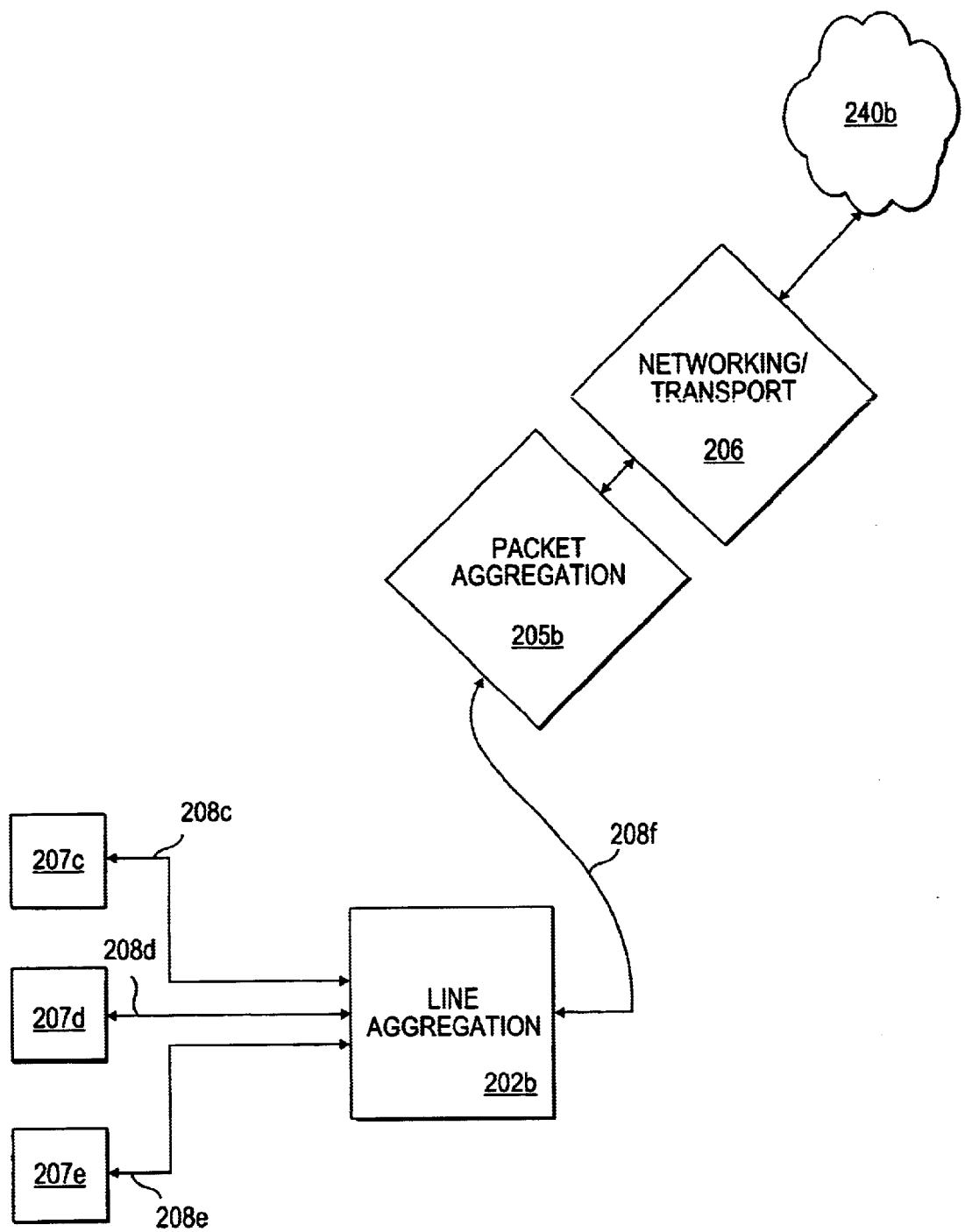
FIG. 2b shows service provider equipment used for line aggregation.

Referring to FIG. 2b, note that in other implementations, different equipment may be used to implement the functional layers 202, 205 of FIG. 2a. That is, a machine 202b may be used to implement line aggregation while another machine 205b may be used to implement packet aggregation. These machines are coupled by network line 208F. Situations such as that shown in FIG. 2b are typically implemented in cases where the user leases his premise equipment 202b from the service provider. With that in mind referring back to FIG. 2a, for simplicity, the implementation shown in FIG. 2a will be used to support the discussion concerning FIGS. 2a and FIGS. 3a through 3c.

The line and packet aggregation layers 202, 205 respectively perform the line aggregation 102 and packet aggregation layer 105 functionality as discussed back in FIG. 1. These layers 202, 205 are used to provide reliable transportation of a packet between customer equipment 207c,d,e and system 200. Once the packet aggregation layer 205 deems an input packet as reliable, the input packet is ready to be processed by the networking/transport layer 206. As discussed in the background, networking/transport layer 206 is used to: 1) effectively identify the networking node that an input packet should be transmitted over when it leaves the system 100 as an output packet; and 2) treat the input packet consistently with the SLA (or other service description) applicable to that packet.

For example, if a user attempts to send a packet from system 207c into the service provider network 240, the networking/transport layer 206 recognizes that the user's input packet should next be sent, as an output packet, along line 210. The networking/transport layer 206 also performs rate and priority functions on that packet. As another example, if a packet is sent to system 207c from service provider network 240, the networking/transport layer 206 identifies that the input packet from line 210 should next be sent, as an output packet, along line 208c. The networking/transport layer 206 can also perform rate and priority related functionality on the packet.

Figure 3A:
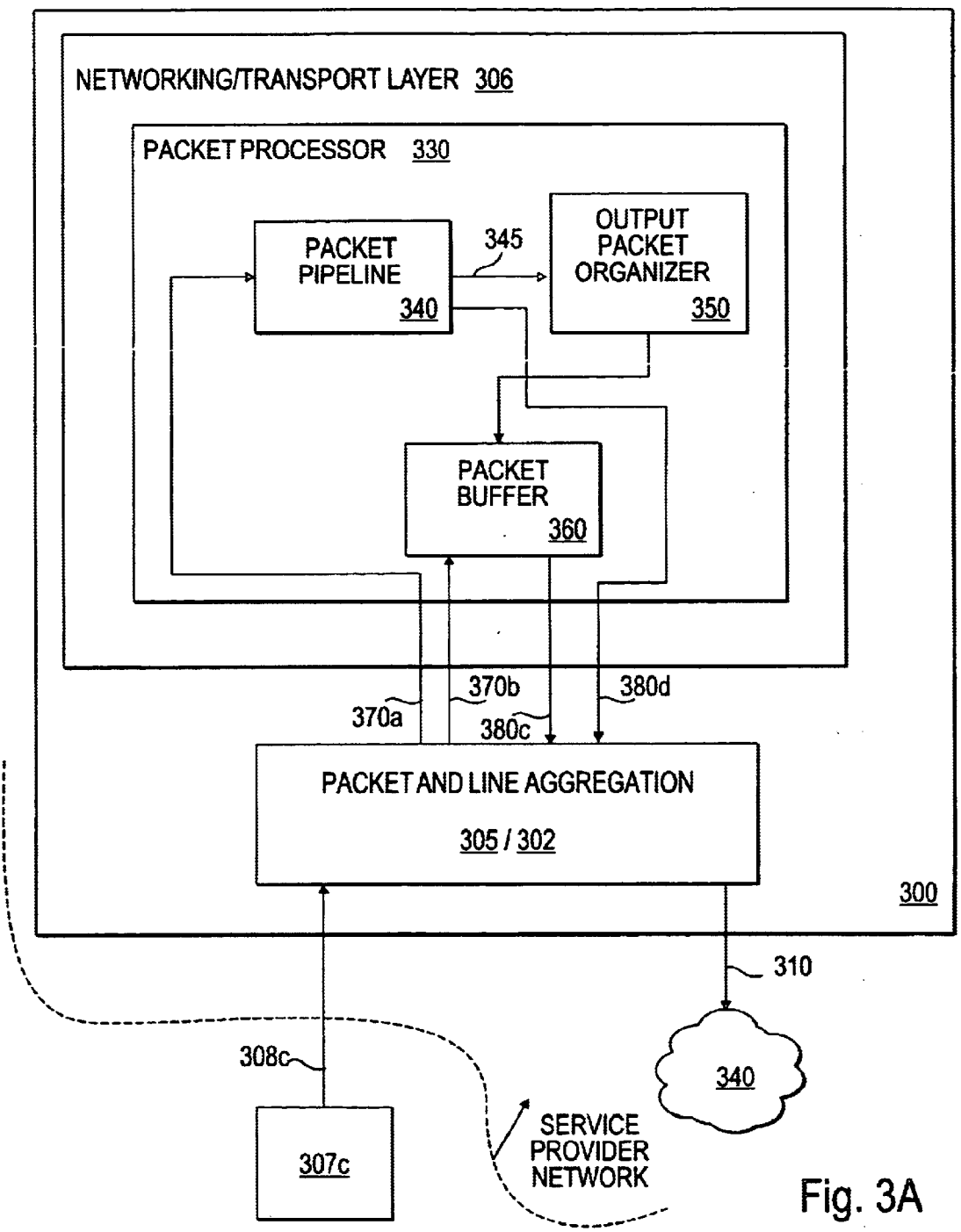
FIGS. 3a through 3c show a networking system having a packet processor pipeline.

Before moving on to FIG. 3a, it is important to note that the system 200 design shown in FIGS. 2a and 2b having line, packet aggregation layers 202, 202b, 205, 205b and a networking/transport layer 206, 206b may be used in many networking environments besides the RN and WAN access point of a network as shown with respect to FIG. 2. For example, the system 200 may be implemented, as is known in the art, in the distribution or core levels of a network. The system 200 may also be used in a local area network (LAN) or a campus backbone. The system 200 may also be used "in the loop" or in other networking implementations designed to provide networking functionality to the home.

Networking/Transport Layers that Support Rate and Priority Functionality

FIG. 3a shows an embodiment of a packet processor 330 within the networking/transport layer 206 of FIG. 2. FIG. 3a is used below to support an introductory discussion on various details of packet processor 330. Referring to FIG. 3a, packet processor 330 has a packet processing pipeline 340, output packet organizer 350 and a packet buffer 360. In various embodiments, packet processing pipeline 340 (also referred to as packet pipeline 340 or pipeline 340) is used to implement rate functions, priority functions and next node identification functions.

In the example of FIG. 3a, packet processing pipeline 340 regulates the input usage rate associated with a user's input packet from line 30c. This may also be referred to as input rate regulation. Note that "input rate regulation", in this case, applies to packets (from a user) that are entering a service provider's network and are screened for compliance as to the user's agreed upon or otherwise expected input rate. Thus input rate regulation, in this case, concerns the treatment of input packets that are leaving user equipment and heading toward a service provider's network.

For various reasons, a service provider may choose to regulate traffic being sent from or to a node within his own network. Thus, a service provider may choose to treat his own equipment, at least in terms of rate usage, as a user. Although a user has been defined any individual, entity, organization, etc. that seeks the user of another; for simplicity, use of the terms "user" should be extended to service provider equipment where a service provider chooses to regulate his own traffic. As such, input and output rate regulation concern screening the rate usage of a user's packet for compliance with an agreed to or to otherwise expected rate.

In the example of FIG. 3a, the operation of pipeline 340 affects when the packet will be removed from networking/transport layer 306 toward service provider network 340. That is, the operation of pipeline 340 will effect when a packet is transferred from packet buffer 360 to packet and line aggregation layers 305/302 for outbound transmission.

This effect may be referred to as an output rate control. Output rate control concerns both the priority of the packet and the bandwidth of the line or port used to carry an output packet. Typically, output rate control is used for packets destined to a service provider's internal line (such as up-link line 310). Packets destined for a line within the service provider's network (i.e., an internal line) in many cases do not need to be regulated. Such packets are therefore processed consistent with the bandwidth of the output port or line used to transport the packet rather than a rate allocated to a particular user destined to receive the packet.

For equal offered loads at the input, higher priority packets as well as packets carried away on higher bandwidth ports or lines tend to be removed from the networking/transport layer 306 comparatively sooner than lower priority packets and packets carried away on low bandwidth ports or lines.

In various packet processing pipeline 340 embodiments applied to the scenario of FIG. 3a, packet processing pipeline 340: 1) performs input rate regulation on an input packet from access line 208c; 2) identifies the next node within network 340 the packet is to be sent to; 3) understands the output rate and priority applicable to the packet in order to properly release it from the networking/transport layer 306; and 4) enters a packet identifier into an output packet organizer 350. Packet processing pipeline output 341 is used to place the packet identifier into the output packet organizer 350.

In various embodiments, a system can be designed to handle situations where the total amount of input traffic exceeds the rate at which the system can process or send output traffic. In order to design such a system, the packet is temporarily stored in a device that holds the packet until resources are available to process the packet or send it from the system. Such a device is signified by packet buffer 360.

Packet processing pipeline 340 may be used to further perform "acceptance/discard" functions. For example, the packet processing pipeline 340 may initiate a process that flushes packets from the packet buffer 360 when a system becomes congested. Packet buffer 360 may also be used to store packets that have exceeded a user's rate for a period of time until release of the packet no longer offends the rate applicable to the user. Pipeline 340 may define this period of time.

Note that phrases such as "performs input rate regulation on an input packet", "enters the packet into an output packet organizer" and the like are chosen for convenience and should not be given a strict literal meaning in the sense that the entire packet is operated on. In many embodiments, only control information associated with a packet (and not its random customer data) are actually processed by the packet processing pipeline 340 and output packet organizer 350.

The information typically processed by packet processing pipeline 340 and entered into output packet organizer 350 is control information not random customer data. For example, information located within the various headers associated with a packet (along with other control information as discussed below) is typically directed to packet processing pipeline 340 from packet aggregation layer 305. Packet aggregation layer 305 is therefore typically designed to extract or copy a packet's header information for presentation to the packet processing pipeline 340.

FIG. 3a symbolically indicates such a scheme by the use of two inputs 370a and 370b to packet processor 330. In the embodiment of FIG. 3a, packet processing pipeline input 370a carries control information to the packet processing pipeline 340 while packet buffer input 370b carries a packet's random customer data to the packet buffer 360.

Packet buffer 360 stores the random customer data associated with packet while packet processing pipeline 340 and output packet organizer 350 operate on control information associated with the stored packet. It is important to note, however, that some designers may choose to store a packet's control information in packet buffer 360 along with its random customer data. Whether and how much control information should be stored along with the random customer data in packet buffer 360 is up to the individual designer. In various embodiments, control information for entry to pipeline 340 is stored into packet buffer 360 prior to its entry to pipeline 340. Such embodiments would include an input (not shown) to pipeline 340 from packet buffer 360.

Toward the output of pipeline 340, the placement of a packet identifier into a specific location within the output packet organizer 350 affects when the packet will be released from packet buffer 360. That is, output packet organizer 350 has locations that correspond or otherwise correlate to the time at which a packet is released from packet buffer 360. A packet identifier is any data structure that refers to (or may be used to refer to) a packet stored in packet buffer 360. An example is a memory pointer that indicates where a packet may be found in a memory device used to implement packet buffer 360.

When a packet identifier within output packet organizer 350 is processed, the release of the associated packet from the packet buffer 360 is triggered. This triggering is represented by release line 362. Release line 362 is any address line, control line or other logic used to release a packet from packet buffer 360. An example includes memory address lines used to s et up a memory read to retrieve the corresponding packet from a packet buffer 360 memory location. Releasing a packet from the packet buffer 360 results in the random customer data associated with the released packet being sent along packet buffer output 380c to a packet aggregation layer 320d for outbound transmission.

Packet pipeline 340 also determines proper control information to be used with or tagged onto a packet as it is leaves system 300 as an output packet. For example, packet pipeline may change the priority label of the packet (e.g., if it's regulated rate was exceeded) that is embedded in the packet's header information. This ability is represented by pipeline output 380d. In other embodiments, the output 380d is directed to packet buffer 360 if a packet's corresponding control information is stored there.

It is important to note that packet buffer 360 may take many different embodiments. It is possible that a series of storage locations are used to implement packet buffer 360. That is, in various embodiments the random customer data may move from location to location (e.g., to different memory locations, registers or queues) during the processing of control information by the packet processing pipeline 340 and output packet organizer 350 for the packet associated with the random customer data. Various control, addressing or other logic signals may be used to move the random customer data from storage location to storage location. The one or more storage locations that make up packet buffer 360 may be in many different places within a system as well. For example, storage locations may be placed on adapter cards and/or central switching cards.

Figure 3C:
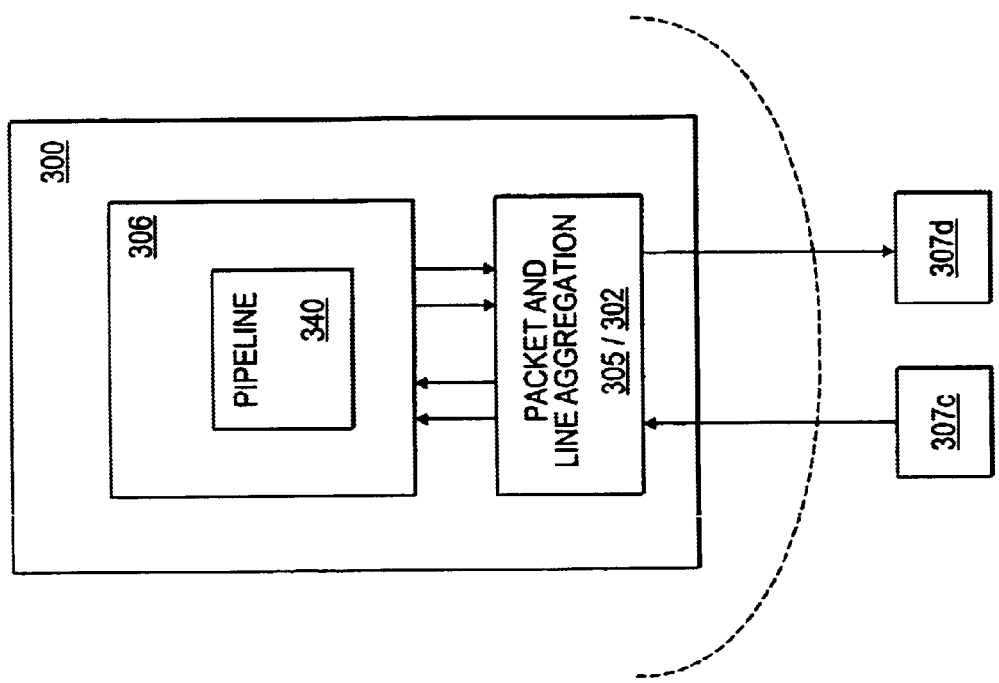
Figure 3B:
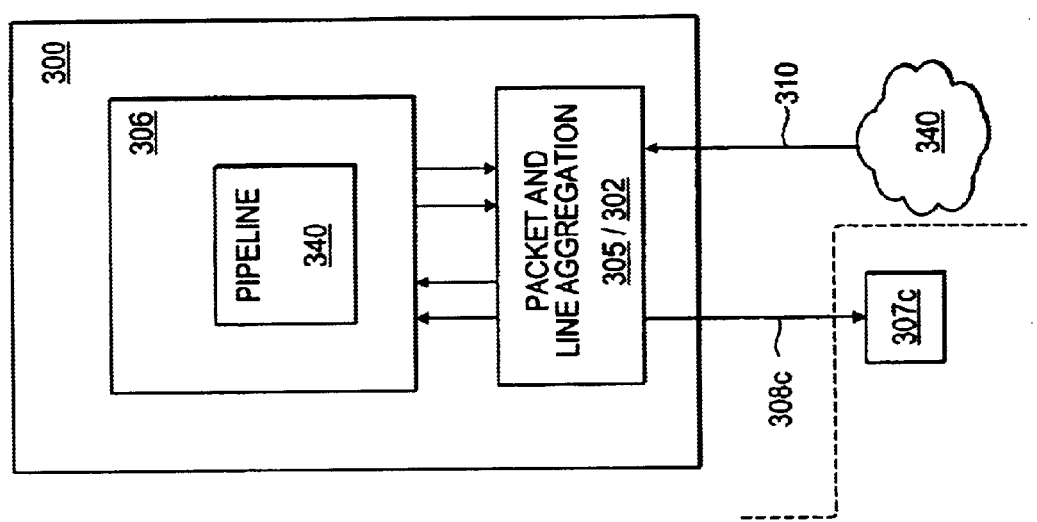

FIGS. 3a through 3c show three different applications that packet processing pipeline 340 can support. The pipeline 340 can support other applications as well. Note that the numbers used in FIGS. 3a through 3c correspond to the numbers used in FIG. 2a. FIG. 2a shows an embodiment of a system 200 having a networking/transport layer 206 where the system 200 is incorporated as an access node in a network. The system 300 in FIGS. 3a through 3c is meant to correspond to the system 200 of FIG. 2a for the discussion of the following example.

The system 200 of FIG. 2a has at least three traffic paths: 1) from an access line to an up-link line (e.g., access line 208c to up-link line 210); 2) from an up-link line to an access line (e.g., up-link line 210 to access line 208c); and 3) from an access line to an access line (e.g., from access line 208c to access line 208d). FIGS. 3a through 3c correspond to these three path possibilities, respectively. In FIG. 3a, packet processing pipeline 340 performs input rate regulation on an incoming packet from system 307c before it heads toward up-link 310. In FIG. 3b, packet processing pipeline 340 performs output rate regulation on a packet from up link 310 before it heads to system 307c. In FIG. 3c, packet processing pipeline 340 performs input rate regulation on an input packet from system 307c and output rate regulation on the packet before it heads toward system 307d. The packet processing pipeline also performs next node identification in all three cases.

A distinction should be drawn between "output rate control" and "output rate regulation." Output rate control, as discussed, concerns the activity of the pipeline 340 related to placing a packet identifier into an output packet organizer 350 location that is consistent with the priority of the packet and the bandwidth of the line or port used to transmit the packet from the packet buffer 360.

Output rate regulation concern placing a packet identifier into an output packet organizer 350 location that is consistent with the agreed to or expected output rate for a particular user. Thus, output packets destined to an up-link line typically concern output rate control, while output packets destined to a user concern output rate regulation.

Pipeline Control Label

Figure 4:
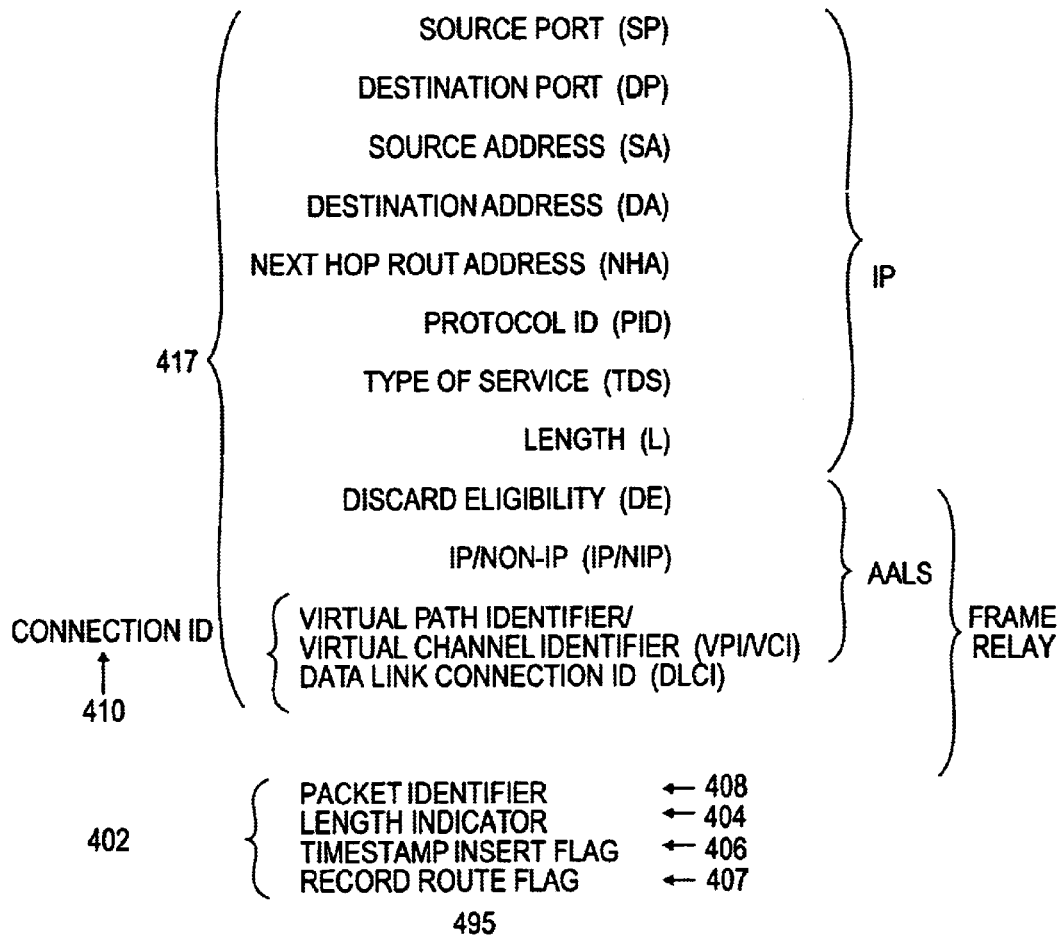
FIG. 4 an embodiment of a control label.

As discussed with reference to FIGS. 1 and 2, the packet aggregation layer 105, 205 performs packet aggregation. The packet aggregation layer 105, 205 also presents (directly or indirectly) control information to the packet processing pipeline and stores packets into the packet buffer memory. FIG. 4 shows one embodiment of control information 495 that is passed from the packet aggregation layer to the packet processing pipeline.

The control information 495, which may also be referred to as a pipeline control label 495 is modified and/or updated as a packet is effectively processed by the packet processing pipeline. Note that this information includes information 417 located within the various headers associated with the input packet, as well as information 402 that is calculated by the packet aggregation layer as well. This calculated control information 402 may be referred to as a control header.

The embodiment 495 of FIG. 4 may be used for an Internet Protocol version 4 (IPv4) application or other applications as well. As shown in FIG. 4, the header information 417 may at least partially include: 1) Source Port Address (SP); 2) Destination Port Address (DP); 3) Source Address (SA); 4) Destination Address (DA); 5) Next Hop Route Address (NHA); 6) Protocol ID (PID); 7) Type of Service (TOS); and 8) Length (L). The relevance of the header based information 417 is apparent to those who practice in the art. The calculated control information 402, in the embodiment of FIG. 4, includes a packet identifier 408, a length indicator 404 (also referred to as packet size), a time stamp insert flag 406 and a record route flag 407.

The packet identifier 408 indicates where a packet is located in the packet buffer memory. As discussed previously, the pipeline eventually stores packet identifier 408 into an output packet organizer location. In various embodiments, packets may be stored as "link lists" of ATM cells or other forms of a packet fragment. Storing a packet as a link list involves storing a small piece of the packet into a memory along with a data value that corresponds to a memory pointer where the next small piece of the packet is found. Since ATM technology employs cells to break packets into smaller pieces, in various ATM related embodiments, each small piece of the packet stored at a memory location may correspond to one or more cell.

For example, if thirty ATM cells are needed to transport a packet, thirty packet buffer memory locations may be used to individually store each of the thirty cells. In such a link list embodiment, since each memory location also has a pointer to the next cell (along with a cell), packet identifier 408 need only have a memory pointer to the first cell used to carry the packet. In such embodiments, the packet aggregation layer is responsible for calculating the memory pointer to the first cell.

The length indicator 404 indicates how large the packet is. A user's rate consumption is at least partially measured by the size of the input packet. In order to facilitate the pipeline's rate regulation function(s), the packet aggregation layer in the embodiment of FIG. 4 presents the packet processing pipeline with an indication 404 of the size of the packet. The corresponding units may vary from embodiment to embodiment. For example, some embodiments may choose to present Length Indicator 404 as a number of cells. Others, again as an example, may choose to present Length Indicator as a number of bytes. In another embodiment it is measured as a number of buffers.

The Connection ID 410 indicates which line or connection the input packet arrived in on. Thus, the Connection ID 410 frequently has information within a packet's header such as DLCI (for Frame Relay), VPI/VCI (for ATM based transportation such as AAL5 or AAL0), or MAC Address (for ethernet or other 802.x or IEEE based transportation). Other similar information can also be used. An address or other identifier used only internal to the system may also be used to for the Connection ID 410. In such embodiments, the Connection ID may be more properly regarded as within the calculated control information 402.

A use of the Connection ID 410 is to understand whether an input packet is arriving from a user for entry to the service provider's network; or from the service provider on an internal line. As discussed surrounding FIGS. 3a through 3c, packets arriving from the service provider, such as from up link line 310 are not usually subjected to input rate regulation. Thus, in many cases, the Connection ID 410 is used to help determine which input packets input rate regulation should be applied to and which input packets input rate regulation should not be applied to.

The Timestamp Insert Flag 406 indicates a need to timestamp the packet when it is transmitted to the next hop. This is used to address the route/timestamp record option in the IP header. The record route flag indicates a need to record the node's IP address in the outgoing packet. This is used to address the route record option in the IP header.

Packet Processing Pipelines that Support Rate and Priority Functionality

Figure 5A:
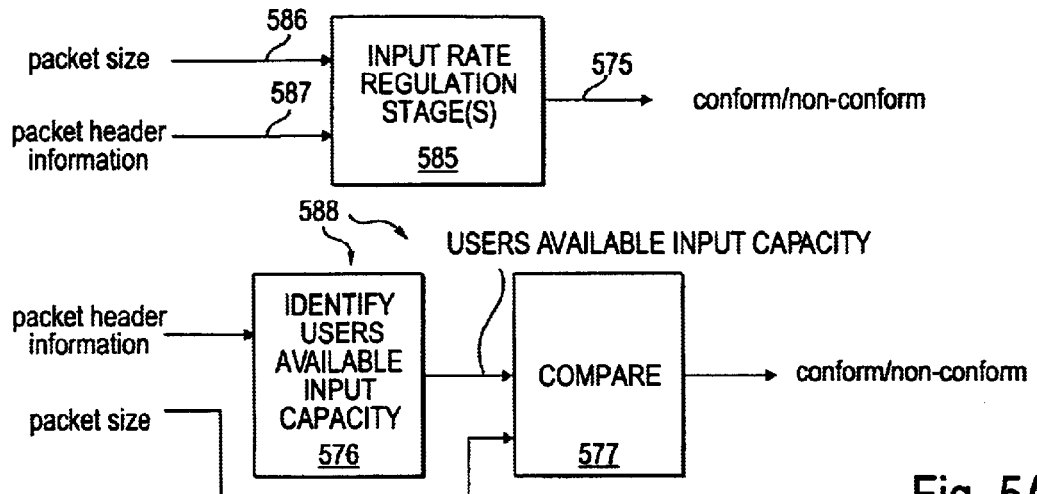
FIG. 5a an input rate regulation apparatus and method.
Figure 5B:
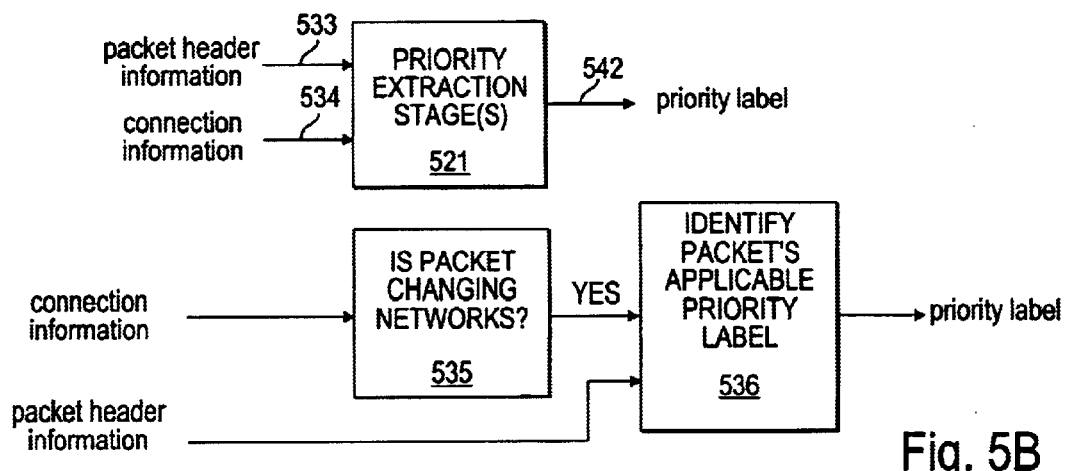
FIG. 5b shows a priority extraction apparatus and method.
Figure 5C:
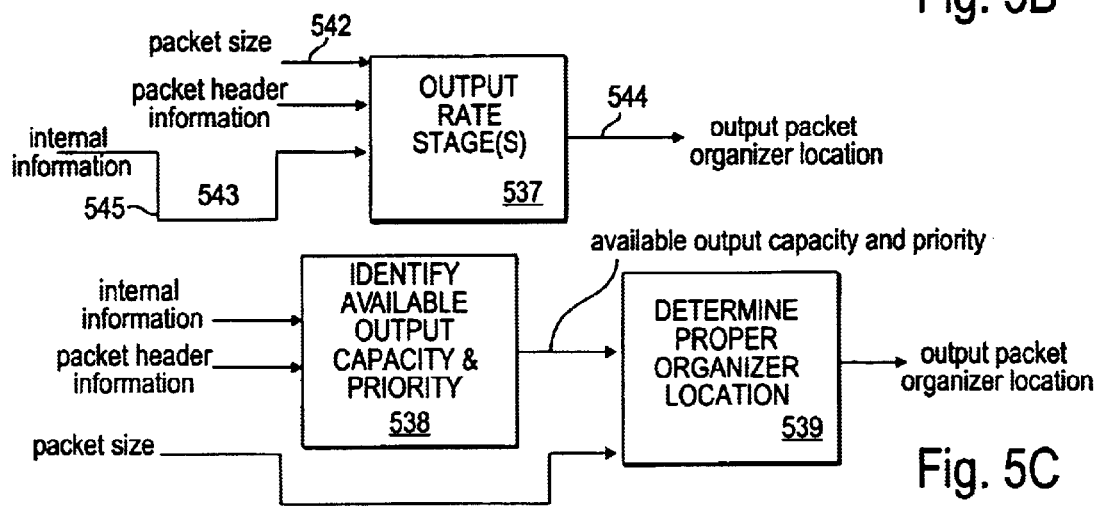
FIG. 5c shows an output rate control and regulation apparatus and method.
Figure 5D:
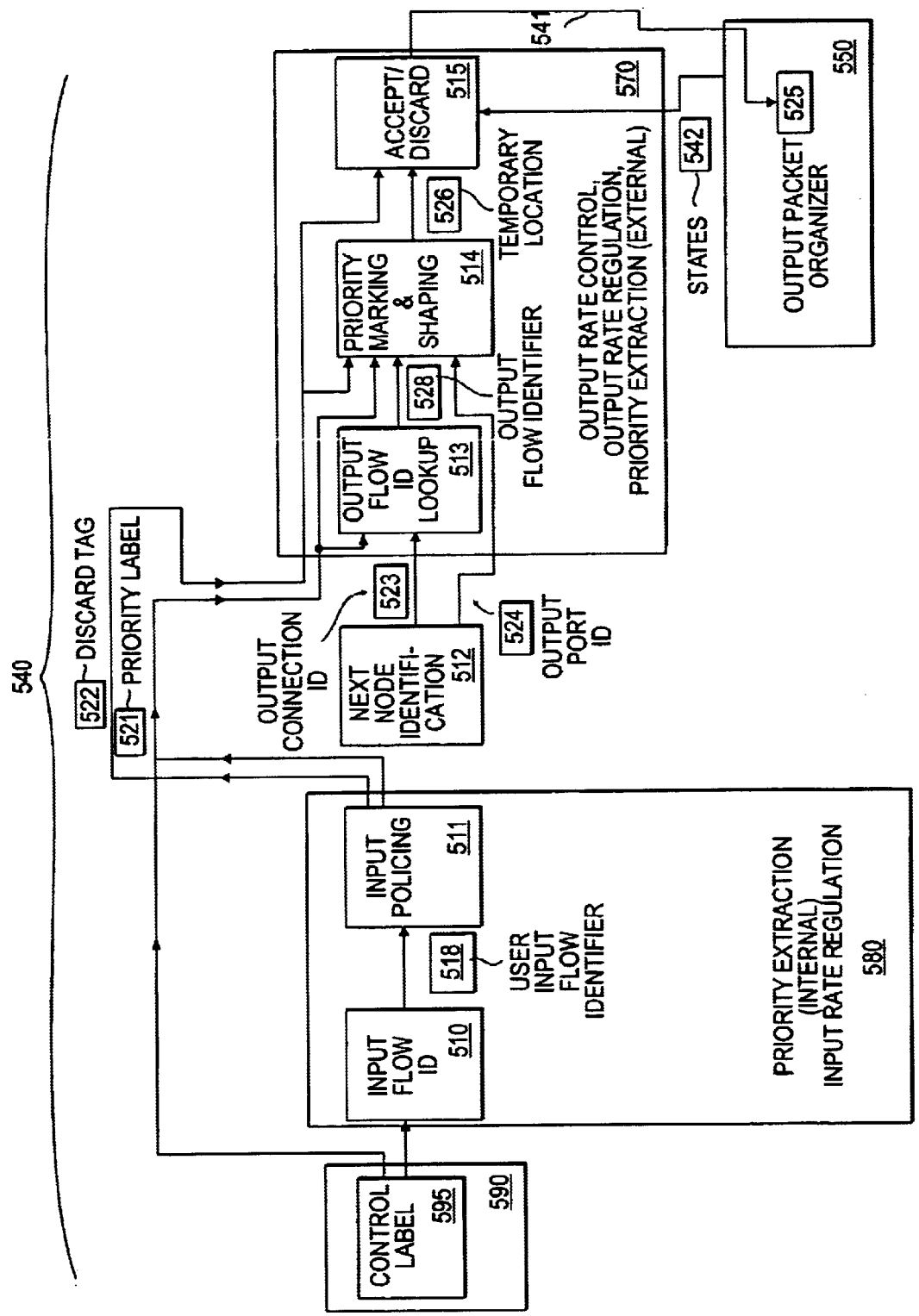
FIG. 5d shows an embodiment of a packet processor pipeline.

FIG. 5d shows an embodiment 540 of a packet processing pipeline, such as the packet processing pipeline 340 of FIG. 3. A packet processing pipeline 540 is a sequence of stages where various stages are tailored to implement networking related tasks on a packet. Such stages may be referred to as networking stages. Each networking stage is devoted to implementing a portion of the overall processing that a packet can be subjected to in being converted from an input packet to an output packet.

The order or sequence of the networking stages within a pipeline (which may now be referred to as stages for simplicity) correspond to the order or sequence in which operations are performed on a packet. For example, the packet processing pipeline embodiment 540 of FIG. 5d has six stages: 1) an Input Flow ID stage 510; 2) an Input Policing stage 511; 3) a Next Node Identification stage 512; 4) an Output Flow ID stage 513; 5) a Priority Marking and Shaping stage 514; and 6) an Accept Discard Stage 515. Packets that are processed by the pipeline 540 of FIG. 5d are processed from left to right. For example, the Next Node Identification stage 512 operates on a packet after the Input Policing Stage 511 but before the Output Flow ID stage 513 operate on that same packet.

As mentioned above, each stage 510 through 515, is devoted to implementing a portion of the overall processing a packet can be subjected to. However, as partially shown in FIGS. 5a through 5c, the overall processing may be viewed as five basic processes: 1) input rate regulation, 2) priority extraction, 3) next node identification, 4) output rate regulation and 5) output rate control. As discussed below, output rate regulation applies to packets destined for a user while output rate control applies to packets destined for a non-regulated line or port internal to the service provider. Some of these processes have already discussed with reference to FIGS. 3a through 3c. They are discussed again here for convenience.

Input rate regulation, shown in FIG. 5a, concerns the receiving of a packet (from a user) by the service provider, consistent with the user's allocated input rate. Thus, input rate regulation is used to regulate or otherwise affect the rate at which packets are sent by a user into the service provider's network (consistent with the user's agreed to or expected input rate). For example, packets that exceed their user's allocated rate may be tagged for discard from the system (i.e., dropped by the service provider). Note that packets from an up link line (such uplink line 310 of FIG. 3) typically do not require input rate regulation since these packets are sent by the service provider himself rather than a user. However, as discussed previously, service provider's may choose to regulate their internal traffic.

As shown in FIG. 5a, input rate regulation logic 585 can accept as inputs the packet's size 586 and information 587 within the packet's header. This information 586, 587 is used to determine whether or not the user's packet conforms to the user's allocated input rate. The regulation logic output 575 indicates whether or not the packet so conforms. The process executed 588 by the input rate regulation logic 585 can use the packet's header information to identify the amount of input capacity the user has available 576 for his packet and then compare 577 the user's available capacity against the size of the packet. Note that some networking technologies may include packet size information in the packet's header information.

Priority extraction involves the marking of a priority label to a packet. A packet is marked with a priority label in order to affect a packet's delay in a network. Before the priority assignment occurs, however, in many cases a priority label must first be extracted. High priority labels typically result in the packet experiencing modest delay while low priority labels typically result in the packet experiencing more than modest delay. The priority label attached to a packet should be consistent with an SLA or other description used to characterize the delay the packet should experience. An example of a priority label is the TOS parameter used for IPv4 differentiated services.

A packet's priority label may need to be changed if it leaves one network to enter another network. For example, when a packet is sent from a user to a service provider, the packet changes networks from the user's network to the service provider's network. Furthermore, a packet changes networks from the service provider's network to the user's network when a service provider sends a packet to a user.

Priority extraction involves identifying a priority label 542 that may be used for the packet as it heads into another network. As shown in FIG. 5b, priority extraction logic 521 can have inputs 533, 534 that correspond to the packet header information and the line the packet came into the system on or will be leaving the system on.

Under typical cases, if a packet is sent to the pipeline from a user, the packet is changing networks to the service provider's network. The priority extraction stage(s) uses the connection information 534 to determine 535 if the packet was sent from a user. If so, a priority label for use within the service provider's network should be identified 536 with the aid of the packet's header information (e.g., from a table look up). This process may be referred to as internal priority extraction.

Under typical cases, if a packet is sent to a user from the pipeline, the packet is changing networks to the user's network. The priority extraction stage(s) uses the connection information 534 to determine 535 if the packet is being sent to a user. If so, a priority label for use within the user's network should be identified 536 (e.g., from a table look up). This process may be referred to as external priority extraction. Note that connection information may be within the packet header information for various network technology embodiments.

Next Node Identification concerns identifying, in some manner, the next node a packet is to be sent. This may be done by various ways known in the art such as identifying a particular line (e.g., line 101a in FIG. 1) or connection (e.g., DLCI connection for Frame Relay or VPI/VCI connection for ATM) on a line that the packet is properly destined for.

Output rate regulation concerns the sending of a packet (to a user) from the service provider's network consistent with the user's allocated output rate and priority. Thus, output rate regulation is used to regulate or otherwise affect the rate at which packets are sent by a service provider consistent with the user's agreed to or expected output rate. Again however, service provider's may choose to regulate their internal traffic.

Referring back to FIG. 3, output rate regulation also concerns the placement of a packet identifier into an output packet organizer 350 location consistent with the priority of the packet and the user's agreed to or expected output rate.

In many cases, since multiple users share the same line or port, output rate regulation involves throttling back the rate at which packets are sent to a user to something less than the full bandwidth of the line or port that transport the user's packets. For example, a user may agree to accept traffic at a rate of 10 MB/s. If the line used to transport this traffic is capable of sending packets at a rate of 155 MB/s, the service provider could easily swamp the user with too much traffic (assuming no other users currently share the line). Output rate regulation would be used to throttle back the output rate to the user's 10 MB/s rate.

Output rate control, concerns the placement of a packet identifier into an output packet organizer 350 location consistent with the priority label assigned to the packet and the bandwidth of the line or port used to remove the packet from packet buffer 360. As discussed, output rate control typically involves internal transmissions between the service provider's equipment (such as along up link line 310 to network 340). In such transmissions, output rate regulation is generally not performed since service providers usually send traffic across their network as fast as practicable. Thus, in the example of FIG. 3a, system 300 simply sends traffic to network 340 at the full bandwidth of the up link line 310 without concern for output rate regulation.

Comparing output rate regulation with output rate control, note that both functions involve the placement of a packet identifier-into an output packet organizer 350 location. Output rate regulation and output rate control may be viewed as similar functions with different applied conditions. The condition for output rate regulation is the output rate should not exceed the user's allocated output rate. The condition for output rate control is that the output rate should not exceed the allocated line or port rate. These different conditions may manifest themselves as different input parameters (e.g., an output rate parameter) to the same or similar processing logic.

For example, various combinations of pipeline stages and or pipeline stage designs may be used to place a packet identifier into an output packet organizer location. At some point during the execution of these stages, an output rate parameter is employed. For output rate control, the output rate parameter corresponds to the output rate of a line or port while for output rate regulation, the output rate parameter corresponds to the output rate of a particular user.

This is reflected in FIG. 5c. Since much of the same logic 537 may be used for both output rate regulation and output rate control, the applicable logic 537 uses the packet size, internal information and packet header information as inputs 542, 545, 543 in order to support both processes. Internal information 545 is information used for a packet that is within the service provider's network. Logic 537 uses these inputs 542, 545, 543 to determine the proper output packet organizer location (which is the logic output 544).

Packet header information 543 is used to determine 538 the priority of, and output capacity available to, a packet destined for a user. The packet's size is compared against the user's available output capacity and a proper location within the output packet organizer is identified 539.

Internal information 545 is used to determine 538 the priority of, and output capacity available to, a packet destined for a service provider's internal line (such as uplink 310 of FIG. 3). The packet's size is compared against the available output capacity and a proper location within the output packet organizer is identified 539. In some operations, as described ahead, the internal information is embedded within the packet header information.

Before moving on, it is important to note that in some networking applications the up-link line 310 connects to a service provider other than the service provider who is managing system 300. For example, the service provider managing system 300 provides aggregation services to another service provider who is managing network 340. In such a case, the other service provider may be viewed as another user. As such, even though a network topology that implements an up link is being used, output rate regulation may be applied rather than output rate control for packets destined to network 340.

Similarly, in other situations (such as the situation of FIG. 2b) the access line 208c is connected to service provider's equipment 207c (thus, for this discussion, equipment 207c is the service provider's). In a situation such as this, the internal line 208c is treated as a user if the service provider's equipment 208c is acting as a line aggregation unit (or otherwise has no networking transport layer 206 functionality). The internal line 208c may be treated as a typical up link line (e.g., input rate regulation is not performed), however, if the service provider's equipment 207c performs networking/transport layer 206 functions.

A brief discussion of each stage 510 through 515 immediately follows. FIG. 5d represents just one embodiment. Other pipeline embodiments or stage designs that perform the functions discussed above are also possible. As FIG. 5d indicates, control label 595 (which may be the same as the control information 495 shown with respect to FIG. 4) is presented as an input to the pipeline 540. Although not shown in FIG. 5d for simplicity, the control label 595 is made available to all pipeline stages 510515 where needed. Furthermore, the control label 595 can be updated or otherwise altered as the stages perform their various functions.

Input rate regulation and priority extraction are performed by the Input Flow ID stage 510 and Input Policing stage 511 embodiments of FIG. 5d. Input Flow ID stage 510, in the embodiment of FIG. 5d, translates a packet's header information into a memory pointer (referred to as a user input flow identifier 518) that is used to extract "flow" information (discussed in more detail below) applicable to the packet sent by the user. Input Policing stage 511 uses the flow information to determine whether or not the user's packet "conforms" to the user's allocated input rate. This determination, along with other information as to how the packet should be treated based upon this determination is embodied in the Discard Tag 521.

In the embodiment of FIG. 5d, the extracted flow information also has priority information that is used to mark the packets for their transport within the service provider's network. Extraction of such information may be referred to as internal priority extraction. This information is entered into a Priority Label 521. In the case of IP related technology, the Priority Label 521 may be a TOS parameter that is added to the packet header as the packet is formed into an output packet. Priority Label 521 is made available to downstream stages. Note that other priority information associated with the header information within control label 595 (such as the TOS value in the header of the arriving packet) is also added to priority label 521.

Thus the first two stages 510, 511 of the pipeline 540 may be viewed as being responsible for internal priority extraction and input rate regulation. The outputs of these functions, as shown in FIG. 5d, are the Priority Label 521, and the Discard Tag 522.

The control label 595 is updated with these values. FIG. 5d does not indicate this so the functioning of the pipeline can be better understood. However, control label 595 may be viewed as a label that is effectively "passed down" from stage to stage. Each stage may add to or use information within the label 595. When the pipeline is finished with a packet, the control label 595 is then used to properly process and/or form the output packet. Furthermore, as is know in the art of pipelining, the control label 595 may simply sit in a register during pipeline execution.

Next Node Identification stage 512 uses header information associated with control label 595 (such as DA or NHA) to identify, in some manner, the next node the packet is to be sent. This may be done by various ways known in the art such as identifying a particular line (e.g., line 101a in FIG. 1) or connection (e.g., DLCI connection for Frame Relay or VPI/VCI connection for ATM) on a line that the packet is properly destined for. Thus, in various embodiments, a Output Connection ID 523 (which signifies the connection to be used when transporting the packet as an output packet) is the Next Node Identification stage 512 output. The control label 795 is updated with the Output Connection ID so the packet can be directed to the proper connection after it is processed by the pipeline 540. The Output Port ID 524 is used to indicate which output port a packet is destined for.

The remainder of the pipeline is used to implement output rate control or output rate regulation depending upon whether the packet is destined to an un-regulated internal line of the service provider or a user, respectively. As discussed, both functions store a packet identifier into a location 525 within an output packet organizer 550. Both the output rate control and output rate regulation functions accept as inputs the Priority Label 521, the Discard Tag 522 and the Output Port ID 523.

Recall that output rate regulation and output rate control may be viewed as the same function with different applied conditions. These different conditions may manifest themselves as different input parameters (e.g., an output rate parameter) to the same processing logic. In the embodiment of FIG. 5d, the common processing logic is embodied in the Priority Marking and Output Shaping stage 514 (also referred to as Marking/Shaping stage) and the Accept/Discard stage 515. The input parameters that dictate whether output rate control or output rate regulation is performed are provided by the Output Flow ID stage 513.

In the pipeline embodiment of FIG. 5d, the Output Flow ID stage 513 looks up a user output flow identifier 528, based upon the header information within control label 595. Note that this function is analogous to the Input Flow ID stage 510. In the embodiment of FIG. 5d, the Output Flow ID stage 513 performs this look up only if the packet is destined to a user (i.e., only if output regulation is to be performed). The user output flow identifier 528 is used by the Marking/Shaping stage 514 to extract output flow information that contains parameters used by stages 514, 515 to understand the output rate and priority applicable to the user's packet. Included is information used to mark the priority of the packet as it is to be sent outside (or external to) the service provider's network. Extraction of this information may be referred to as external priority extraction.

By reference to the Output Connection ID 523, the pipeline understands whether or not the packet is destined for an unregulated up link line of the service provider or destined for a user. In the pipeline embodiment 540 of FIG. 5d, the Output Flow ID stage 513 is not utilized if the Output Connection ID 523 is flagged as being associated with a service provider's unregulated internal line.

In the pipeline embodiment of FIG. 5d, Priority Label 521 and Discard Tag 522 are used by the Priority Marking and Shaping stage 514. Recall again that the control label 595 is effectively passed to stage 514 which pulls these parameters from the label. This stage 514 performs two functions: 1) formally defines (or marks) the priority label that will be entered into the packet header when the packet is formed into an output packet; and 2) determines a temporary location 526 that corresponds to the output packet organizer location 525 a packet identifier should be entered into in order to comply with the packet's applicable priority and rate. Priority Label 521 is used as an input for the former function. The Discard Tag 522 is used as an input for the later function. If the Discard Tag 522 indicates the packet should be discarded, no temporary location 526 needs to be determined.

The Accept/Discard stage 515 stores a packet identifier (408 of FIG. 4) into an output packet organizer location 525. The Accept/Discard stage 515 accepts the temporary location 26 and compares it against the congestion that exists within the output packet organizer 550. If no congestion exists, the temporary location 526 value is used to define output packet identifier location 525. If congestion exists, the Accept/Discard stage 515 may attempt to find other suitable locations within the output packet organizer 550 and/or considers discarding the packet. The Discard Tag 522 may also be used as an input to the Accept/Discard stage 515.

Thus the last three stages 513, 514, 515 of the pipeline embodiment 540 of FIG. 5d may be viewed as being responsible for either output rate control or output rate regulation, depending on the Output Connection ID 523 value (or Output Port ID 524). The outputs of either of these functions is the placement of a packet identifier into an output packet identifier location 525 or a discarded packet. Thus the combination of stages 513, 514, 515 may be collectively viewed as a series of output rate stages 570. Also note that the combination of stages 510, 511 may collectively viewed as a series of input rate stages 580.

Consistent with the fact that packets may be processed in various operational sequences, the order of the various stages 510 through 515 may be "rearranged" from packet processing pipeline embodiment to packet processing pipeline embodiment. For example, the next node identification stage 512 may precede the Input Flow ID stage 510 or come after the Accept/Discard stage 515. Other stage designs or sequences that implement input rate regulation, priority extraction, next node identification, output rate control and output rate regulation are possible as well. Also, other pipeline embodiments are possible that support only one type of output processing (such as only output rate control or only output rate regulation).

Furthermore, consistent with the "pipelining" concept of using stages to perform portions of an overall process, in order to improve system throughput, the packet processing pipeline embodiment 540 is designed to operate on different packets simultaneously. For example, while a first packet is being processed by the Next Node Identification stage 512, a second packet is being processed by the Input Policing stage 511 and a third packet is being processed by the Input Flow ID stage 510. If the packet processing pipeline 540 is further resolved into smaller stages, as may be done in various embodiments, more packets may be processed simultaneously.

FIG. 6 indicates that in various cases, not every stage is necessarily used for every packet. As an example, FIG. 6 shows utilization of the packet processing pipeline embodiment 540 of FIG. 5d for the different packet processing pipeline applications shown with respect to FIGS. 3a through 3c. Recall that FIG. 3a related to a user sending a packet from his location to the service provider's network 340. As such, the user's packet corresponds to an input packet from an access network access line and an output packet on an up-link line.

Such a packet may be processed by the packet processing pipeline 540 as indicated in FIG. 6a. In this situation, input rate regulation, next node identification and output rate control are applicable. Thus, as indicated by the "Xs", all stages except for the Output Flow ID stage 513 are utilized. For the situation of FIG. 3b, the stage utilization is shown in FIG. 6b. In FIG. 3b, the packet arrives from an up link line 310 and is sent to a user; thus, input rate regulation is not applicable but output rate regulation is applicable. Thus the Input Flow ID and Input Policing stages 510, 511 are not utilized. In the situation of FIG. 3c, all stages are utilized as shown in FIG. 6c.

Finally, in a situation where an input packet is sent from an internal node within the service provider's network (e.g., from customer premise equipment that is leased from the service provider which has already performed input rate regulation), and the packet is destined for an up link line deeper into the service provider's network; the pipeline does not perform input rate regulation or output rate regulation but does not perform output rate control (unless the user configures his internal lines for regulation). Thus the Input Flow ID, Input Policing and Output Flow ID stages 510, 511, 513 are not utilized as shown in FIG. 6d.

The following is a more detailed discussion of each of the six stages 510–515. FIGS. 7 through 10 address operation and structure embodiments of the Input Flow ID 510, Input Policing Stages 511 and Next Node Identification 512 stages. FIGS. 11 through 18 address operation and structure embodiments of the Output Flow ID 513, Priority Marking and Shaping 514 and Accept/Discard 515 stages.

Input Rate Regulation and Priority Extraction

Figure 7A:
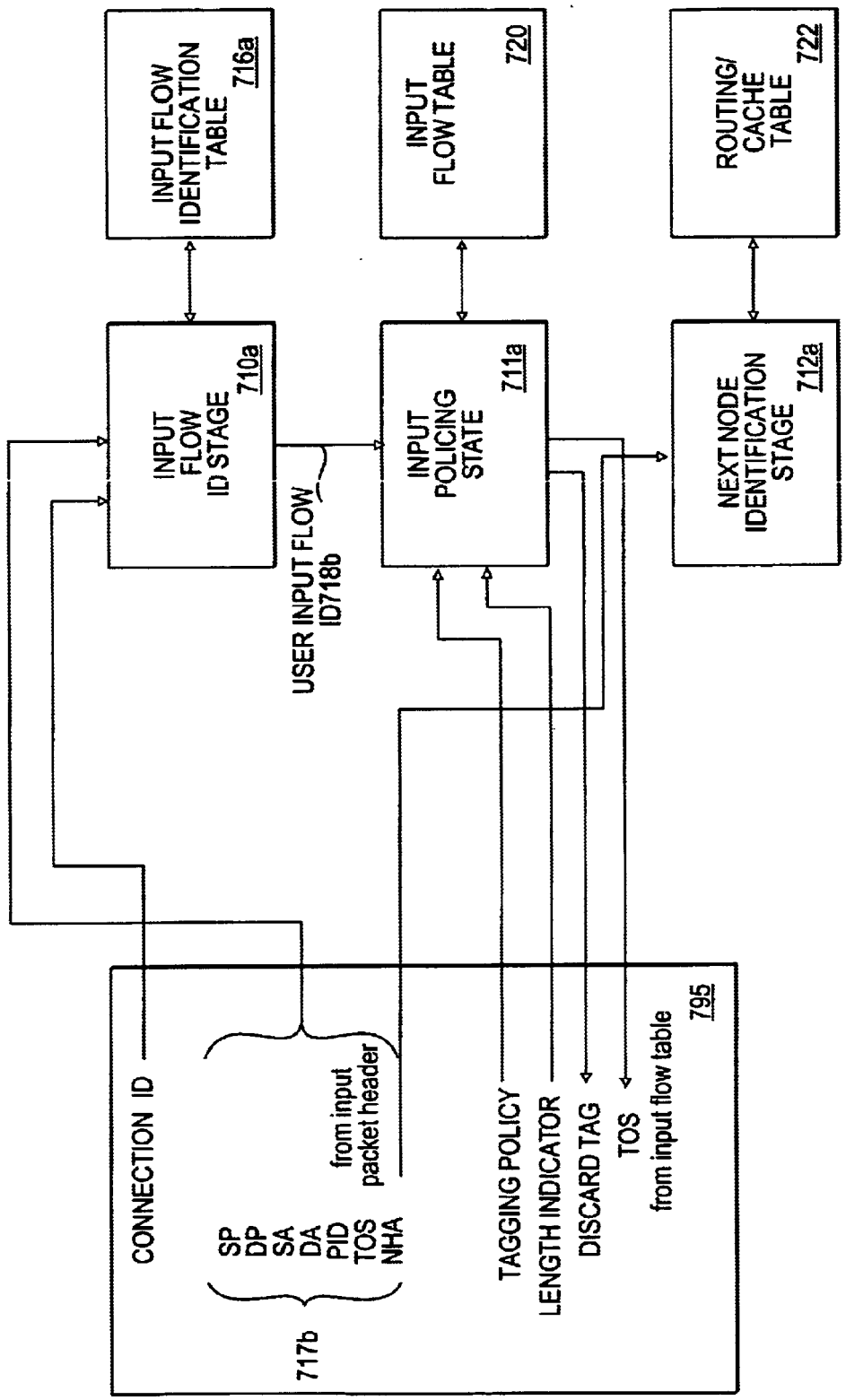
FIG. 7a shows the packet processor pipeline embodiment of FIG. 5d in more detail.
Figure 7B:
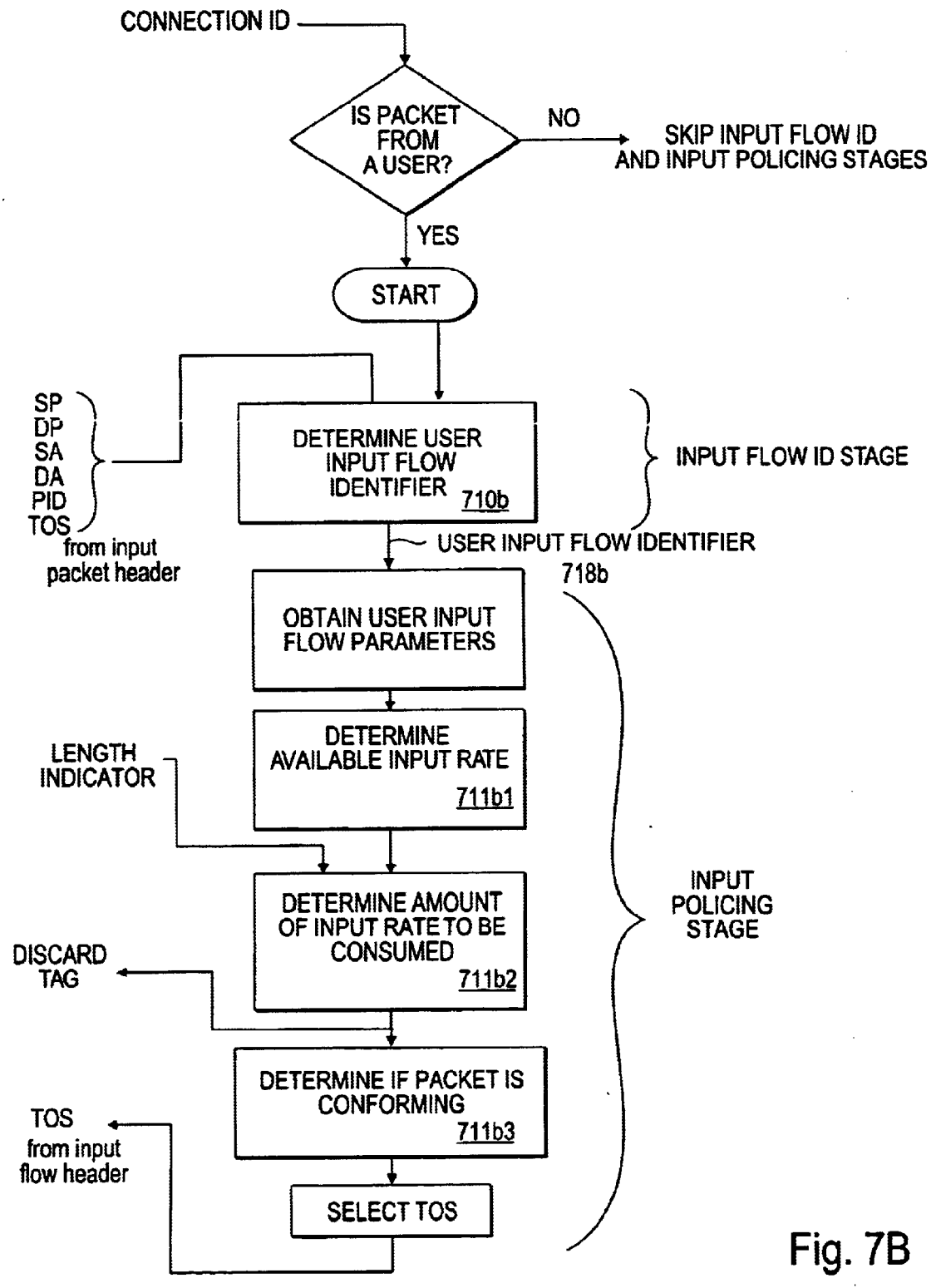

The input to the packet processor pipeline is a pipeline control label (also referred to as a control label), such as control label 495 of FIG. 4. Recall that control label 495 contains information 417 extracted from a packet's various headers. As shown in FIGS. 7a and 7b, header information 717b corresponds to information within that portion 417 of the control label 495 of FIG. 4. However, for simplicity, Layer 2 header information (such as the Frame Relay and ATM information) has been removed.

It is useful to note, referring back to FIG. 3a, that in order to support many different packet processing treatments, the packet aggregation layer 305 may be designed to look for and supply a "standard" collection of control information within the pipeline control label 595 (of FIG. 5d). That is, the packet aggregation layer 305 may present the packet processing pipeline 340 with the same pipeline control label structure for every input packet, regardless of how much (or how little) of that information is actually needed to process the input packet associated with the control information. This reduces the complexity of the design, resulting in many cases to better pipeline performance.

Furthermore, various packet aggregation layer 305 embodiments may present the packet processing pipeline with control information that is or may be used in later stages. For example, the next node identification 512 needs access to the Destination Address (DA, for traditional routing) or Next Hop Address (NHA, for next hop related routing). Presenting all control information that may be needed by later stages at once within pipeline control label 595 removes additional fetches or loading by the packet processing pipeline. Thus, in many pipeline control label embodiments, the register 590 or other storage device holding the pipeline control label 595 is designed to be available to each stage that may need access to the pipeline control label 595.

Furthermore, as discussed, the content of the pipeline control label 595 may be modified as each stage performs its dedicated processing. That is, consistent with pipelining approaches, for any stage, information within control label 595 may be used as an input, afterwhich the stage performs some processing. Then, information is written back to control label 595. In various figures, where information from a prior stage is used by the following stage, the information is drawn as a direct input to the following stage. It is to be understood that this information may be written to the control label and then read by the following stage.

Thus, various parameters may be added, removed and/or replaced to the content listed in the pipeline control label 495 of FIG. 4. Also, again in order to enhance the performance of the packet processing pipeline, the pipeline control label 595 may be directly loaded into a memory space or register 790 that is embedded within the same semiconductor chip that implements the packet processing pipeline.

As shown in FIGS. 7a and 7b, the Input Flow ID stage 710a uses the Connection ID (410 of FIG. 4) to determine if the input packet is arriving from an internal line not requiring regulation or a user. If the packet is arriving from a user input rate regulation is performed. If the packet is arriving from an internal line not requiring regulation input rate regulation is not performed and the Input Flow ID 710a and Input Policing 711a stages are not utilized.

If input rate regulation is to be performed, the following discussion applies. As is known in the art, header information 717b relates to the user, his destination and/or his particular packet (such as the header parameters: DP, SP, SA, DA, TOS and Protocol ID). The header information 717b is used by the Input Flow ID stage 710a to identify where information pertaining to the particular treatment that the packet deserves may be found. The embodiment of this identification, may be referred to as user input flow identifier 718b (discussed in more detail below). Thus, in the case of packets undergoing input rate regulation (such as the cases of FIGS. 3a and 3c), the Input Flow ID lookup stage 710a employs header information 717b (from the pipeline control label register 790) to determine a user input flow identifier 718b.

A user input flow identifier 718b is used to obtain input rate regulation parameters that apply to a particular user's packet. A collection of input rate regulation parameters, along with information related to the priority of the packet, may be referred to as an input flow. Thus, in this and other embodiments, a user input flow is a combination of rate regulation and priority parameters used to process a particular input packet from a particular user. Note that one type of flow may apply to more than one user input flow. For example, two different users may have their packets processed according to identical contractual terms by the service provider and, as such, one type of flow may be used to process packets from the two different users. However, since the service provider typically handles users individually, each user is provided his own copy of the flow type which is then maintained and understood by the service provider's system on an individual, user by user, basis.

Note that since a single user may desire different service performance for his packets, based on various distinctions between the user's packets (commonly referred to as differentiated services), different user input flows (and user output flows which are discussed later) may be used to specially process each of the user's different traffic classes. For example, a user may have two classes of data service (e.g., personal use and business use) with each class having different input rates and priority levels of service. A separate user input flow could be designated for each class. As another example, a user may have all of his traffic headed for a particular destination serviced according to one input rate and one priority level (and all other traffic serviced according to a different input rate and priority level). Again, separate user input flows could be used to process the packets according to their respective class of service.

Figure 8:
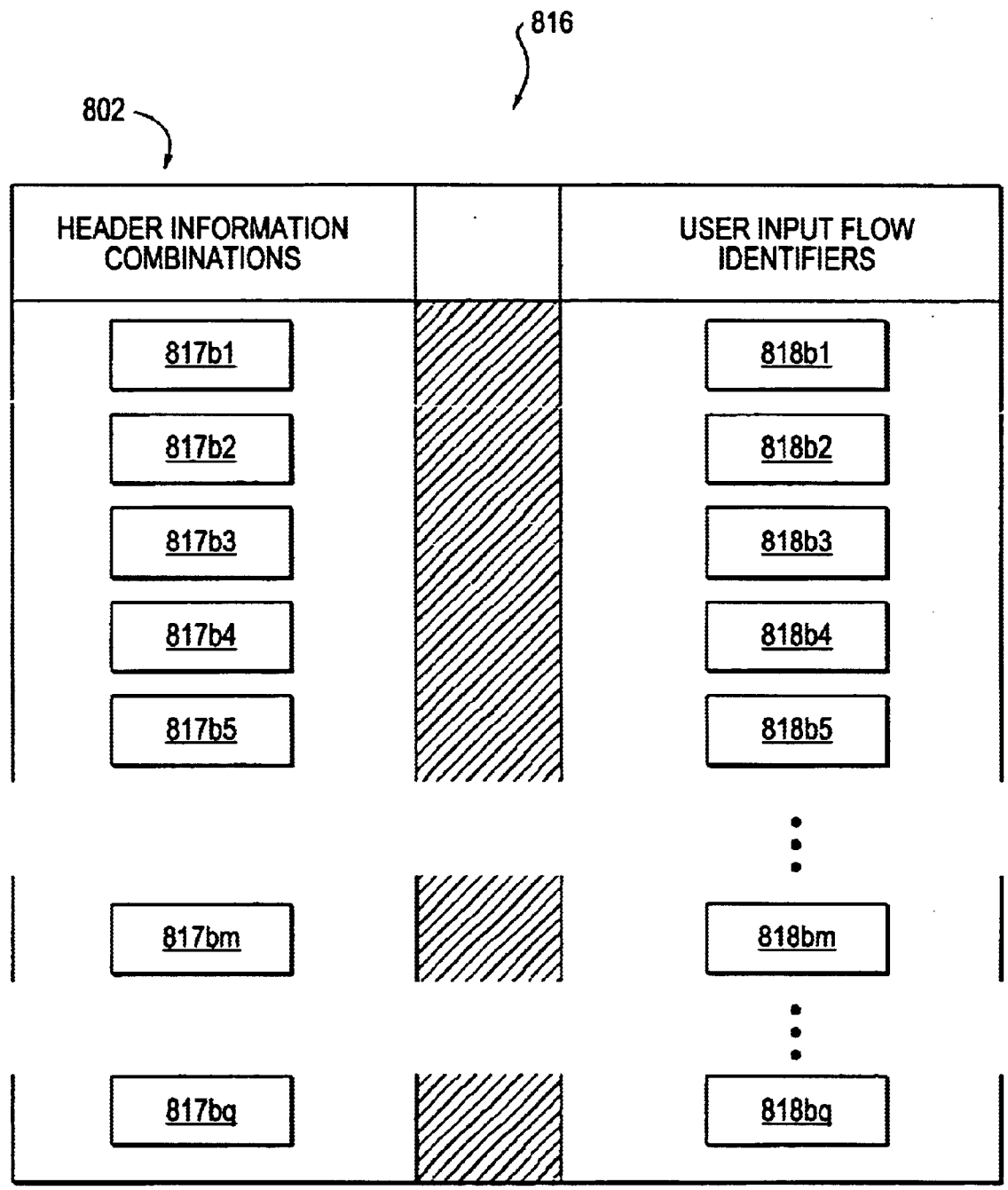
FIG. 8 shows an embodiment of an input flow identification table.

In the embodiment represented by FIGS. 7a and 7b, the Input Flow ID stage 710a uses a table 716a (referred to as an input flow identification table 716a) to translate the header information 717b into a user input flow identifier 718b. An embodiment 816 of the input flow identification table 716a of FIG. 7a is shown in FIG. 8. Each user input flow identifier $818b_{1-q}$ is a data structure used to identify the particular user input flow applicable to an input packet. For example, in various embodiments each user input flow identifier $818b_{1-q}$ is a memory pointer used to extract, from another table associated with the Input Policing stage 711a (discussed below), the specific input rate regulation and prioritization parameters (associated with the particular user input flow) applied upon the input packet.

Logic associated with the input flow identification table 816 and/or look up stage 710a effectively screens the header information 717b against the left hand column 802 of the input flow identification table 816 for a match (e.g., at unique combination $817b_m$) in order to locate the applicable user input flow identifier (e.g., user input flow identifier $818b_m$). Each unique combination $817b_{1-q}$ corresponds to a unique combination of header information 717b from an input packet that the service provides is configured to recognize.

Since tables allow for flexible system configuration, user input flows may be based on an assortment of header information combinations. For example flows may be based, in whole or in part, on their source. In embodiments that employ IP, any of the unique combinations $817b_{1-q}$ may include source information such as the Source Address (SA) and/or the Source Port address (SP). Some input flows may be based in whole or in part upon their destination. For example, a service provider may want to provide better service for traffic heading to (as opposed to emanating from) a particular host. Thus, any of the various unique combinations $817b_{1-q}$ may contain the Destination Address (DA) and/or the Destination Port address (DP). Also, IP based user input flows may be defined, in whole or in part, by the Type of Service (TOS) parameter associated with the IP layer header and/or Protocol Id (PID) parameter. As is known in the art, the TOS parameter allows for prioritization of traffic for Layer 3 services and the Protocol Id (PID) parameter identifies the IP protocol applicable to that packet.

Although many user input flow identifiers $818_{1-q}$ may be recognized by a combination of more than one header parameter, it is possible that a user input flow identifier may be recognized by a single header parameter. Thus, use of the term "combination" should not be construed to exclude user input flows identified by a single header parameter. In various embodiments, the list of user input flow identifiers $818_{1-q}$ may represent all of the user input flows a system currently supports. Network configuration/maintenance software running on a separate processor core (such as, embedded processor(s) or microprocessor(s) coupled to input flow identification table 816) may be used to update the input flow identification table 816 accordingly. In various embodiments, the input flow identification table 816 is updated whenever the service provider's system sets up a connection.

The input flow identification table 816 is typically implemented with a memory. For example, a ternary content addressable memory (TCAM) may be used to readily compare the unique combination of header information for a particular look up. Other embodiments may use Random Access Memory (RAM). The memory may be embedded within or external to the semiconductor device that implements the pipeline.

Note that the packet processing pipeline can be used to support Non IP flows, such as Layer 2 flows. For example, the packet processing pipeline may be used to process input AAL5 packets (carried by ATM cells) without any IP layer overhead. These user input flows may be defined, as is known in the art, by information in a cell header such as the VPI/VCI addresses and/or CLP, GFC, etc. Thus, although not shown in FIG. 7, the standard collection of control information presented in control label 795 also may include information that may be used for Layer 2 services (as shown in FIG. 4). Thus, referring back to FIG. 8, the left hand column 802 of the input flow identification table 816 may be extended to include values used to support Layer 2 flows.

The Input Flow ID stage 710a completes its function for a particular packet when a user input flow identifier 718b, (e.g., $818b_m$) is found for a particular unique combination of the header information $717b$ (e.g., $817b_m$). The user input flow identifier $718b$ is then used as an input to the input policing stage $711a$. Again, register $790$ may be loaded with user input flow identifier $718b$ which is then subsequently read by Input Policy Stage $711a$.

The input policing stage $711a$ is responsible for: 1) determining, in some manner, the rate allocated to the user input flow implicated by the user input flow identifier $718b$; 2) determining $711b_2$, in some manner, the user's rate consumption of the user input flow implicated by the user input flow identifier $718b$; and 3) deciding $711b_3$ in some manner, whether or not the input packet exceeds the user's allocated input rate.

In various embodiments, a bucket scheme (such as token bucket or leaky bucket) may be employed in the input policing stage $711a$. In a leaky bucket scheme, a bucket is used to collect and effectively delay packets so that they may be transmitted from the system as a continuous stream. In leaky bucket schemes, the depth of a bucket corresponds to allocated input capacity. Thus, each user input flow may be provided a bucket having a depth indicative of the rate allocated to the user input flow. Typically, bucket depth is implemented as available memory or FIFO space.

In a token bucket scheme, the available input capacity is represented by a number of tokens, where each token represents a certain amount of available input rate capacity for the user to consume. Tokens have units of data such as bits, bytes, megabytes, etc. As an example, for a system having 20 GB/s of rate capacity, 20,000 tokens representing 1 MB per token may be distributed every second.

In various token bucket scheme embodiments, a user's input flow is effectively provided tokens on a timely basis consistent with the input rate allocated to the input flow. For example, if a particular input flow is allocated a 10 MB/s rate, its corresponding bucket may effectively receive 1 MB tokens at a rate of 10 tokens/sec. If another input flow is allocated a 1 MB/s rate, its corresponding bucket may effectively receive 1 MB tokens at a rate of 1 tokens/sec. Thus, all the various input flows implemented by the system may have corresponding buckets (also referred to as user input flow buckets) that are effectively distributed tokens at a rate consistent with the input rate allocated to the flow. As tokens accumulate at a bucket, the corresponding input flow has that amount of capacity available to it. For example, if bucket has 7 tokens (at 1 MB per token as discussed above), its corresponding input flow has 7 MB of available input capacity to consume.

If an input packet's size (measured in data units such as bits, bytes, megabytes, etc.) is less than the number of corresponding tokens being held by the applicable user input flow bucket associated with the packet, the input flow has enough available capacity to handle the packet. The packet may therefore be deemed a "conforming" packet. A number of tokens corresponding to the size of the packet are then effectively removed from the user input flow bucket, representing the packet's consumption of the flow's allocated input rate. If an input packet's size is greater than the corresponding number of tokens being held by the user input flow bucket associated with the packet, the packet is deemed "non-conforming".

Note that in the above discussion the packet's size is used and a disposition on the packet (e.g., conforming or non-conforming) is taken. Note the content of control label $795$ in FIG. $7$ includes both the Length Indicator and the Discard Tag. Length Indicator, also referred to as the packet size, was first discussed in reference to FIG. $4$ as part of the control header $402$ associated with control label $495$. Length Indicator is calculated by the packet aggregation layer and offered as part of the control information submitted to the packet processor pipeline.

The Discard Tag represents one of the aforementioned modifications that may occur to the control label $795$ during execution of the packet processing pipeline. Specifically, in the embodiment of FIGS. $7a$ and $7b$, the Discard Tag is added to the control label $795$ by the input policing stage $711a$ as part of the conforming/non-conforming disposition on a packet. As such, the Discard Tag may be viewed as an output of the input policing stage $711a$ (as well as an output of the input rate allocation stage $580$).

The Discard Tag is a data structure that indicates the packet's eligibility for discard from the system. In one embodiment, if the Discard Tag value is a logic "00", the packet has been deemed conforming. If the Discard Tag value is "01", the packet has been deemed non-conforming and should be discarded. If the Discard Tag value is "10" the packet has been deemed non-conforming but an effort should be made not to discard the packet (e.g., attempt to enqueue a packet identifier for the packet). Thus the Discard Tag may be used to implement different discard policies for different user input flows. That is, some user input flows may be configured to discard non-complying packets while other user input flows may be configured to attempt to enqueue non-complying packets into the output packet organizer. As will be discussed in more detail with respect to FIG. $9$, in the embodiment of FIGS. $7a$ and $7b$, part of the input rate regulation information associated with a user input flow is a Tagging Policy parameter. The Tagging Policy parameter is used by the input policing stage $711a$ to determine the Discard Tag value.

Recall in the packet processing embodiment of FIGS. $7a$ and $7b$, the user input flow identifier $718b$ is implemented as a memory pointer that is used by the input policing stage $711a$ to look up a user input flow. An embodiment $911$ of the input policing stage $711a$ of FIG. $7a$ is shown in FIG. $9$. The look up based upon the user input flow identifier $918b$ occurs in flow table $720, 920$. Flow table $920$ shows a left hand column $902$, implemented as memory address spaces, having a list $918_{1-q}$ of the various user input flow identifiers $818b_{1-q}$ (of FIG. $8$) supported by the system. The right hand column $903$ shows a listing of user input flows $919_{1-q}$ that are identified by each of the user input flow identifiers $918_{1-q}$.

User input flows, as discussed, may be at least partially defined by a combination of input rate regulation and priority parameters. Such terms are reflected in the user input flows $919_{1-q}$ of FIG. $9$. In the flow table embodiment $920$ of FIG. $9$, the priority parameter is represented by TOS value $905$ while the input rate regulation parameters are reflected by the Tagging Policy $904$ and the In Bucket ID $906$ value as described further ahead in the discussion concerning FIG. $9$.

The Tagging Policy $904$ is a data structure indicative of a how a non-conforming packet should be treated. In the embodiment of FIG. $9$, Tagging Policy $904$ is a one bit data structure. If the tagging policy is a "1", a non-conforming packet should be marked for discard (e.g., by setting a Discard Tag value, as described above to "01"). If the tagging policy is a "0", a non-conforming packet should be marked as non-conforming but still attempt to enqueue the packet for outbound transmission (i.e., by setting the Discard Tag value, as described above to "10"). Different binary values may be used in different embodiments. More complicated tagging policy embodiments may employ larger data structure sizes.

As the user input flow identifiers $918_{1-q}$ are used to perform a lookup in flow table 920, the contents of flow table 920 for a particular user input flow (e.g., In Bucket ID 906, Tagging Policy 904, TOS value 905 and In Counter ID 909) are loaded into flow register 907. The utility of the In Counter ID 909 is described in more detail further ahead. Once loaded into flow register 907, the In Bucket ID 906 is used to perform another lookup in bucket table 908. That is, in the embodiment of FIG. 9, In Bucket ID 906 is implemented as a memory pointer for use with bucket table 908. Bucket table 908 is used to store more input rate regulation related information.

For token bucket implementations, the bucket table 908 stores token related information for the user input flow buckets. For leaky bucket implementations bucket table 908 may store information related to the depth of a user input flow bucket. Since the In Bucket ID 906 is used to direct the input policing stage 911 to such rate related information, the In Bucket ID 906 parameter may be deemed an input rate regulation parameter of a user input flow. Note that alternate embodiments may insert all input rate regulation related information into the flow table 920 to avoid a second lookup to bucket table 908.

Figure 9:
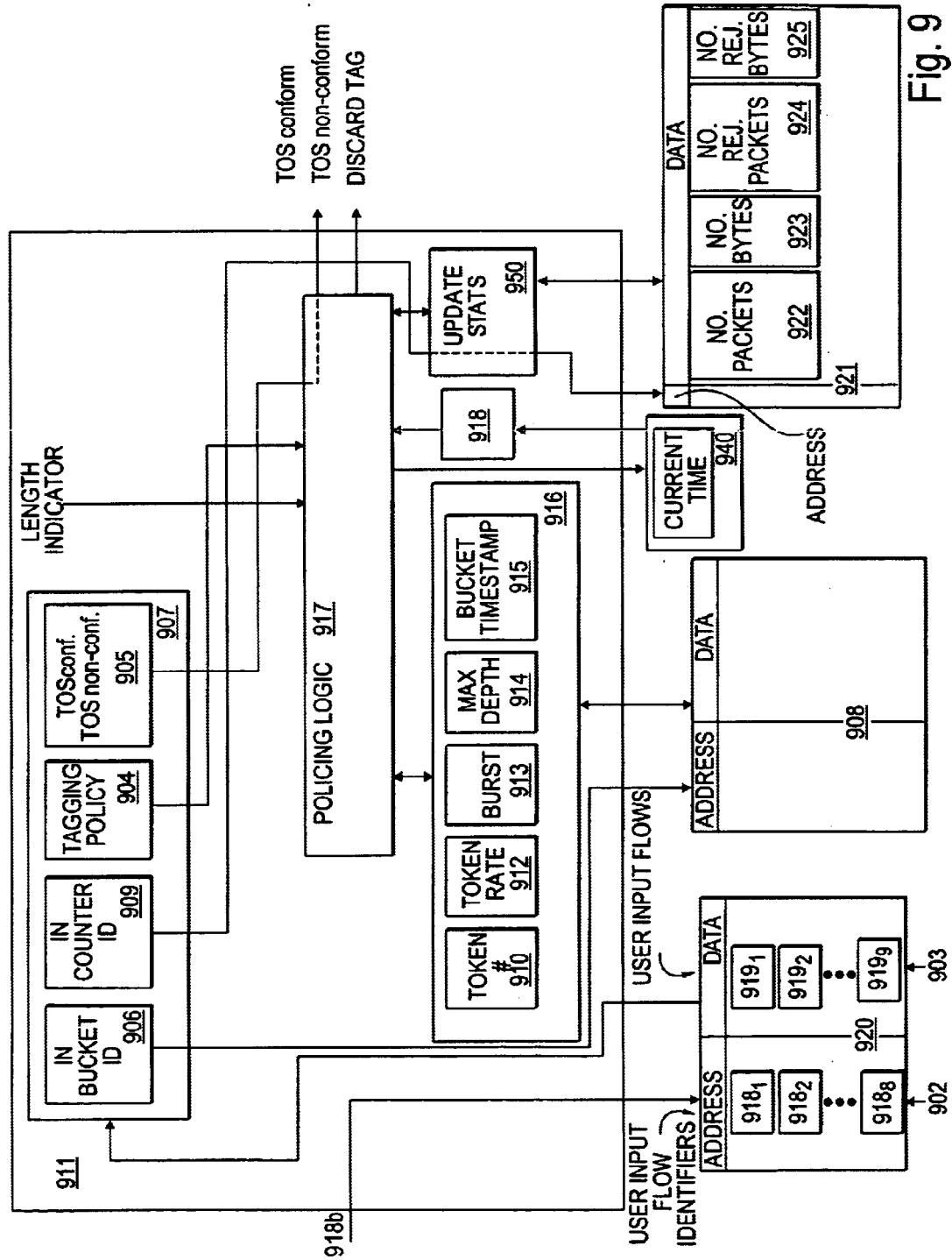

The bucket table embodiment 908 of FIG. 9 is used to implement a token bucket scheme and, as such, token bucket related information is located therein. Specifically, in the embodiment of FIG. 9, there exists the Token # parameter 910, the Token Rate parameter 912, the Burst parameter 913, the Max Depth parameter 914 and a Bucket Timestamp parameter 915.

In the embodiment of FIG. 9, the Current Token # parameter 910 reflects how many tokens existed in the user input flow bucket after the last time it was used. This is related to the user input flow's current available capacity. The Token Rate parameter 912 defines how many tokens per unit time the user input flow bucket receives. As discussed, this reflects the overall input rate configured for the user input flow. The Burst parameter 913 indicates the maximum amount of tokens the user can consume out of the user input flow bucket at a given instant of time. For example, for a Burst parameter 913 value of 1 MB (usually listed in tokens), the user can send no more than 1 MB of data at any instant of time. This effectively sets a limit on the burstiness of the user's input rate. The Max Depth parameter 914 indicates the maximum number of tokens the user input flow bucket can hold. It is typically slightly larger than the Max Depth parameter 914. The Bucket Timestamp parameter 915 indicates the last moment in time that tokens were updated from the user input flow bucket.

In the embodiment 911 of FIG. 9, the token related information in the bucket table 908 is loaded into a bucket register 916 for access by the policing logic 917. The policing logic 917 is used to implement the processes $711b_1$, $711b_2$, $711b_3$ of FIG. 7b. In the policing logic 917 embodiment of FIG. 9, the current number of available tokens in the user flow bucket is calculated according to Equation 1, below:

Current No. of Available Tokens=Current Token#+((Current Time−Bucket Timestamp)*Token Rate)  Eqn. 1

The Current Time is the current real time as determined by a real timer or other clocking device 940. Note that policing logic 917 is coupled to a real time register 918 that loads the real time from the real timer 940. The policing logic 917 then compares the Length Indicator parameter from the control label 795 (of FIG. 7) to determine if the user input flow has enough available input capacity to entertain the input packet.

If the Current No. of Available Tokens is greater than the Length Indicator: 1) the Discard Tag is set at "00"; 2) bucket table 908 is written back to with the Current Token #910 updated to reflect the reception of the packet and the Bucket Timestamp 915 set to the Current Time; and 3) the control label 795 is updated with TOS value 905 from flow register 907 (to reflect admission into a different network). If the Current No. of Available Tokens is less than the Length Indicator, in various embodiments, the policing logic 917 is designed to operate based upon the value of the Tagging Policy within flow register 907.

In one embodiment, if the Tagging Policy indicates the packet should be transmitted even though the packet is deemed non conforming: 1) the Discard Tag is set at "10"; 2) as described above, the bucket table 908 is written back to with the Current Token # 910 updated to reflect the reception of the packet and the Bucket Timestamp 915 set to the Current Time; and 3) as described above, the control label 795 is updated with TOS value 905 from flow register 907 (to reflect admission into a different network). If the Tagging Policy indicates the packet should be discarded, the Discard Tag is set at "01" and the Current Token # 910 and Bucket Timestamp 915 may be updated and written back to bucket table 908 to increment the tokens.

Furthermore, in the embodiment 911 of FIG. 9, the update statistics logic 950 uses the In Counter ID 909 (from flow register 907) as a memory pointer to perform a lookup in the statistics table 921. The statistics table 921 contains statistics for each user input flow which are loaded into a statistics register (not shown). In the embodiment 911 of FIG. 9, the statistics include: 1) the number of accepted packets (No. Packets 922); 2) the number of accepted bytes (No. Bytes 923); 3) the number of rejected packets (No. Rej. Packets 924) and 4) the number of rejected bytes (No. Rej. Bytes 925). The update statistics logic 950 is responsible for updating these statistics to reflect the reception of a packet (if it is not discarded) or the rejection of a packet and then writing them back to statistics table 921.

Figure 10:
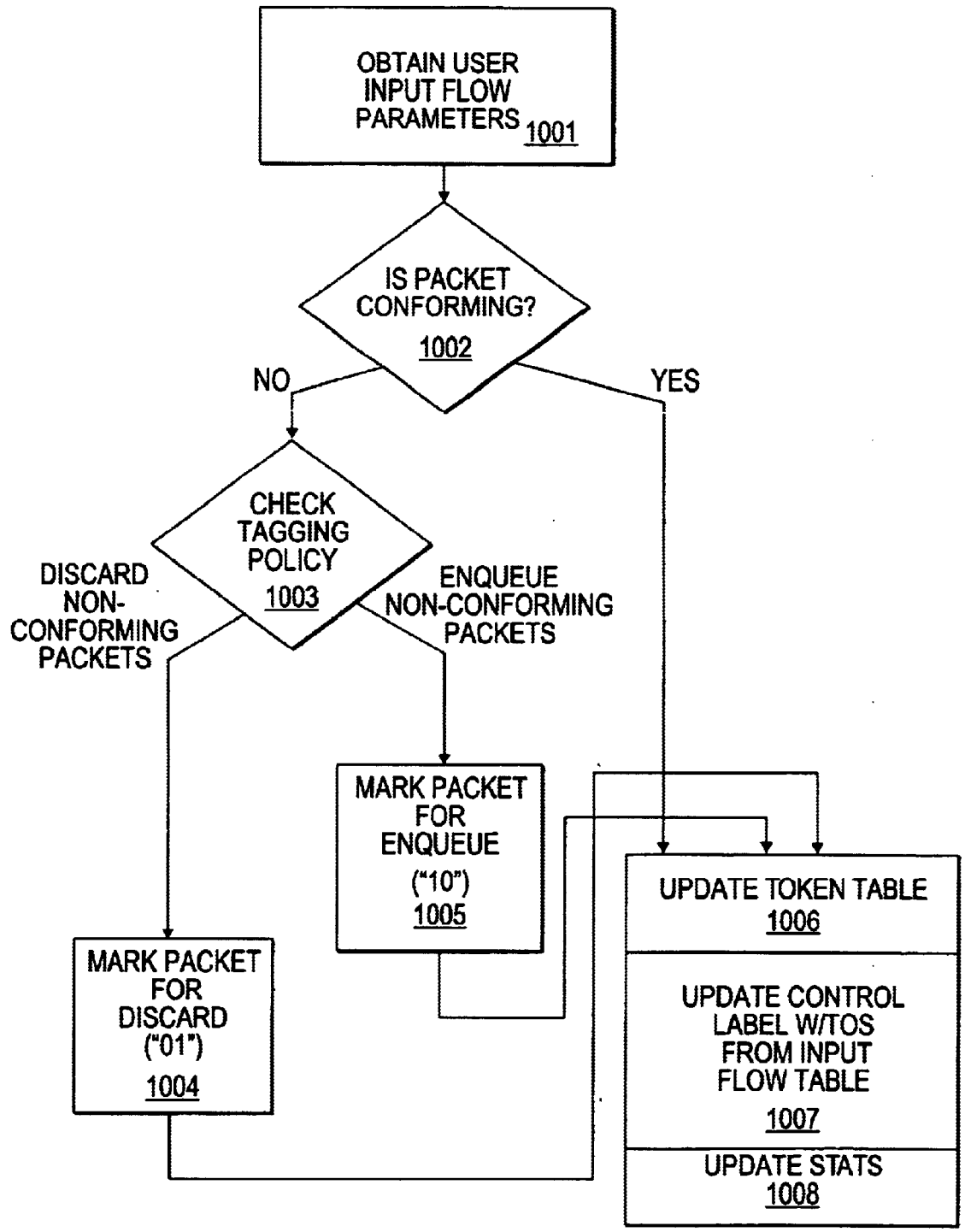
FIG. 10 shows a method that corresponds to the input policing stage embodiment of FIG. 9.

The process executed by the input policing stage embodiment 911 of FIG. 9 is shown in FIG. 10. First, user input flow parameters (including rate and priority terms) are obtained 1001. Next, based upon the rate terms associated with the user input flow parameters, the input capacity available for consumption is weighed against the Length Indicator to determine if the packet is conforming or non-conforming 1002. Next, if the packet is non-conforming, the Tagging Policy is checked 1003 to mark the packet for discard 1004 or mark the packet for enqueue even though non-conforming 1005. Then, 1) the token table is updated 1006; 2) the control label is updated with a new TOS value 1007 ; and 3) the input user flow statistics are updated 1008.

In one embodiment, two TOS values are stored in flow table 920. One TOS value, referred to as the conforming TOS value, is written to control label 795 as the TOS from the input flow rate table if the packet is deemed conforming. The other TOS value, referred to as non-conforming TOS, written to control label 795 as the TOS from the input flow rate table, if the packet is deemed non-conforming. Note that bucket table 908 and statistics table 921 may be implemented in the same memory device.

Note that the architecture of the pipeline is extendable to Layer 2 services. For example, input flow regulation may also be performed for Layer 2 flows. In such applications, the Connection ID may be used for the information used on the left hand column look up of the input flow ID look up.

Next Node Identification

Referring back to FIG. 7a, the Next Node Identification stage 712a effectively identifies the next network node an input packet should be sent to. This involves using the information within the control label 795 to perform a look up which may be done by various ways as is known in the art. Frequently, for IP packets, the destination address (DA) or Next Hop Address (NHA) is used to perform a look-up in a routing table or cache 722. A TCAM may be used to implement the routing table or cache. The routing table or cache 722 stores the next node (or its equivalent, such as the network line or connection used to transport a packet to the next node) that the packet is to be sent to as a function of the packet's destination address. For source routing, the destination address is replaced by a next hop address.

In the pipeline embodiment of FIG. 7a, the Next Node Identification stage 712a identifies the output connection, hence the Output Connection ID 723. The Output Connection ID 723 may be used for Layer 2 services. For example the Output Connection ID 523 may corresponds to a VPI/VCI address for an ATM based line or a DLCI address for a Frame Relay based line. In other, non-connection based embodiments, a MAC address such as a Gigabit Ethernet MAC address may be identified. The Output Connection ID 723 is used, in an embodiment, as a pipeline output so that the output packet can be directed to its proper output line.

Since each line corresponds to a particular output port (e.g., output port 104a of FIG. 1), the output port that the packet will be transported across may also be identified by the Next Node Identification stage. Thus, in the pipeline embodiment of FIG. 7a, the Next Node Identification stage 712a also identifies the Output Port ID 724. As discussed in more detail ahead, the pipeline embodiment of FIG. 5d uses an output packet organizer 550 designed to handle all packet identifiers for a particular port. The Output Port ID 524 is used to help determine the particular output packet organizer 550 that a packet identifier should be stored into. In various embodiments, the Output Connection ID 723 and Output Port ID 724 parameters are written into a control header resister 790.

TOS

Referring to FIG. 5d, the relevance of the TOS value is presently used as vehicle to gain an initial understanding of both the Output Flow ID stage 513 and the Marking and Shaping stage 514. Recall the discussion surrounding FIGS. 6a through 6d. In these Figures it was demonstrated that not every stage of the pipeline 540 is used for all situations. For example, in many cases a packet arrives from an up-link line, input rate regulation is not necessary. Hence the Input Flow ID and Input Policing stages 510, 511 are not used. Note also that the pipeline 540 frequently serves as an interface between two networks. For example, in FIGS. 6a and 6b the pipeline serves as an interface between the service provider's network and a user's network. In FIG. 6c, the pipeline serves as an interface between the network of two users.

When a packet passes between two networks, in IF applications, its Priority Label 521 (e.g., a TOS value) may change. The TOS value, as discussed in more detail below, is used to signify the priority of the packet. The fact that certain stages are not used in certain situations, combined with the fact that the TOS value provides information about the priority of a packet and may change as a packet passes through different networks, results in varied routing and uses of the TOS value within the pipeline 540.

FIGS. 11a through 11d, which are an elaboration of FIGS. 6a through 6d, show the various TOS routes and uses. FIG. 11a corresponds to FIG. 6a, where a packet, sent by a user, is destined for the service provider's unregulated up-link line. The TOS value 1105a retrieved by the input policing stage 1111a (that is, referring to FIG. 9, the TOS value 905 loaded into the pipeline from flow table 920) is the TOS value to be used in the packet's header as it traverses the service provider's network. That is, TOS value 1105a correspond to the new TOS value as the packet enters a service provider's network. Recall this may be a conforming TOS value or a non-conforming TOS value depending upon the determination made by the input policing stage.

As discussed in more detail further ahead, an embodiment of the output packet organizer has location types that correspond to the priority of the packet. For example, packet identifiers that correspond to high priority packets are placed into a high priority location type. Packet identifiers that correspond to low priority packets are placed into a low priority location type. Thus, briefly referring back to FIG. 5d, location 525 may be a higher priority type or low priority type.

Figure 11:
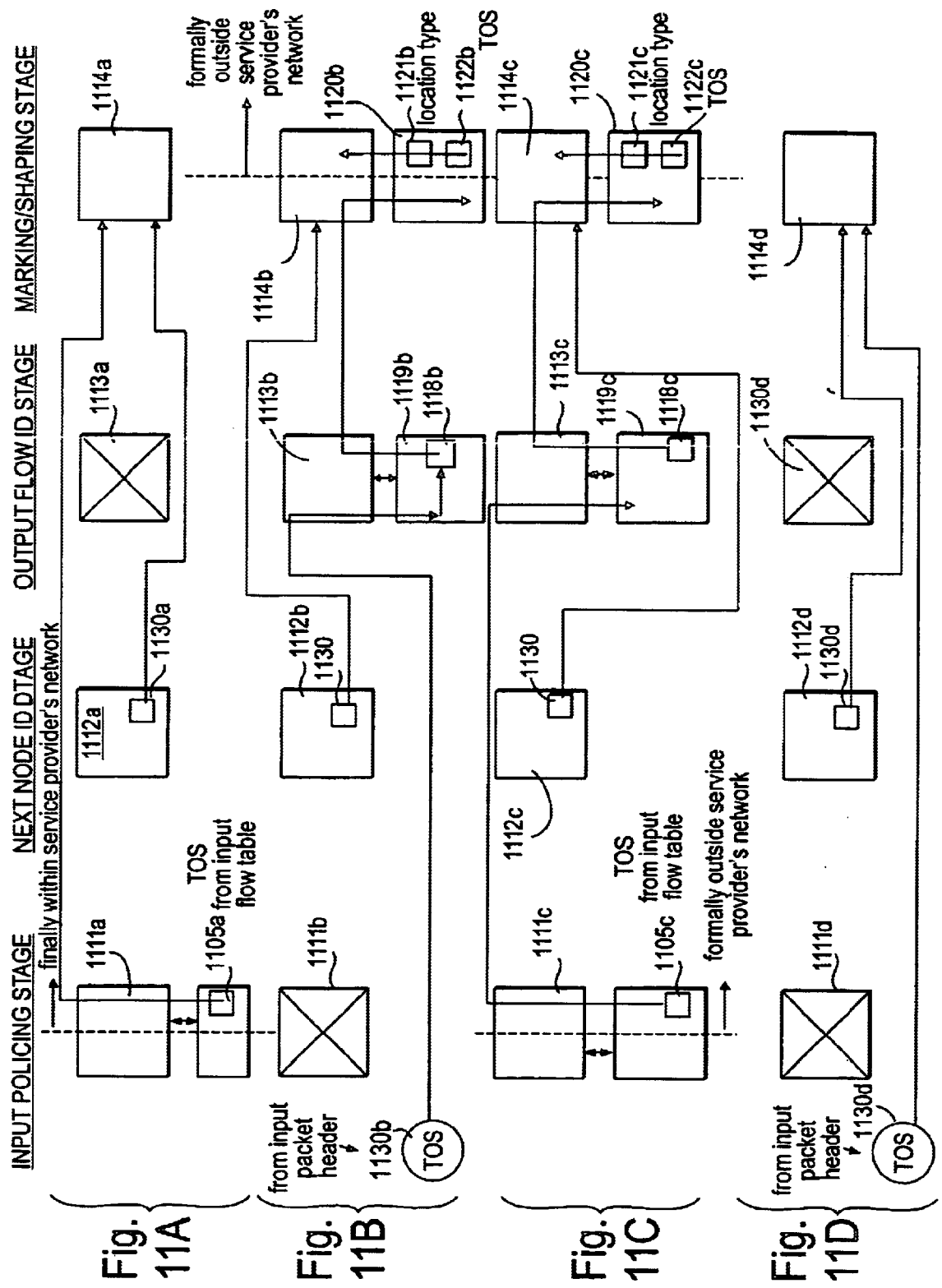
FIGS. 11a through 11d show various uses of the Type of Service (TOS) parameter within the pipeline embodiment of FIG. 5d.

As shown in FIG. 11a, the packet whose TOS value 1105a was extracted by the input policing stage 111a is eventually processed by the Marking/Shaping (also referred to as the Marking and Shaping) stage 1114a. The Marking/Shaping stage 1114a, as discussed with reference to FIG. 5d, determines a temporary location that the packet identifier should be entered into (to properly implement the packet's output rate and priority). In order to do this, the Marking/Shaping stage 1114a embodiments of FIGS. 5 and 11 uses the following inputs: 1) the Output Port ID 1130a that was produced by the Next Node Identification stage 1112a (to determine which output packet organizer the packet identifier should be entered into); 2) the location type (that reflects the packet's priority as discussed above); and 3) output rate information (such as bucket information or qualitative weight information which are discussed in more detail further ahead).

In FIG. 11a, since the packet is destined for the uplink, the Output Flow ID stage 1113a is not utilized (symbolized by the presence of an "X"). In this instance, TOS value 1105a is used by the Marking/Shaping stage 1114a to signify the priority of the packet. That is, the TOS value 1105a indicates which location type should be used when the packet identifier is eventually loaded into the output packet organizer.

The TOS value 1105a is also used to signify the qualitative weight applicable to the packet (if the packet is not a high priority packet). Again, qualitative weights are described in more detail further ahead. Thus, in the instance that a user sends a packet to the service provider's unregulated up-link, the marking/shaping stage 1114a uses the TOS value 1105a that was extracted from the input policing stage 1111a as an input for both the location type and the output rate information. Thus, referring briefly to FIGS. 11a and 5c, TOS value 1105a corresponds to internal information 545.

The Marking/Shaping stage 1114a, as discussed with reference to FIG. 5d, also determines the TOS value that should be placed into the header of the packet as it is formed into an output packet. In the situation of FIG. 11a, The TOS value 1105a is used for this packet header value. Note that this reflects the fact that the TOS value is changed as the packet leaves the user's network and passes into the service provider's network.

In the application of FIG. 11b, the service provider sends a packet from his network to the user. In this case, as discussed, input rate regulation is not necessary (unless the service provider configures his network for internal regulation). As such, the Input Flow ID and the Input Policing 1111b stages are not utilized. However, since output rate regulation applies, the Output Flow ID stage 1113b is utilized.

Here, the Marking/Shaping stage 1114b employs a user output flow identifier 1118b from the Output Flow ID stage 1113b as memory pointer for a lookup in output flow table 1120b. The information stored in the output flow table 1120b determines: 1) the location type (that reflects the packet's priority); and 2) output rate information (such as bucket information or qualitative weight information which are discussed in more detail further ahead). Note that the Output Port ID 1130b from the Next Node Identification Stage 1112b is used, similar to the case of FIG. 11a, to identify the proper output packet organizer. Note that the Output Port ID 1130b is usually stored in a table. This is not shown in FIG. 11 for simplicity.

Although the contents of the output flow table 1120b will be discussed in more detail ahead, it is useful to make a few comments regarding the TOS value and the output flow table 1120b. First, the location type 1121b (used as an input to the Marking/Shaping stage 1114b to indicate the packet's priority) is stored in the output flow table 1120b as a function of the TOS value 1130b found within the header of the input packet. The location type 1121b value (e.g., high priority or low priority) stored on the right hand side of the table 1120b is determined by the user output profile identifier 1118b sent by the Output Flow ID stage 1113b. The particular output profile identifier 1118b sent by the Output Flow ID stage 1113b is partially defined by a TOS entry on the left hand side of table 1119b.

As shown symbolically in FIG. 11b, the TOS value 1130b associated with the packet from the service provider's network is used a parameter on the left hand side of table 1119b. Thus, similar to the situation of FIG. 11a, a TOS value is again used to determine the location type 1121b for a packet. That is, the value of each location type 1121b is listed according to the TOS value 1130b used to define user output flow profile identifier 1118b.

Second, as discussed, the Marking/Shaping stage 1114b is also responsible for identifying the proper TOS value to place into the header of the packet as it is formed into an output packet. User output flow table 1120b also contains another TOS value 1122b that is used as an input to the Marking/Shaping stage 1114b. This TOS value 1122b is a function of the same user output profile identifier 1118b. Identifier 1118b, is also a function of other header parameters from the input packet (e.g., DA, DP). TOS value 1122b represents a new TOS value used for the packet as it leaves the service provider's network and heads into the user's network. As such, Marking/Shaping stage 1114b typically marks packets heading from an up link to a user with this TOS value 1122b.

In the situation of FIG. 11c, the packet is being sent from a user to another user. In this application, typically both input and output regulation are performed. For this case, the TOS value 1105c extracted from the Input Policing stage 1101c is used as a look up parameter (along with the packet's header information) within table 1119c to obtain an appropriate user output flow identifier 1118c. The corresponding location type 1121c, used as an input to the Marking/Shaping stage 1114c, is again a function of TOS value 1105c. The packet's header is marked with TOS value 1122c when the packet is formed into an output packet.

In the situation in FIG. 11d, the packet is being sent within the service provider's network. Thus, neither input rate regulation or output rate regulation are normally applicable. In this case, the TOS value 1130d found within the header of the input packet, is used by the Marking/Shaping stage 1114d to signify the priority of the packet. That is, the TOS value 1130d indicates which location type should be used when the packet identifier is eventually loaded into the output packet organizer. TOS value 1130d is also used to signify the qualitative weight applicable to the output rate of the packet (if the packet is not a high priority packet as discussed ahead). Thus, referring back to FIG. 5c, note that TOS value 1130d corresponds to both packet header information 543 and internal information 545.

It is apparent from the above discussion that a new TOS value may be added to a packet header whenever the packet changes networks. The packet formally enters the service provider's network when the TOS value 1105a,c is extracted from the input policing stage 1101a,c. The packet formally leaves the service provider's network when a new TOS value 1122b,c is extracted from output flow table 1120b,c (although it is prioritized according to the TOS value 1130b, 1105c within the service provider's network). TOS values are also used to determine a packet's priority and may also be used for output rate information as well.

Output Flow ID

The Output Flow ID stage 1113b,c of FIG. 11 is responsible for performing a lookup in Output Flow ID table 1118b,c. An Output Flow ID table appears much the same as the embodiment 816 of the Input Flow ID table of FIG. 8. That is, various header combinations are listed in the left hand column 802 which correspond to a particular user output flow identifier. The header information within an input packet is screened against the left hand column to obtain the particular user output flow identifier for the packet. User output flow identifiers are used as a memory pointer by the Marking/Shaping stage 1114 to obtain user flow information applicable to the packet.

Priority Marking and Shaping

Referring back to FIG. 5d, recall that the Priority Marking and Shaping stage 514 is responsible for determining a temporary location within the output packet organizer 550 that corresponds to an appropriate priority and output rate for the particular packet. Before moving into a discussion of the workings of the Priority Marking and Output Shaping stage 514, an understanding of an embodiment of the output packet organizer 550 should be developed.

a. Output Packet Organizer—Priority

Figure 12:
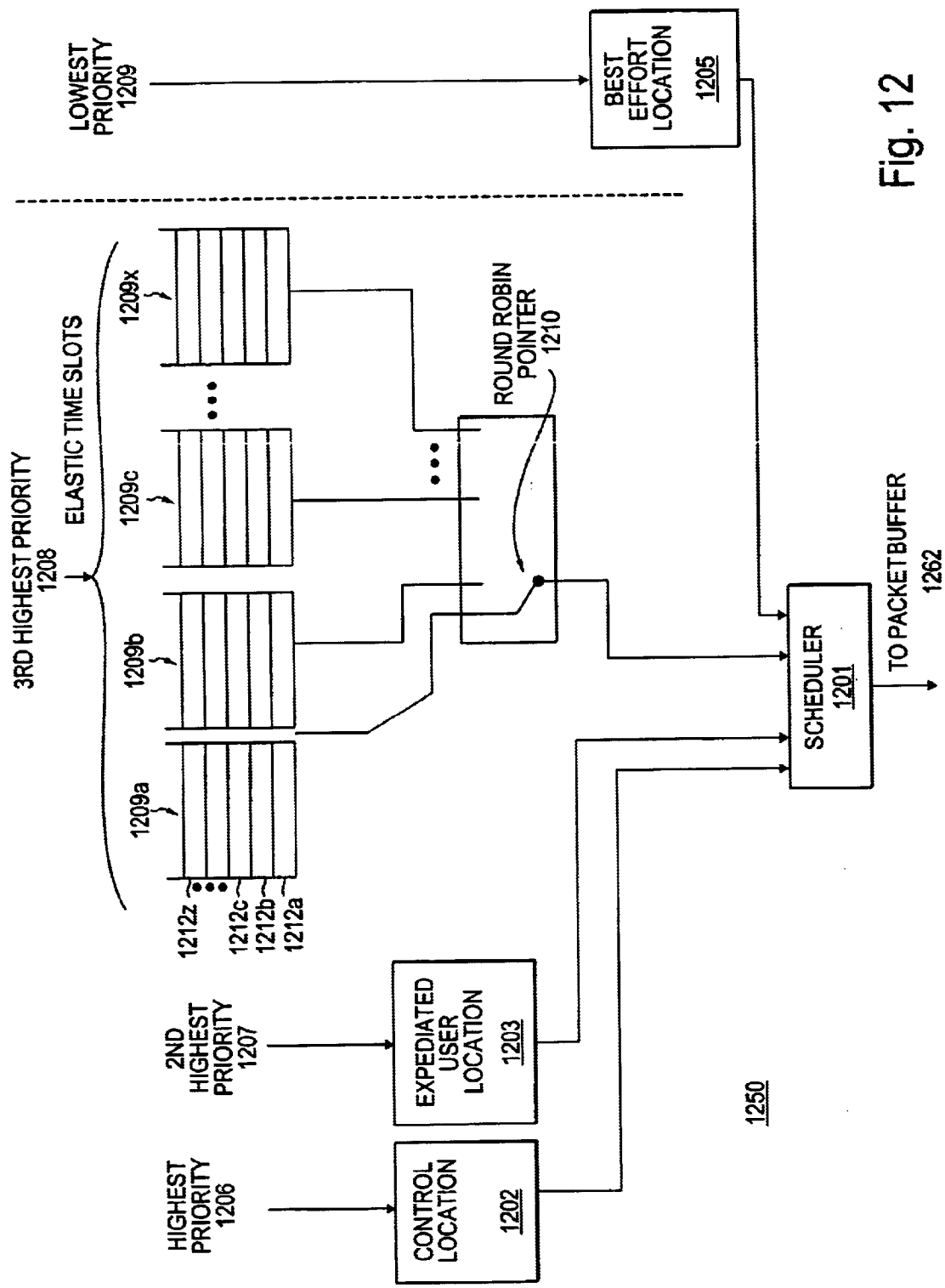
FIG. 12 shows an embodiment of an output packet organizer.

One embodiment 1250 of an output packet organizer is shown in FIG. 12. Recall that the placement of a packet identifier into the output packet organizer 1250 corresponds to providing a packet with both the proper output rate as well as the proper priority. Recall that higher priority packets are removed from the packet buffer comparatively sooner than lower priority packets so that higher priority packets may experience less latency than the lower priority packets. Real time packets such as packets carrying a telephone conversation are generally given high priority. Non real time packets such as packets carrying a data file are generally given lower priority.

In the output packet organizer embodiment 1250 of FIG. 12, the priority of the packet is signified by which one of four inputs 1206, 1207, 1208, 1209 a packet identifier is sent to. As such, the output packet organizer embodiment 1250 of FIG. 12 has four priority levels. The priority level increases from right to left in FIG. 12. That is, the highest priority packets have their corresponding packet identifiers enter the output packet organizer 1250 at highest priority input 1206. Packets having not the highest priority level but a second highest priority level have their corresponding packet identifiers entered at the $2^{nd}$ highest priority input 1207. Packets having the third highest priority have their packet identifiers entered at $3^{rd}$ highest priority input 1208 and packets having the fourth highest priority have their packet identifiers entered at the lowest priority input 1209.

Referring briefly back to FIG. 11, recall the discussion surrounding the location type (e.g., location types 1121b, 1121c). In the embodiment discussed herein, these location types 1121b, 1121c indicate to the Marking/Shaping stage 1114b,c which one of the four inputs 1206–1209 described just above the packet should be placed into. Thus, consistent with the discussion of FIG. 11, TOS value 11105a, 1130b, 1105c, 1130d is used to indicate which one of the four inputs 1206–1209 the packet should be entered into.

In an embodiment, highest priority is reserved for control packets. Control packets are used for networking maintenance activities. This includes, among others, packets used to reflect a network configuration change or an inoperative system or line. In the same or other embodiments, $2^{nd}$ highest priority is used for real time packets, such as packets carrying a voice conversation or a video conference. In these or other embodiments, the $3^{rd}$ highest priority is used for data packets. Finally, the lowest priority is reserved for packets requiring only "best effort" transmission. Best effort transmission corresponds to transmitting a packet under limited available bandwidth conditions. Best effort transmission may be reserved for packets deemed nonconforming or for users who specially request best effort basis for certain packets.

However, this is only a general approach. Note the flexibility offered by such an approach. For example, some users may choose to have their real time packets processed according to the $3^{rd}$ rather than $2^{nd}$ highest priority level. This may be easily accomplished, for example, by storing a TOS label 905 indicative of the $3^{rd}$ highest priority level within the flow table 920 content (referring briefly back to FIG. 9) for the particular user who desires such treatment for his real time packets. Other various configurations may be implemented on a user by user basis.

The output packet organizer embodiment 1250 of FIG. 12 is characterized to reflect the above described general approach. That is, control packet identifiers are typically entered into control location 1202, real time packet identifiers are typically stored in expedited user location 1203, data packet identifiers are typically stored into one of the multiple elastic time slot locations 1204a–1204x. Best effort packet identifiers are stored into the best effort location 1205. However, as users may be individually configured for the treatment of their packets, these labels should not be used to limit the scope of this discussion to only these typical cases.

The scheme used to implement the priority of one location over another in the output packet organizer of FIG. 12 is discussed next. Packet identifiers, after being entered into an appropriate location, are eventually serviced by scheduler 1201. This means a packet identifiers is transferred from a location to the scheduler 1201. Scheduler 1201 then initiates, in some manner, a request (e.g., a memory read) to the packet buffer 360 (referring briefly back to FIG. 3a) for the corresponding packet. The initiation of a packet buffer 360 request, which is symbolically represented by release line 362, 1262 of FIGS. 3a and 12, results in the removal of a packet from packet buffer 360 for output packet processing by the packet aggregation layer.

The degree of attention that the scheduler gives each location 1202, 1203, 1204a–x, 1205, is indicative of priority associated with the location. For example, control location 1202 (as discussed in more detail below) is serviced immediately by the scheduler 1201 once the control location 1202 receives a packet identifier. This effectively imposes minimal delay on packets directed to the control location 1202 since the scheduler 1201 immediately requests the packet buffer for the corresponding packet once the packet identifier is loaded into control location 1202.

Similarly, expedited user location 1203 is also serviced immediately by the scheduler 1201 once the expedited user location 1203 receives a packet identifier. Again, this effectively imposes minimal delay on packets directed to the expedited user location 1203 since the scheduler 1201 immediately requests the packet buffer for the corresponding packet once the packet identifier is loaded into expedited user location 1203. As discussed in more detail below, control location 1202 is a higher priority location than expedited user location 1203, in the embodiment of FIG. 12, since the organizer 1250 is designed to process packet identifiers from control location 1202 before packet identifiers from expedited user location 1203 should contention ever arise between the two.

More substantial delay (as compared to packets directed to the control or expedited user locations 1202, 1203) may be observed for packets directed to one of the elastic time slot locations 1204a–x. This is due to the round robin pointer 1210 which gates the scheduler's 1201 servicing of these locations 1204a–x. For example, as shown in FIG. 12, elastic time slot 1204a is currently being serviced by the scheduler 1201 since the pointer 1210 is coupling the scheduler 1201 to elastic time slot 1204a.

Elastic time slots 1204b–x, therefore, are not receiving attention from scheduler 1201. This lack of attention corresponds to greater delay for packet identifiers stored in elastic time slots 1204b–x as compared to a packet identifier stored in control location 1202, expedited user location 1203 and elastic time slot 1204a (just prior to the scheduler's servicing of elastic time slot 1204a). More details on elastic time slots 1204a–x are provided further ahead. However, take note that the activity of round robin pointer 1210 effectively services each elastic time slot 1204a–x in a periodic fashion. That is, the round robin pointer 1210 couples the elastic time slots 1204a–x to scheduler 1201 in a round robin fashion.

The best effort location 1209 is the lowest priority location in the organizer 1250 embodiment of FIG. 12. Lowest priority is implemented by keeping the servicing of best effort location 1205, in many instances, limited to available bandwidth.

Recall that output rate regulation concerns the sending of a packet to a user by the service provider consistent with the user's allocated output rate and the packet's priority. Output rate control concerns the sending of a packet by the service provider consistent with the packet's priority and the bandwidth of the line or port used to transport the packet from the system. In both cases, the packet's priority is a factor. As just described, the output packet organizer has inputs 1206–1209 or locations 1202–1205 that are organized according to the packet's priority. Thus the placement of a packet identifier into a particular organizer input or location corresponds to the sending of the packet consistently with the packet's priority.

b. Output Organizer—Rate/Bandwidth

The rate aspect is described next. In the organizer embodiment 1250 of FIG. 12, the scheduler 1201 is designed to make requests to the packet buffer at a rate that corresponds to the rate of the output port used to transport the output packet. Referring back to FIG. 1, recall that each output port 104*a–c* may carry the traffic of one or more output lines. Systems having multiple output ports may therefore have multiple output organizers fed by a single pipeline (where each organizer is dedicated to an output port). Some system embodiments may design each output port bandwidth to be identical, allowing for a scaleable design. Other designs may choose to custom configure the bandwidth of the port (and organizer scheduler 1201) on a port by port basis. Other system designs are possible, such as having multiple organizers per port.

Since, in the embodiment discussed with respect to FIG. 12, the bandwidth of the scheduler 1201 corresponds to the bandwidth of the output port it supports, the scheduler may be viewed as having resources capable of processing packet identifiers consistent with the bandwidth of the output port. The resources may be split into percentages based upon each of the four priority levels. Furthermore, these percentages may be programmable.

For example, the expedited user location 1203 may be configured to consume x % of the scheduler's resources and the elastic time slots 1204*a*–1204*x* together may be configured to consume y % of the scheduler's resources. The control location 1202 and best effort location 1205 are also allotted scheduler resource percentages as well.

Recall that flows have a rate parameter and a priority parameter. In an embodiment, the percentage of scheduler 1201 resources given to the expedited user location 1203 (e.g., x %) corresponds to a rate that is equal to the combined rate of all flows configured to be handled by the expedited user location 1203. That is, all flows (both input and output) having a priority label (e.g., a TOS value) that corresponds to processing by the expedited user location 1203 are configured to have a combined rate equal to the percentage (e.g., x %) of the scheduler's rate resources that are configured to service the expedited user location 1203. This means the system is configured such that expedited user location 1203 is not oversubscribed.

As such, users exceeding their allocated rate for flows destined for expedited user location 1203 are discarded by the pipeline. For user input flows, referring briefly back to FIG. 9, the tagging policy 904 is set such that non conforming packets are marked for discard by the discard tag. For user output flows, referring briefly back to FIG. 5*d*, non conforming packets are not issued a temporary location 526.

Recalling that the expedited user location 1203 is typically used to handle real time traffic; configuring the expedited user location 1203 not to be oversubscribed generally means the system is configured not to oversubscribe real time traffic. By not oversubscribing real time traffic, there should be insubstantial delay experienced for real time traffic. This corresponds to expedited user location 1203 requiring, in theory, space for only one packet identifier. Various system designs and configurations, however, may be designed to provide space for more than one packet identifier within; or, to allow for some oversubscription of flows destined for expedited user location 1203. The amount of acceptable delay experienced by packets that result from these approaches may be determined by those of ordinary skill.

As discussed above, the elastic time slots 1204*a*–1204*x* together may be configured to consume y % of the scheduler's resources; meaning y % of the scheduler's resources are devoted to servicing packets entered at the third highest priority input 1208. In various embodiments, as discussed, elastic time slots 1204*a*–1204*x* are used to process non real time traffic (e.g., data packets). Since non real time traffic can acceptably sustain delay (as compared to real time traffic) flows labeled for service by the elastic time slots 1204*a*–1204*x* may be oversubscribed. That is, the combined rate of all flows labeled for service by the elastic time slots 1204*a*–1204*x* may be greater than the percentage (y %) of scheduler 1201 resources configured to service the elastic time slots 1204*a*–1204*x*.

Since oversubscription results in delay, elastic time slot locations 1204*a–x*, are designed to impose delay (e.g., packets entered into elastic time slot location 1204*x* will experience delay since the round robin pointer 1210 is currently not positioned to service elastic time slot location 1204*x*). Since each elastic time slot location 1204*a–x* is served at a particular instant in time (via coupling to the scheduler 1201 with round robin pointer 1210, such as elastic time slot location 1204*a*), each elastic time slot location may be broken down into deeper locations 1212*a–z*. Each deeper location 1212*a–z* can store a packet identifier.

Thus, each elastic time slot location 1204*a–x* may be designed to store more than one packet identifier. The total number of packet bytes stored within an elastic time slot location (e.g., the summation of the Length Indicators for each packet effectively stored in an elastic time slot location) should be consistent with operation of the round robin pointer 1210 and the percentage y % of the scheduler resources devoted to the elastic time slots 1204*a–x*.

For example, assume the scheduler can effectively remove packets from the packet buffer at a rate of 100 MB/s and the percentage y % of these resources allocated to the elastic time slot queues 1204*a–x* is 50%; and there are 10 elastic time slots 1204*a–x*.

If the round robin pointer 1210 operation is such that it couples a certain elastic time slot location (e.g., elastic time slot location 1204*a*) to the scheduler 1201 every 1.0 seconds, the certain elastic time slot location 1204*a* may effectively store 5 MB of packets. That is, the scheduler serves a 5 MB capacity elastic time slot every 0.1 seconds which corresponds to an overall output rate of 50 MB/second. This storage capacity may be referred to as the elastic time slot location's 1204 depth. Given, an elastic time slot depth, the number of packet identifiers that may be stored into elastic time slot location 1204*a* is a function of the size of the packets that are effectively stored at elastic time slot location 1204*a*. This aspect gives the time shots 1204*a–x* elastic properties.

Each elastic time slot location 1204*a–x* may be designed to hold enough packet identifiers that correspond to some worst case condition. For example, in an embodiment, the maximum depth of an elastic time slot is the elastic time slot depth plus one more packet.

Figure 13:
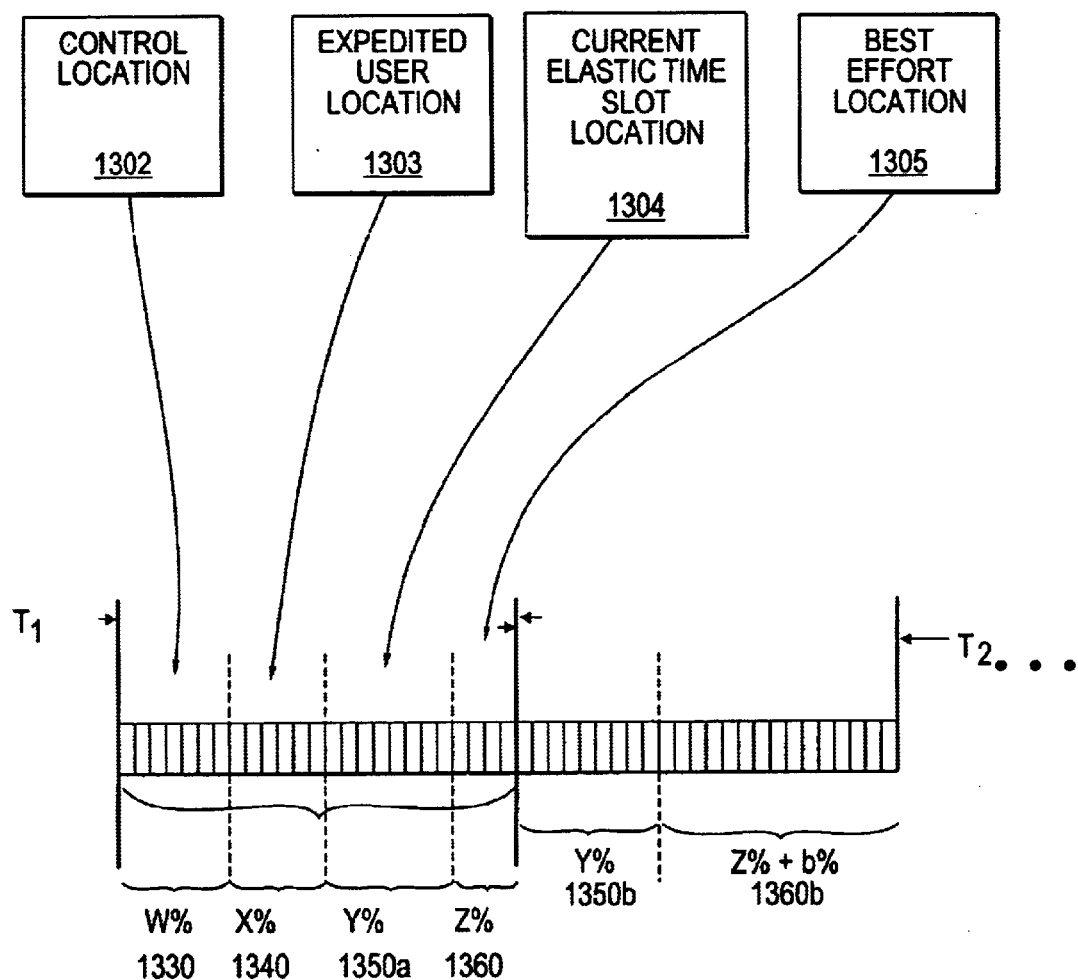
FIG. 13 shows operation of a scheduler associated with the output packet organizer of FIG. 12.

FIG. 13 shows an embodiment of a manner in which scheduler 1201 can service the various locations 1202, 1203, 1204*a–x*, 1205. Recall that the scheduling resources of scheduler 1201, in various embodiments, are consistent with the bandwidth of a port. This means the scheduler can schedule an amount of data for release from the packet buffer in an amount of time that corresponds to the bandwidth of the port. For example, for a 622 MB/s port, the scheduler can schedule 622 MB within 1 second.

FIG. 13 shows both the above referred to amount of time (referred to as a servicing time T1) and an amount of data 1310. The scheduler typically operates in a periodic fashion thus subsequent servicing times (e.g., time period T2) are the same as the servicing time T1. The amount of data 1310 is a series of packet identifiers that are transported from locations 1302, 1303, 1304a, 1305 during a service time T1. Note that in the service time T1 of FIG. 13, elastic time slot location 1304a is currently being serviced. This corresponds to the round robin pointer 1210 of FIG. 12 "pointing to" elastic time slot location 1204a. During servicing time T2, for example, elastic time slot location 1204b will be the current elastic time slot location.

Recall that the scheduling resources may be configured to service the locations at various percentages. FIG. 13 shows this in more detail. Note that the series of packet identifiers 1310 are mapped into the servicing time T1 according to the percentages allocated to each location 1302, 1303, 1304a, 1305. For example, if the expedited user location 1303 is configured for x % of the scheduler's resources, the scheduler maps x % of its amount of data 1310 (within servicing time T1) from the expedited user location 1303. Thus scheduler takes into account the size of each packet in order to determine the number of packet identifiers that correspond to x % of the schedulers amount of data within service time T1. The amount of data the scheduler serves from a location in a servicing time may be referred to simply as a percentage.

Typically, the pipeline also delivers an indication of the packet size along with the packet identifier for each packet entered into the output packet organizer. The respective percentages w %, y % and z % for the control location 1302, elastic time slot location and best effort location z %. In certain embodiments, the sum of all percentages may be less than 100%. In other output packet organizer embodiments, the sum of all percentages is 100%.

Note that these are nominal configuration percentages, however. That is, the amount of data serviced by the scheduler from a particular location does not necessarily correspond to the configured percentage for that location for every servicing time. For example, servicing time T2 corresponds to a situation where both the control location 1302 and expedited user location 1303 were empty for service time T2 (and the next elastic time slot location as well as the best effort location were full).

Figure 14A:
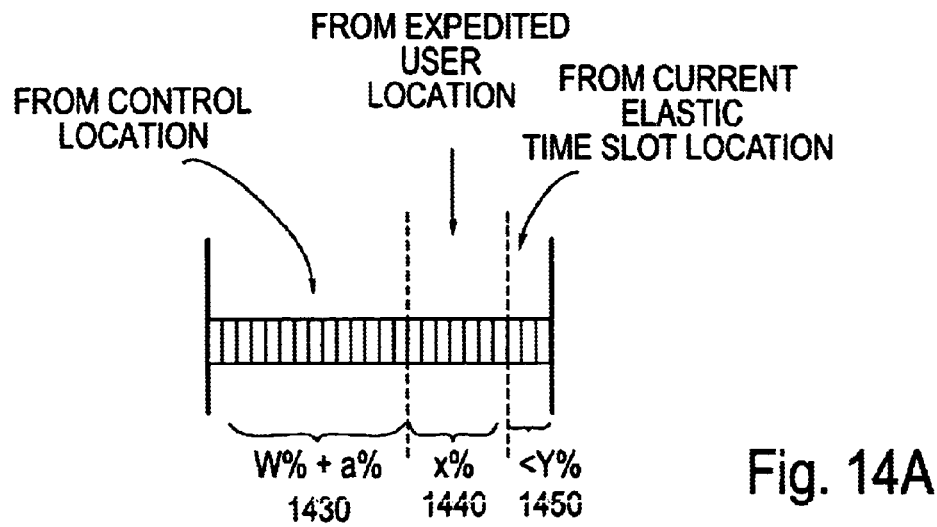
FIG. 14a shows how a high priority location may be implemented.

In this case, the full y % allocated to the elastic time slot is mapped into service time T2 while the remainder of packet identifiers are mapped from the best effort queue. Thus, certain embodiments may choose to design intelligence into the scheduler that allocates the unused percentages of other locations to the best effort queue on a servicing time by servicing time basis. FIG. 14a, shows another related design feature.

Recall that the control location 1302 is considered higher priority than the expedited user location 1303 because the control location 1302 is serviced instead of the expedited user location should contention ever arise between the two. This may extend to the other locations 1304, 1305 as well. FIG. 14a shows a situation where the control location is full of control packet identifiers. The scheduler in this embodiment is designed to schedule all packet identifiers immediately, even at the expense of other location percentages.

Thus, as shown in FIG. 14a, the control location has been allocated w %+a % (where a % corresponds to the excess data in the control location beyond its configured for percentage, w %). In this embodiment, the scheduler is designed to remove allocation from the lowest priority location toward the higher priority locations. For example, as shown in FIG. 14a, the best effort location has been completely starved, the current elastic time slot location has been serviced at a reduced percentage and the expedited user location still enjoys full servicing. Other embodiments may choose to remove percentages on a pro rata share basis among the locations as to their configured for percentage. Other embodiments may also choose to give instantaneous excess capacity (e.g., %) to a non highest priority queue, such as the expedited user location.

Figure 14B:
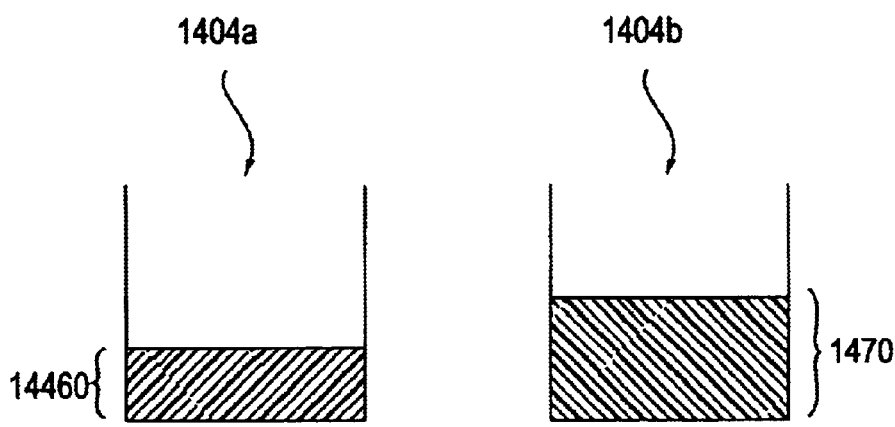
FIG. 14b and 14c show how unserved packet identifiers may be handled.
Figure 14C:
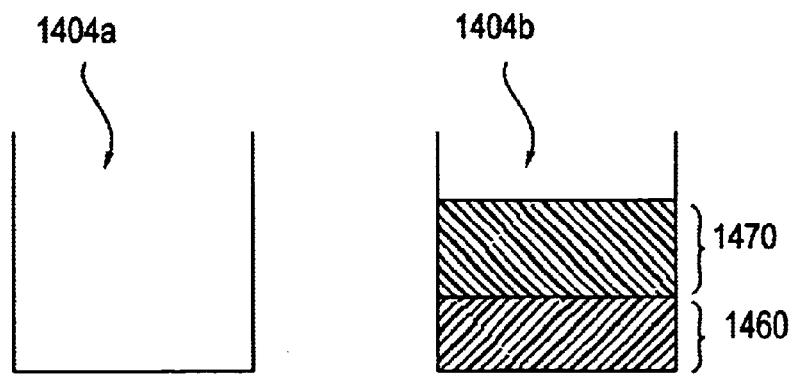

In a situation where an elastic time slot is not fully served by the scheduler, such as the instance of FIG. 14a where the demands of the control location resulted in a loss of percentage to the elastic time slot location, the remaining packet identifiers left unserved should be served in the next servicing time to preserve proper output packet ordering. FIGS. 14b and 14c show an approach for handling the remainder packet identifiers 1460 within an elastic time slot location 1404a that was not fully served by the scheduler. In an embodiment, the output packet organizer effectively shifts the remainder packet identifiers 1460 to the next elastic time slot location 1404b (i.e., served after the non emptied elastic time slot location 1404a) ahead of the packet identifiers 1470 originally associated with the next elastic time slot location 1404b.

Referring back to FIG. 12, note the elastic time slots 1204a–x may be elastically configured in time as well. That is, the rate at which the pointer rotates its service to each of the elastic time slots is configurable reflecting configurable time increments of delay that may be imposed upon packets.

For example, if there are 10 elastic time slots, the pointer 1210 may be configured to rotate at a period of 1 second. This means there are available delays of 0.0, 0.1, 0.2, 0.3, 0.4, 0.5, 0.6, 0.7, 0.8 and 0.9 seconds at a given time. If the pointer is configured to rotate at period of 2 seconds, the available delays are 0.0, 0.2, 0.4, 0.6, 0.8, 1.0, 1.2, 1.4, 1.6, 1.8 at a given time. The number of elastic time slots locations 1204a–1204x may also be configured to provide more or less resolution of available delays for a particular pointer rotation period.

Recall that output rate regulation concerns the sending of a packet to a user by the service provider consistent with the user's allocated output rate and the packet's priority. Recall that output rate control concerns the sending of a packet by the service provider consistent with the packet's priority and the bandwidth of the line or port used to transport the packet from the system.

For output rate regulation, where the pipeline is processing a high priority packet (typically a real time packet); the high priority packet is directed to the expedited user location 1203. If the user exceeds his allocated output rate for the high priority packet, the pipeline may be configured to discard it. For example, as discussed in more detail below, the marking/shaping stage does not issue a temporary location to the accept/discard stage. In another embodiment, the packet identifier is issued to the best effort location 1205 instead. In either case, a packet identifier is not directed to the expedited user location 1203 for a packet that is exceeding its allocated rate. By definition then, packet identifiers are issued to the output packet organizer consistently with the bandwidth allocated to the user's particular rate. The same may be said for output rate control as well.

For lesser priority packets, such as packets destined to the elastic time slot locations 1204a–x, packet identifiers are also entered into the output packet organizer consistently with the bandwidth of the line or port (in the case of output rate control) or the user's particular rate (in the case of output rate regulation). Two types of flows may be used for elastic time slots 1204a–x: quantitative and qualitative. A discussion of each follows.

c. Quantitative Flows

Quantitative output flows are processed by calculating how much output rate capacity a particular output flow has. In a quantitative flow embodiment, packet identifiers are issued to the elastic time slots 1204a–x through a determination of how many bytes (or bits or other quantity of data) a flow has available to send. In a further embodiment, a token scheme is employed. Similar to the token scheme discussed with respect to the input policing stage of FIG. 9, for any packet assigned to a quantitative flow, a determination is made as to how many tokens a flow has available for consumption in light of the size of the packet.

If there are enough tokens available to send the packet, the Marking/Shaping stage 514 (referring to FIGS. 5 and 12) produces a temporary location 526 that indicates the elastic time slot having zero delay should be utilized for the packet. That is, recall in a previous example that the behavior of the round robin pointer 1210 sets up the time slots 1204a–x such that they have an arrangement of available delays (e.g., 0.0, 0.2, 0.4, 0.6, 0.8, 1.0, 1.2, 1.4, 1.6, 1.8 seconds) at any given time. In the case where the flow has enough tokens to send the packet, the Marking/Shaping stage 514 sends a temporary location 526 to the Acceptance/Discard stage 515 indicating the elastic time slot having 0.0sec of delay should be scheduled for this packet.

If a flow has less than enough tokens to process a particular packet, the packet is scheduled into an elastic time slot that corresponds to a moment in time (in the future) when the flow will have accumulated enough tokens to send the packet. For example, if a packet of 1.0 Mb in size is to be processed according to a flow currently having zero tokens and being issued tokens a rate that corresponds to 1.0 Mb/s; the Marking/Shaping 514 stage will determine that the packet should be scheduled into an elastic time slot having 1.0 second of delay. If the flow is issued tokens at a rate that corresponds to 10.0 Mb/s, the Marking/Shaping stage will determine that the packet should be scheduled into an elastic time slot having 0.1 seconds of delay. In this manner, packet identifiers are stored into the output packet organizer consistent with the bandwidth allocated to the flow. The general process is given in Eqns. 2 and 3. Note that, again, output packet identifiers are loaded into the output packet organizer consistent with the bandwidth allocated to the user or line or port.

Surplus Tokens=Current No. Avail. Tokens−Packet Size (in tokens) Eqn. 2

Scheduled Delay=Eqn. 3 a) 0 if Surplus Tokens>or =0
b) |Surplus Tokens|/Token Rate if Surplus Tokens<0

In an embodiment, the marking/shaping stage 514 sends the temporary location 526 as a data structure having: 1) The Output Port ID 524 (to indicate which output packet organizer is applicable); 2) a location type (such as location type 1121b, c of FIG. 11 to indicate the elastic time slots 1204a–x are applicable to the packet); and 3) the appropriate delay given by Equation 3. The Acceptance/Discard stage 515 then tries to load a packet identifier into an elastic time slot having appropriate the delay. The Marking/Shaping stage can implement quantitative flows similar to the manner in which the Input Policing stage of FIG. 9 is implemented. That is, each user output profile contains an out bucket id (similar to in bucket id 906 of FIG. 9) used as an address for a bucket table (similar to bucket table 908 of FIG. 9). The logic associated with the Shaping/Marking stage, however, after determining the available tokens (according to Eqn. 1), executes logic according to Equations 2 and 3.

d. Qualitative Flows

Figure 15:
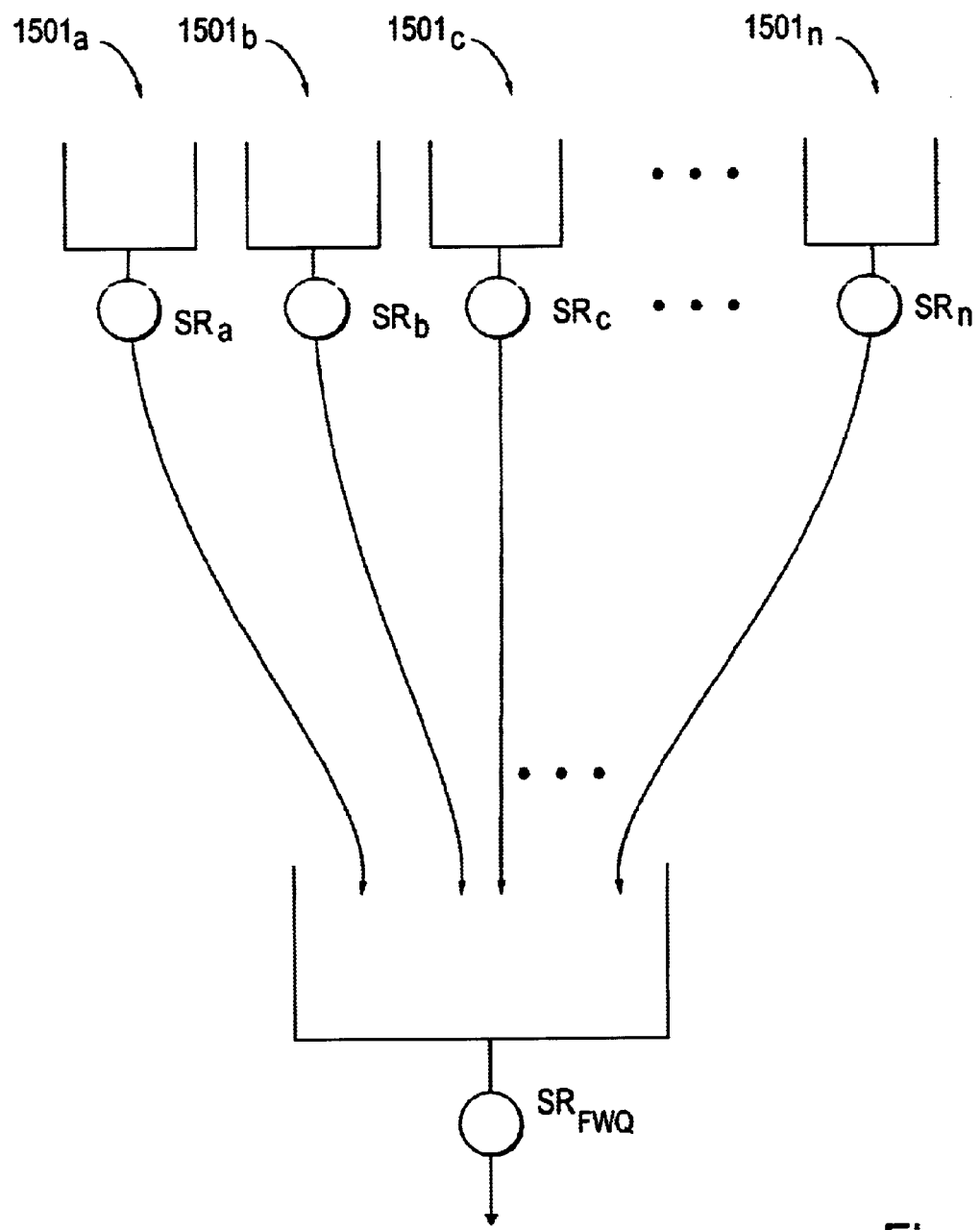
FIG. 15 shows a weighted fair queue.

Qualitative flows may be used to provide a further granularity of priority available within the output packet organizer of FIG. 12. A weighted fair queue embodiment 1500 is shown in FIG. 15. In a weighted fair queue, a series of queues 1501a–n are serviced at varied service rates SRa–n. For example, in one embodiment, SRa>SRb>SRc . . . >SRn. Furthermore, the total service rates of the series of queues 1501a–n is typically set equal to the service rate SRfwq of a bottom queue such that SRa+SRb+SRc . . . +SRn=SRfwq.

To implement a fair weighted queue within the elastic time slots locations 1204a–x of FIG. 12, each queue service rate SRa through SRn is given a quantitative flow. For example, SRa may be allocated a quantitative flow of 10.0 Mb/s, SRb may be allocated a quantitative flow of 9.0 Mb/s, etc. In an embodiment, a packet processed by the weighted fair queue 1500 has a weight parameter (rather than an out bucket id) in its flow profile that indicates which of the queues 1501a–n the packet is to be processed by. The weight parameter is used as memory pointer that points to a quantitative flow profile (e.g., similar to the contents of register 916 in FIG. 9) shared by many different users.

Unlike per flow weighted queues, the service rate of the weighted fair queue SRfwq is configured to some percentage of the bandwidth allocated to the elastic time slots 1204a–x. That is, recall that the elastic time slots 1204a–x may be allocated y % of the total bandwidth of the port. In a weighted fair queue embodiment the service rate SRfwq is set to some percentage of this y %.

This results in n quantitative output flows configured (i.e., one quantitative flow for each queue 1501a–n) for output service rates of SRa, SRb, SRc, . . . SRn, respectively. Again, these service rates are set such that SRa+SRb+SRc+ . . . SRn equals the percentage of the y % allocated to the weighted fair. Such a configuration scheme allows for users to share output flows rather than each user having his own individual user output flow. Since quantitative flow profiles are still used, the processing performed by the Marking/Shaping stage is the same as that described above with respect to the quantitative flows. Furthermore, again, packet identifiers will be issued to the output packet organizer in manner consistent with the configured for priority and rate.

Since various users are easily allowed to share a weighted fair queue 1500, a weighted fair queue 1500 may be used by the service provider to implement the processing of packets (other than those directed to the control, expedited user or best effort locations) destined for the service provider's network (e.g., an up link line). For example, the access node of FIG. 2a may be configured to handle non real time packets destined for network 240 (from access lines 208a–c) with a weighted fair queue.

In such an embodiment, referring back to FIG. 11, the TOS parameter alone may be used to provide both priority and rate information needed for output rate control. For example, referring to FIGS. 11b and 11c, note that the location type 1121b,c (which indicates a packet's priority as discussed) is obtained by way of a look up to output flow table 1120b,c. Rate information (such as a weight parameter or a bucket id), if needed, is also obtained from the look up.

However, comparing FIGS. 11b,c to FIGS. 11a,d, note that no output flow look up occurs FIGS. 11a,d. In these instances, the TOS parameter 1105a, 1130d is used to provide rate information for packets destined for the elastic time slots. In an embodiment, the port that services a network provider's uplink or other internal network connection is configured to process packets destined for the elastic time slots (1204a–x of FIG. 4) according to a weighted fair queue. Recall that the TOS value is also used to indicate which of the four locations 1202, 1203, 1204a–x, 1205 the packets should be effectively processed by.

In an embodiment, TOS values are use as shown below. Note that in the third instance a rate parameter has been embedded into the TOS value.

1. 00000000 (packet destined for best effort queue)
2. 11000000 (packet destined for expedited user queue)
3. 10xxx000 (packet destined for weighted fair queue, xxx=weight parameter)

e. Output Flow ID Stage and Marking/Shaping Stage Embodiments

Figure 16A:
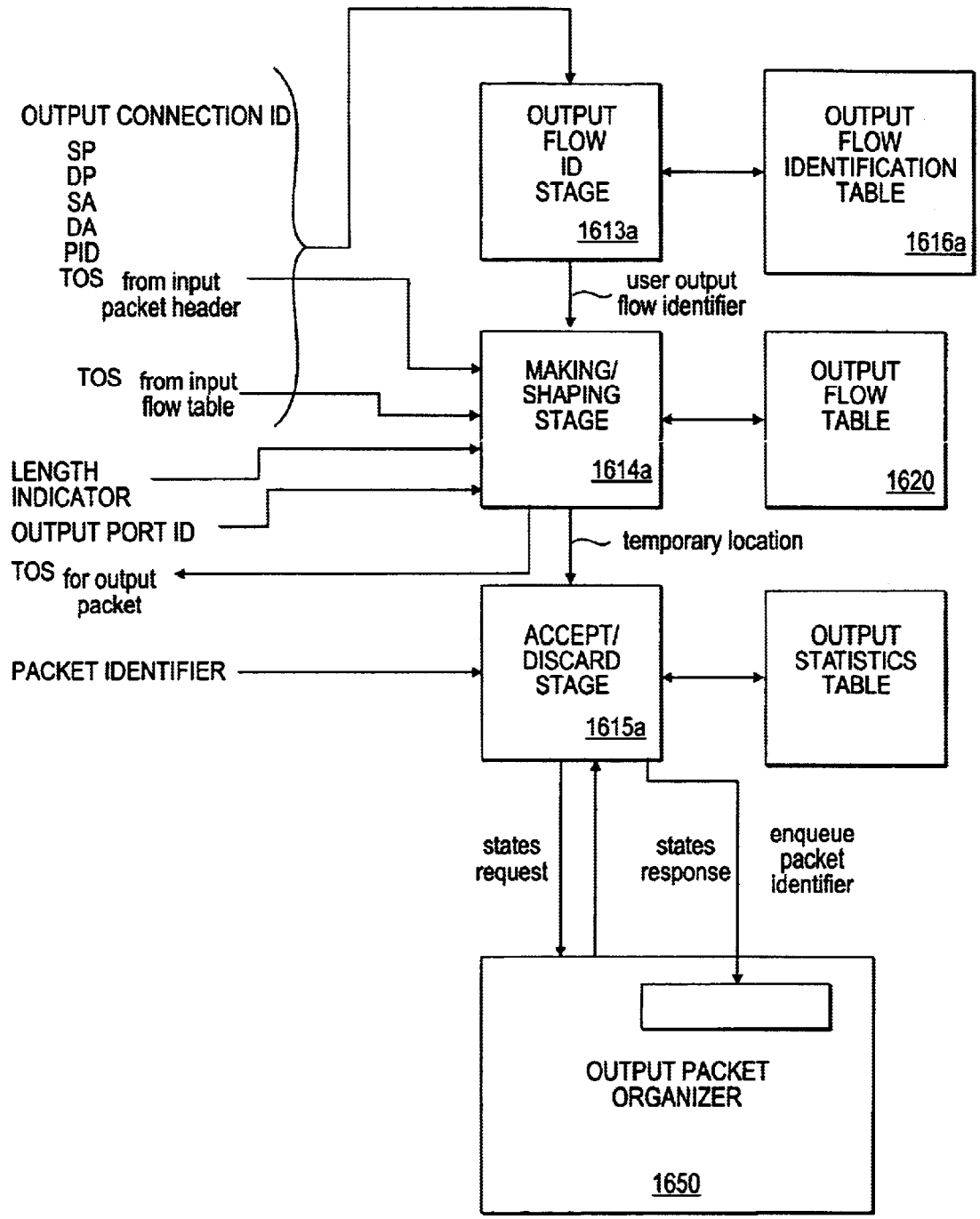
FIG. 16a shows the packet processor pipeline of FIG. 5d in more detail.
Figure 17A:
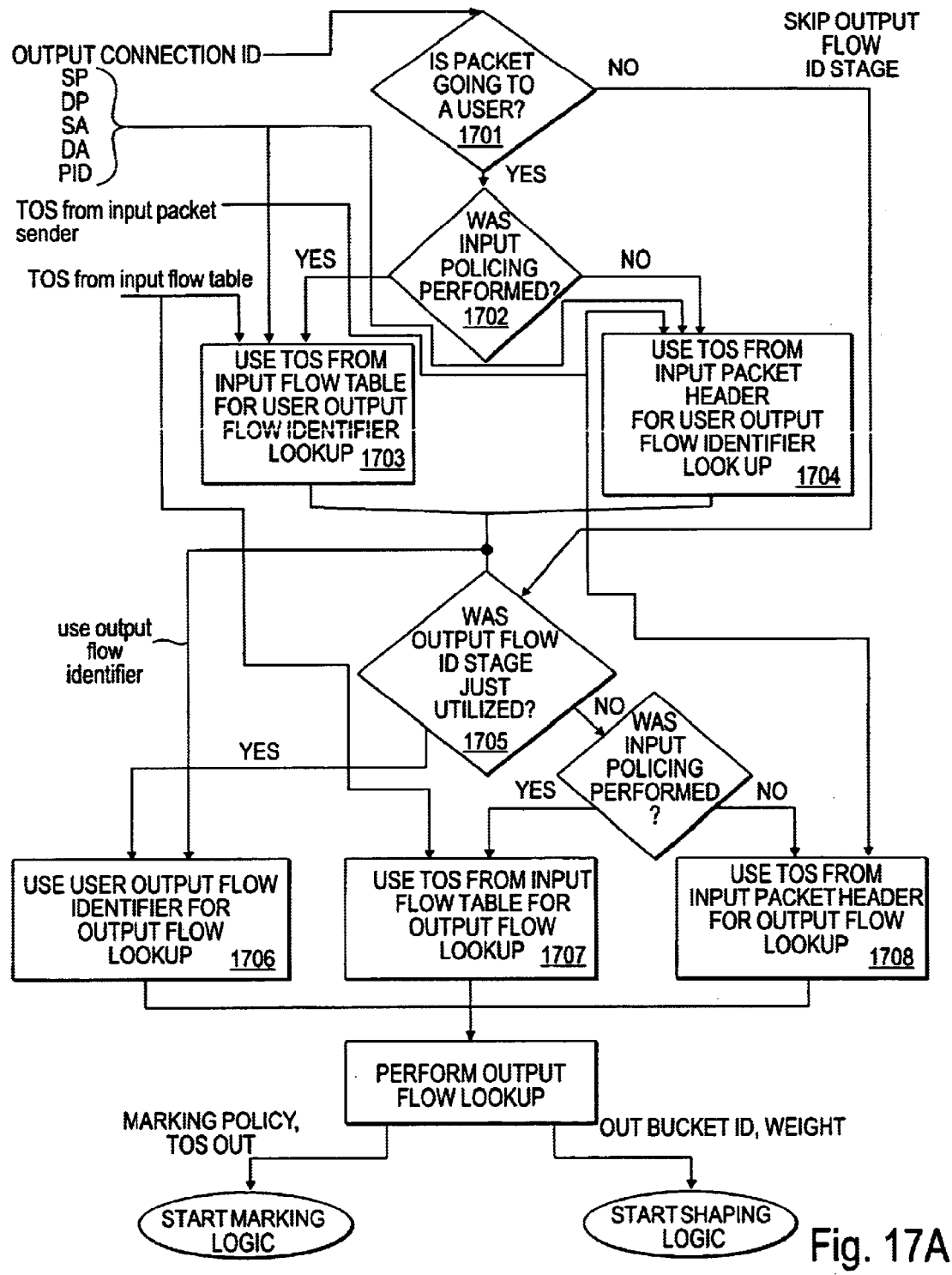
Figure 17B:
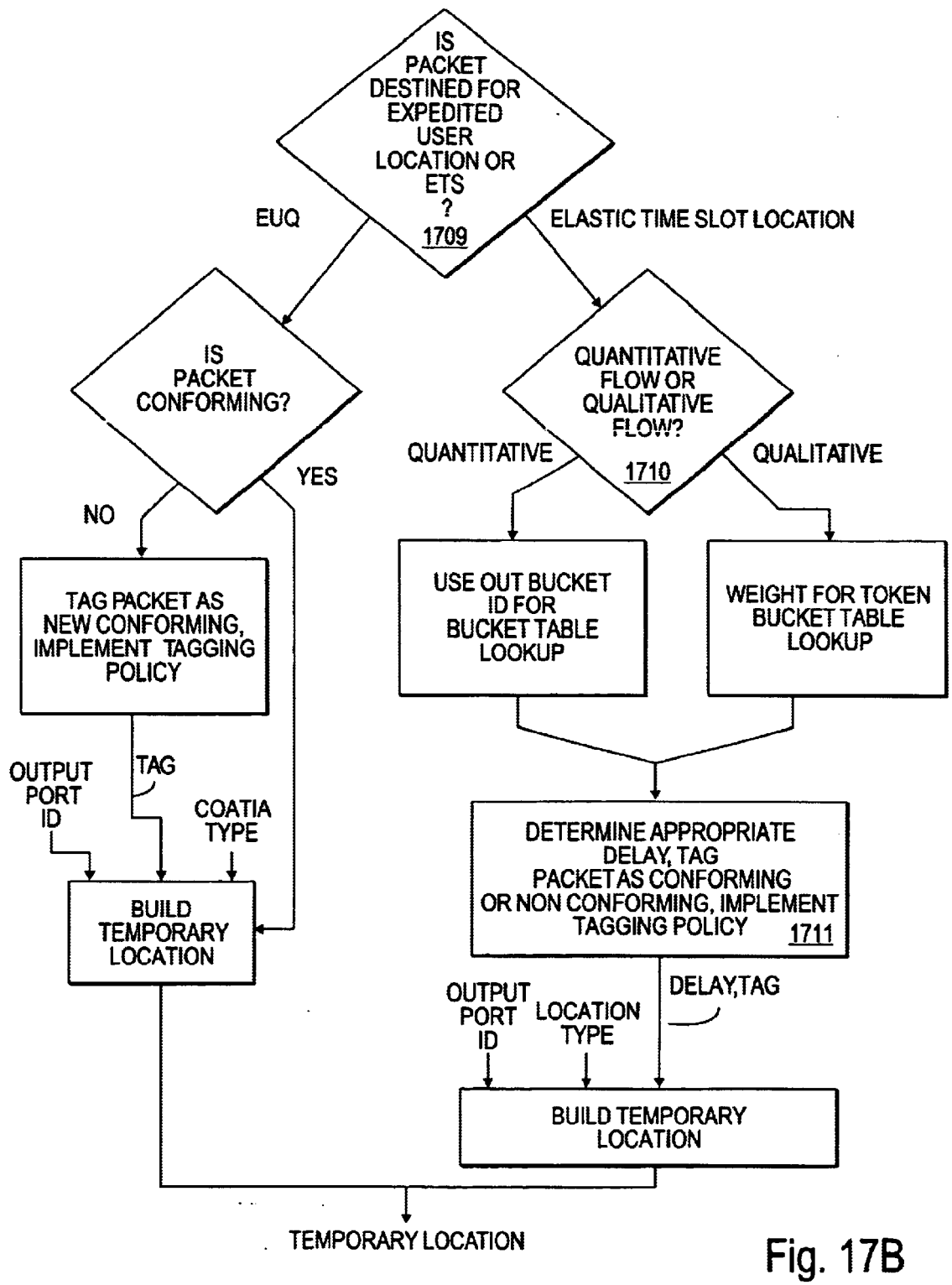
Figure 17C:
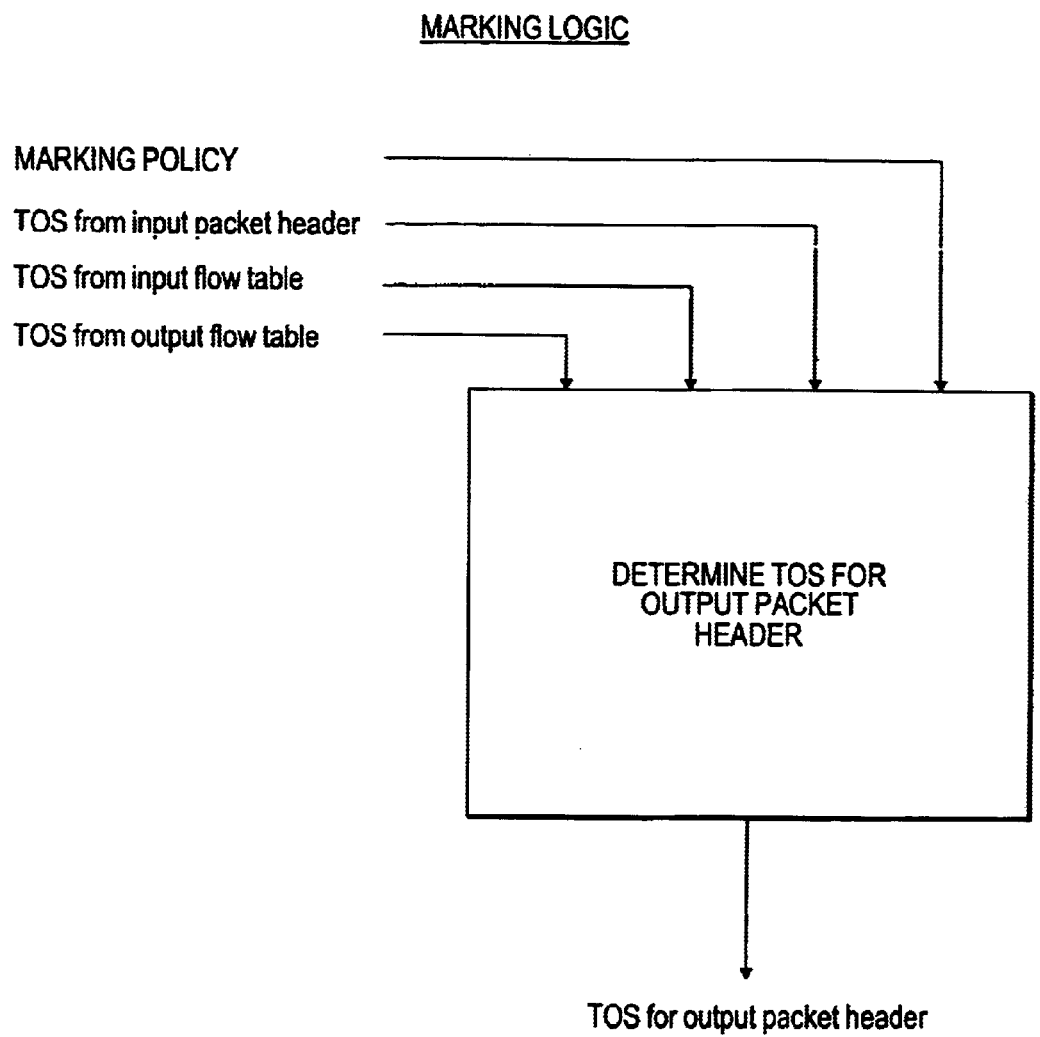

FIG. 16a shows an embodiment of a pipeline design including an Output Flow ID stage 1613a, a Marking/Shaping stage 1614a and an Acceptance/Discard stage 1615a. FIG. 17a relates to methods employed within the Output Flow ID stage 1613a and Marking/Shaping stage 1614a embodiments of FIG. 16a. FIGS. 17b and 17c relate to methods employed within the Marking/Shaping stage 1614a embodiment of FIG. 16a. Much of the matter concerning these methods has already been discussed above. FIG. 16a may be referred to further support the discussion surrounding FIG. 5d as well as the following discussion regarding the Marking/Shaping stage 1614a and Acceptance/Discard stage 1615a.

As discussed, referring to FIGS. 16a and 17a, the Output Flow ID stage 1613a gains an understanding 1701 as to whether or not the packet is destined for a user by reference to the Output Connection ID. If not, the Output Flow ID stage is not utilized. If so, the Output Flow ID stage 1613a gains an understanding 1702 as to whether or not Input Policing was performed by reference to the presence (or lack of presence) of the TOS value from the input flow table. If input policing was performed, the Output Flow ID stage 1613a uses the TOS value from the input flow table as part of the data used for the look up 1703 performed in output flow identification table 1616a. Otherwise, the TOS value from the input packet's header is used 1704.

The Marking/Shaping stage 1614a gains an understanding as to whether or not the Output Flow ID stage 1613a was utilized by reference 1705 to the existence (or lack of existence) of a user output flow identifier. If the Output Flow ID stage 1613a was utilized, the user output flow profile identifier is used for a look up 1706 to output flow table 1620. If not, a TOS value is used for the output flow table lookup 1620. If input policing was performed on the packet, the TOS value from the input flow table is used for the lookup 1707; otherwise the TOS value from the packet's input header is used 1708.

Figure 16B:
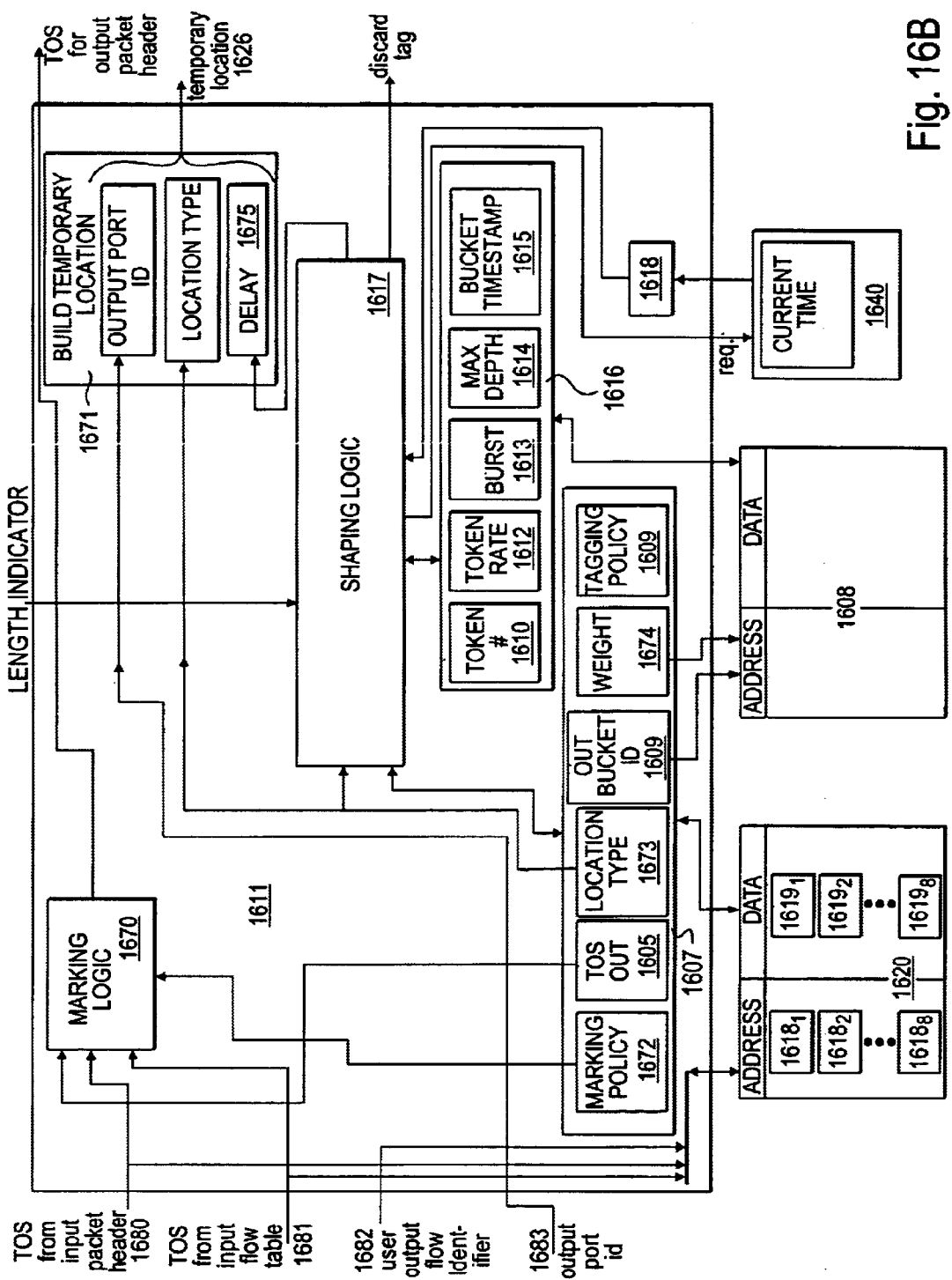
FIG. 16b shows the Marking/Shaping stage of FIG. 16a in more detail.

FIG. 16b shows an embodiment of a Marking/Shaping stage 1611 design. Referring back to FIG. 5d, the Marking/Shaping stage 514 of the pipeline embodiment of FIG. 5d, as discussed, has two main functions: 1) identifying the proper TOS value to be entered into the header of the output packet; and 2) building a temporary location 526 as an input to the Acceptance/Discard 515 stage (that identifies a suitable location in the output packet organizer for the packet's corresponding packet identifier). The Marking/Shaping stage 1611 also checks packets destined for a user for compliance with the user's allocated output rate.

With regards to the first function, identifying the proper TOS value for the output packet, refer to FIGS. 16b and 17c. After the lookup is performed, the Marking Policy 1672 and TOSout 1605 output flow information, coupled with the TOS from the input packet header 1680 and the TOS from the input flow table (if any) are entered into Marking Logic 1670. The Marking Policy indicates which of the various TOS values should be used to mark the TOS parameter in the output packet. Storing the marking policy in the output flow table 1620 allows for easily configuring both regulated and unregulated lines within a service provider's network.

With regards to the second function, building a temporary location as an input to the Acceptance/Discard stage, refer to FIGS. 16b and 17b. The shaping logic 1617 gains an understanding 1709 as to whether or not the packet is destined for an expedited user location or an elastic time slot location by reference to the location type parameter 1673. If the packet is destined for an expedited user location, the packet is recognized as such. If its deemed conforming (by methods similar to those described with respect to Input Policing of FIG. 9) the packet may be discarded or (for example) directed to the best effort location. A tagging policy may be stored in flow table 1620 to configure the treatment of the user's packet accordingly. A Discard Tag may also be supplied to indicate that the packet is conforming or non-conforming as described with respect to FIG. 10.

If the packet is destined for an elastic time slot location, an understanding 1710 is gained by referring to the presence of either an out bucket id 1609 parameter, or a weight parameter 1674. If a bucket id parameter 1609 is present in the output flow table 1620, the applicable flow is a quantitative flow. If a weight parameter 1674 is present, the applicable flow is qualitative flow. In either case, the present parameter is used to look up the appropriate bucket information 1610, 1612, 1613, 1614, 1615 for the particular flow.

The packet is deemed conforming or non conforming by logic within shaping logic 1617 similar to the policing logic 917 of FIG. 9. The appropriate delay is determined by shaping logic 1617 according to Equations 2 and 3 as discussed above. Then, a temporary location is constructed 1712 based upon: 1) the Output Port ID 1683 (which indicates the proper output packet organizer to use); 2) the location type 1673; and 3) the amount of delay to be applied to the packet.

It is important to note that, although particular pipeline stage embodiments discussed above have been tailored to operate with the specific output packet organizer embodiment 1250 of FIG. 1250; various pipeline 550 embodiments may also be designed to exist with output packet organizers different than specific embodiment 1250.

Consistent with this, different output packet organizer embodiments may exist as well. For example, different output packet organizers 550 having more or less than four levels of priority are possible (by increasing or decreasing the number of locations). These various embodiments may distinguish levels of priority by any of the techniques described above such as: 1) configuring certain locations for no oversubscription; 2) designing the scheduler to service a particular location at the expense of percentages allocated to other locations (such as discussion relating to FIG. 14a); or 3) implementing a round robin pointer to a group of locations.

One of ordinary skill can design various pipeline 540 stage embodiments directed to a particular output packet organizer embodiment. More priority levels may be added as long as the location parameter size is large enough. Furthermore, note that output packet organizers having a single input that is coupled to and distributes packet identifiers to each location are also possible. Such embodiments may include, along with the packet identifier sent to the organizer, an indication of the packet identifier's appropriate location.

Acceptance/Discard

As discussed above, referring back to FIG. 5d, the Acceptance/Discard 515 stage accepts a temporary location 528 from the shaping/marking stage 514. Acceptance/Discard stage 515 attempts to enqueue a packet identifier into the temporary location specified by the Marking/Shaping stage 514. In the embodiment shown in FIG. 5d, the Acceptance/Discard stage 515 is responsible for discarding packets that have been effectively discarded by earlier stages. For example, if the Input Policing stage 511 tags a packet for discard, the Acceptance/Discard stage 515 is responsible for initiating, in some manner, the flushing of the corresponding packet from buffer memory.

In various embodiments, the Acceptance/Discard stage 515 first checks with the output organizer to see if space is available at the temporary location sent by the Marking/Shaping stage. The Acceptance/Discard stage 515 sends a status request to the appropriate output organizer. Recall that in various embodiments there are multiple output ports per system and each port is configured to have its own dedicated output packet organizer.

Note that the temporary location 1626 structure, referring briefly back to FIG. 16, incorporates the Output Port ID (that is identified by the Next Node Identification stage). The Acceptance/Discard stage gains an understanding as to which output packet organizer is applicable through observance of the Output Port ID in structure 1626.

Figure 18:
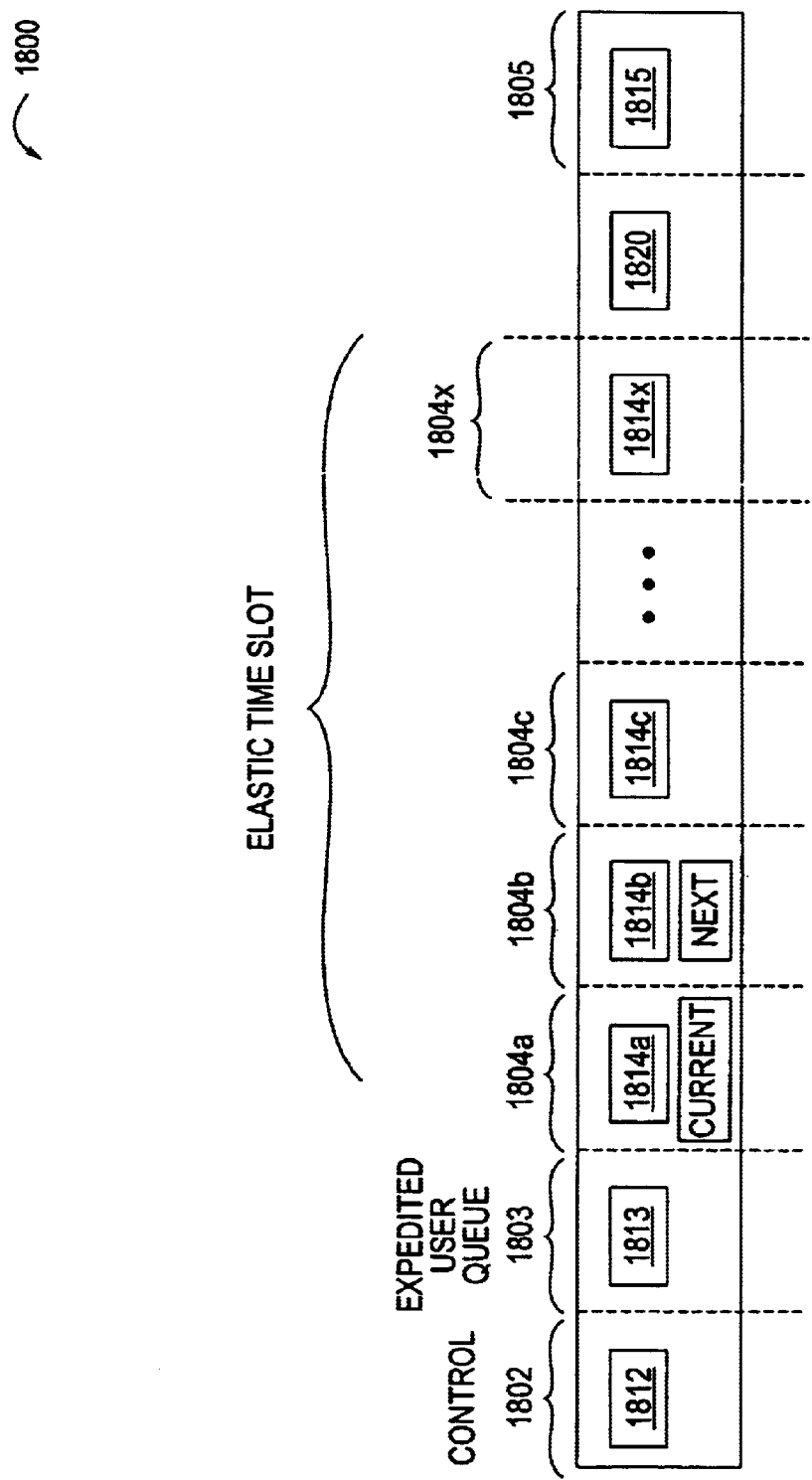
FIG. 18 show a states data structure sent to the Acceptance/Discard stage of FIG. 16a by an output packet organizer.

With knowledge of the applicable output packet organizer 550, the Acceptance/Discard 515 stage requests a status from the output packet organizer 550. A data structure referred to as states structure 542 is sent to the Acceptance/Discard stage 515 by the output packet organizer in response. An embodiment 1800 is shown in FIG. 18. Note the states structure embodiment 1800 of FIG. 18 is partitioned 1802, 1803, 1804a–x, 1805 for each output packet organizer location 1202, 1203, 1204a–x and 1205 of FIG. 12.

Note also that the states structure 1800 includes information as to the position of the round robin pointer. Specifically, one data reading 1804a is marked as the currently served elastic time slot (i.e., the elastic time slot currently being pointed to, such as elastic time slot 1204a of FIG. 12); while another data reading 1804b is marked as the next to be pointed to (e.g., elastic time slot 1204b).

These markings help the Acceptance/Discard stage determine which elastic slot corresponds to which amount of delay. The time information 1820 indicates the spread in time (indicative of the rate of the pointer) between the elastic time slots so that the Acceptance/Discard stage can precisely determine which elastic slot corresponds to which amount of delay. Note that since the number of elastic queues is configurable, so are the number of entries in structure 1800.

Each location partition 1802, 1803, 1804a–x, 1805 contains a data reading 1812, 1813, 1814a–x, 1815 that reflects the current state of (i.e., how many packet identifiers currently reside within) each corresponding location. Note that the expedited user location 1803 has a data reading even though, in various embodiments, it is not oversubscribed. This corresponds to additional locations within the expedited user location (that may be used to store packet identifiers not served, e.g., because the control location consumed a percentage of the expedited user location). Also, as discussed, some embodiments may entertain some over subscription. Spaces for more than one packet identifier may also be designed into the control 1202 and best effort 1205 locations.

Since various locations 1202 through 1205 may be designed to handle more than one packet identifier, the data readings 1812 through 1815 may trigger additional functionality by the acceptance discard stage. For example, assuming the Marking/Shaping stage identifies a particular temporary location that corresponds to a particular location (e.g., 1204b). The Acceptance/Discard stage checks its corresponding data reading (e.g., 1814b) to gain awareness of current congestion at that location.

In various embodiments, the Acceptance/Discard stage 515 may execute different discard processes as a function of the congestion of a particular location. For example, at a modest congestion level the Acceptance/Discard stage may only discard a packet if it is deemed non-conforming. At higher levels of congestion the Acceptance/Discard stage may discard any packet after a certain congestion threshold.

For elastic time slot locations, the Accept/Discard stage may look to other elastic time slot locations to see if space is available. In this later approach, the Acceptance/Discard stage may move out in time in order to preserve the regulation activity of prior stages. Random Early Detection (RED) scheme may also be used. That is, as congestion builds up packets are subjected to a higher probability that they will be discarded.

In other embodiments, the elastic time slot locations 1204a–x are not discarded by reference to data structures 1814a–x. Rather, the Shaping/Marking stage passes the Current Available Token parameter (as part of the delay information 1675 of FIG. 16. Recall that as an output flow begins to consume too much rate, its token count becomes negative. In various embodiments, the Accept/Discard stage increases the probability of a packet's rejection based upon increasingly negative token counts for the particular flow. This allows the pipeline to reject packets based upon their flow (e.g., qualitative or quantitative) rather than the congestion of the elastic time slot locations as a whole.

Note that after the completion of the Accept/Discard stage 1615a, referring back to FIG. 16a, the control label 795 has the TOS to be used for the output packet as well as the Output Connection ID. This information may be passed down to post pipeline logic, responsible for forming an output packet, to properly direct and label the output packet.

Pipeline Implementation

The pipeline may be implemented in a variety of ways. For example, various pipeline stages may be broken down into separate semiconductor chips, or the entire pipeline may be implemented in the same semiconductor chip. The pipeline may be located within a networking system on a central switching card or a networking adapter card. Furthermore, the pipeline may exist in the form of a design or other model or data structure used for design simulation tools. These may include, among others, synthesizable or fully synthesized VHDL or Verilog RTL descriptions.

In the foregoing specification, the invention has been described with reference to specific exemplary embodiments thereof. It will, however, be evident that various modifications and changes may be made thereto without departing from the broader spirit and scope of the invention as set forth in the appended claims, The specification and drawings are, accordingly, to be regarded in an illustrative rather than a restrictive sense.

What is claimed is:

1. An output packet organizer, comprising:
   a) n time slot locations wherein n is an integer, each of said n time slot locations to store one or more of its own packet identifiers, each of said packet identifiers having a corresponding packet, each of said packet identifiers indicating where its corresponding packet is waiting within a packet buffer; and,
   b) a scheduler to service said n time slot locations according to a plurality of scheduling cycles, one of said n time slot locations to be serviced for each of said scheduling cycles, whichever of said n time slot locations to be serviced during a particular scheduling cycle determined by a round robin pointer, said round robin pointer having a temporal rotation period so as to cause said n time slot locations to correspond to n different queuing delays, a servicing of a said time slot location causing removal of said time slot location's one or more packet identifiers, said removal causing sending of a packet from said packet buffer for each of said time slot location's one or more packet identifiers that are said removed.

2. The output packet organizer of claim 1 wherein said temporal rotation period is configurable so as to allow said n different queuing delays to be configurable.

3. The output packet organizer of claim 1 further comprising a high priority location to store a high priority packet identifier that indicates where a high priority packet is waiting within said packet buffer, said high priority location coupled to said scheduler.

4. The output packet organizer of claim 3 further comprising a highest priority location to store highest priority packet identifiers that indicate where a highest priority packet is within said packet buffer, said highest priority location coupled to said scheduler, said highest priority packet having higher priority than said high priority packet.

5. The output packet organizer of claim 4 wherein said highest priority packet is a network maintenance packet and said high priority packet is a real time packet.

6. The output packet organizer of claim 5 wherein said n time slot locations store packet identifiers that identify packets are neither network maintenance packets nor real time packets.

7. The output packet organizer of claim 6 wherein packets identified by packet identifiers that are stored within but not released from a pointed to time slot location are sent from said packet buffer prior to any packets identified by packet identifiers that are stored with the time slot location that, according to said round robin pointer, is to be next serviced after said pointed to time slot location.

8. The apparatus of claim 1 wherein packets identified by packet identifiers that are stored within but not released from a pointed to time slot location are sent from said packet buffer prior to any packets identified by packet identifiers that are stored with the time slot location that, according to said round robin pointer, is to be next serviced after said pointed to time slot location.

9. The output packet organizer of claim 1 wherein said scheduler services a pointed to time slot location only if said pointed to time slot location is storing a said packet identifier.

10. The output packet organizer of claim 9, further comprising a second location to store a lower priority packet identifier, said lower priority packet identifier indicating where a lower priority packet, that is waiting to be sent from said packet buffer, is located within said packet buffer, said lower priority packet having a lower priority than packets identified by packet identifiers stored within said n time slot locations, and wherein said second location can be serviced by said scheduler only if a pointed to time slot location or higher priority location than said pointed to time slot location is empty when said scheduler looks to service said other pointed to time slot location or higher priority location than said pointed to time slot location.

11. The output packet organizer of claim 1 wherein said scheduler is capable of servicing packet identifiers from one of said n time slot locations, per said scheduling cycle, such that a percentage of said an amount of packet data removable from said packet buffer as authorized by said scheduler per scheduling cycle can be removed from said packet buffer, in the form of packets identified by packet identifiers stored a time slot location, per said scheduling cycle.

12. The output packet organizer of claim 11 wherein said scheduler is capable of servicing high priority packet identifiers from a high priority location during said scheduling cycle, to the extent they represent an amount of high priority packet data greater than a second percentage of said amount of packet data, at the expense of packet identifiers stored within the time slot location pointed to by said round robin pointer to be serviced for said scheduling cycle.

13. The output packet organizer of claim 12 wherein packet identifiers that were left un-serviced as a result of said servicing of said high priority packet identifiers that represented high priority packet data beyond said second percentage will be serviced by said scheduler during a next scheduling cycle that follows said scheduling cycle.

14. The output packet organizer of claim 1 wherein a weighted fair queue is capable of being built into said n elastic time slots by establishing a first quantitative flow having a higher output rate than a second quantitative flow.

15. The output packet organizer of claim 1 wherein a first plurality of different users are capable of being assigned to said first quantitative flow and a second plurality of different users are capable of being assigned to said second quantitative flow.

16. A method, comprising:
   servicing n time slot locations according to a plurality of scheduling cycles whichever of said n time slot locations to be serviced during a particular scheduling cycle determined by a round robin pointer, said round robin pointer having a temporal rotation period so as to cause said n time slot locations to correspond to n different queuing delays, said servicing of said n time slot locations causing removal of at least one packet identifier stored therein, said removal causing sending of a packet identified by said packet identifier from a packet buffer.

17. The method of claim 16 wherein said round robin pointer has a configurable rotation time so as to cause each of said queuing delays to be configurable.

18. The method of claim 16 further comprising, for each scheduling cycle of said plurality of scheduling cycles, servicing a high priority packet identifier from a high priority location, said high priority packet having higher priority than any packet stored within said n time slot locations.

19. The method of claim 18 wherein each of said high priority packet identifiers identify a packet that carries real time traffic.

20. The method of claim 19 wherein those packet identifiers that are stored within said n time slot locations each identify a packet that carries data traffic.

21. The method of claim 20 further comprising, for each scheduling cycle of said plurality of scheduling cycles, servicing a higher priority packet identifier from a higher priority location, said higher priority packet higher in priority than said high priority packet.

22. The method of claim 21 wherein said higher priority packet carries network maintenance traffic.

23. The method of claim 16 further comprising said scheduler allowing a best effort location to release one or more packet identifiers during a scheduling cycle as a consequence of said scheduling cycle's pointed to time slot location having only stored packet identifiers that correspond to less than an amount of packet data per scheduling cycle that may be released from a pointed to time slot location per scheduling cycle.

24. The method of claim 23 wherein said best effort location stores a packet identifier whose corresponding packet represents traffic in excess of an allocated rate.

25. The method of claim 16 wherein each of said scheduling cycles corresponds to an output rate defined by an amount of packet data sent from said packet buffer per unit of time and wherein one or more high priority packet identifiers are configured to be serviced from a high priority location, per scheduling cycle, such that a first percentage of said amount of packet data is removed from said packet buffer in the form of high priority packets per scheduling cycle, where, said high priority packets are higher in priority than those packets identified by packet identifiers stored in said time slot locations.

26. The method of claim 25 wherein packet identifiers allowed to be serviced per scheduling cycle from a time slot location correspond to a second percentage of said amount of packet data.

27. The method of claim 26 further comprising servicing during a scheduling cycle high priority packet identifiers from said high priority location, and, to the extent they represent an amount of high priority packet data greater than said first percentage, servicing said high priority packet identifiers at the expense of packet identifiers stored within the time slot location pointed to for said scheduling cycle.

28. The method of claim 27 wherein packet identifiers that were left un-serviced after expiration of a scheduling cycle in which the time slot location they are stored in was pointed to are serviced during a next scheduling cycle relative to said scheduling cycle and before any of those packet identifiers stored in a next pointed to location relative to said pointed to location.

29. The method of claim 16 wherein a weighted fair queue is built into said n time slots by establishing a first quantitative flow having a higher output rate than a second quantitative flow.

30. The output packet organizer of claim 29 wherein a first plurality of different users are assigned to said first quantitative flow and a second plurality of different users are assigned to said second quantitative flow.

31. An apparatus, comprising:
a) a packet buffer capable of storing packets; and,
b) an output packet organizer coupled to said packet buffer, said output packet organizer to organize and release packet identifiers that point to said packets, where, a said release of a packet identifier from said output packet organizer triggers said packet identifier's corresponding packet to be sent from said packet buffer toward an outbound networking line, said output packet organizer comprising:
1) n time slot locations to store packet identifiers that point to said packets, and, a round robin pointer to point to a time slot location to be serviced during a particular scheduling cycle, said round robin pointer having a temporal rotation period so as to cause said n time slot locations to correspond to n different queuing delays, and,
2) a scheduler to pace a plurality of scheduling cycles, said scheduling cycle being one of said scheduling cycles.

32. The apparatus of claim 31 wherein said packet buffer is also capable of storing higher priority packets having a priority higher than said packets.

33. The apparatus of claim 32 wherein said packets that are highly priority than said packets at least comprise network maintenance/control packets.

34. The apparatus of claim 32 wherein said output packet organizer further comprises at least one location to store said packet identifiers that each point to a different one of said higher priority packets, said at least one location coupled to said scheduler so as to be capable of releasing one or more of said higher priority packets identifiers for each of said plurality of scheduling cycles.

35. The apparatus of claim 34 wherein said first priority packets are real time packets and network maintenance/control packets.

36. The apparatus of claim 35 wherein said packets identified by packet identifiers stored within said n time slot locations are neither real time packets nor network maintenance/control packets.

37. The apparatus of claim 31 wherein said scheduling cycles are organized into an amount of packet data sent from said packet buffer per unit of time and where said plurality of time slot locations and said pointer are capable of effectively causing a percentage worth of said amount of packet data of said packets to be sent from said packet buffer for each scheduling cycle of said plurality of scheduling cycles.

38. The apparatus of claim 37 wherein, one or more of said packet identifiers whose time slot location is pointed to during said particular scheduling cycle but are not released as a consequence are nevertheless released before packet identifiers whose time slot location is next pointed to.

39. The apparatus of claim 38 wherein said pointer is a round robin pointer having a configurable rotation time, said plurality of time slot locations being a plurality of elastic time slots as a consequence of said configurable rotation time.

40. The apparatus of claim 31 wherein a weighted fair queue is capable of being built into said time slot locations by establishing a first quantitative flow having a higher output rate than a second quantitative flow.

41. The output packet organizer of claim 40 wherein a first plurality of different users are capable of being assigned to said first quantitative flow and a second plurality of different users are capable of being assigned to said second quantitative flow.

42. The apparatus of claim 31 wherein said output packet organizer is coupled to a pipeline stage of a packet processing pipeline, said pipeline stage to at least store each of said packet identifiers into a said time slot location that corresponds to an appropriate queuing delay for its corresponding low priority packet, each of said appropriate queuing delays calculated within said pipeline, where, said pipeline stage is to recognize which time slot location corresponds to an appropriate delay based upon a data structure that is passed from said output packet organizer to said pipeline stage for each of said low priority packets.

43. The apparatus of claim 42 wherein said pipeline further comprises the following pipeline stages for regulating traffic offered by a network to a first user of said network and a second user of said network, wherein, the following pipeline stages precede said pipeline stage in said pipeline:

a) a first pipeline stage comprising:
  1) a first data bus to receive from a first memory:
    (i) during a first pipeline cycle:
      a first output flow identifier;
    (ii) during a second pipeline cycle:
      a second output flow identifier; and
b) a second pipeline stage that follows said first pipeline stage, said second pipeline stage comprising:
  1) a second data bus to receive from a second memory:
    (i) during said second pipeline cycle and from a location of said second memory pointed to by said first output flow identifier:
      a first TOS parameter for a first of said low priority packets, said first low priority output packet destined for said first user;
    (ii) during a third pipeline cycle and from a location of said second memory pointed to by said second output flow identifier:
      a second TOS parameter for a second of said low priority packets, said second low priority packet destined for said second user;
  2) register space in which to store:
    (iii) during said second pipeline cycle:
      a first parameter from which a first of said delays can be calculated, said first delay for a first of said low priority packets, said first delay consistent with said first output flow;
    (iv) during said third pipeline cycle:
      a second parameter from which a second of said delays can be calculated, said second delay for a second of said low priority packets, said second delay consistent with said first output flow;
  3) logic circuitry to calculate:
    (v) during said second pipeline cycle:
      said first delay;
    (vi) during said third pipeline cycle;
      said second delay.

* * * * *